(12) United States Patent
Eisen et al.

(10) Patent No.: US 12,533,242 B2
(45) Date of Patent: Jan. 27, 2026

(54) ADJUSTABLE SPINAL IMPLANTS AND RELATED DEPLOYMENT INSTRUMENTS

(71) Applicant: Blue Ocean Spine GmbH, Tuttlingen (DE)

(72) Inventors: Guntmar Eisen, Tuttlingen (DE); Markus Salvermoser, Tuttlingen-Möhringen (DE); Jacob Richter, Tuttlingen (DE)

(73) Assignee: Blue Ocean Spine GmbH, Tuttlingen (DE)

( * ) Notice: Subject to any disclaimer, the term of this patent is extended or adjusted under 35 U.S.C. 154(b) by 90 days.

(21) Appl. No.: 18/415,861

(22) Filed: Jan. 18, 2024

(65) Prior Publication Data

US 2024/0238099 A1 Jul. 18, 2024

Related U.S. Application Data

(60) Provisional application No. 63/439,749, filed on Jan. 18, 2023.

(51) Int. Cl.
*A61F 2/44* (2006.01)
*A61F 2/46* (2006.01)
*A61F 2/30* (2006.01)

(52) U.S. Cl.
CPC .......... *A61F 2/4455* (2013.01); *A61F 2/4611* (2013.01); *A61F 2002/30476* (2013.01);
(Continued)

(58) Field of Classification Search
CPC ...... A61F 2/4611; A61F 2/442; A61F 2/4425; A61F 2/4455; A61F 2002/443;
(Continued)

(56) References Cited

U.S. PATENT DOCUMENTS 5,676,702 A 10/1997 Ratron
6,102,950 A 8/2000 Vaccaro
(Continued)

FOREIGN PATENT DOCUMENTS

AU 2015268677 A1 6/2016
DE 10307758 B4 2/2005
(Continued)

OTHER PUBLICATIONS

US 10,940,020 B2, 03/2021, Branch et al. (withdrawn)
(Continued)

*Primary Examiner* — Eduardo C Robert
*Assistant Examiner* — Christina Negrelli-Rodriguez
(74) *Attorney, Agent, or Firm* — Faber LLC

(57) ABSTRACT

The present disclosure provides adjustable spinal devices, instruments for deploying the spinal devices, methods for adjusting the height and/or lordosis angles of the spinal devices, and methods for implanting such devices. An adjustable spinal fusion device includes an upper plate having an outer surface for placement against a first vertebral body and a lower plate having an outer surface for placement against a second vertebral body. The device further includes a translation member configured to move longitudinally relative to the upper and lower plates to adjust an angle between the upper and lower plates and a locking member coupled to the translation member. The locking member is movable between an unlocked position, wherein the translation member is capable of moving in the longitudinal direction, and a locked position, wherein the translation member is inhibited from moving in the longitudinal direction.

19 Claims, 36 Drawing Sheets

(52) U.S. Cl.
CPC ............... *A61F 2002/3054* (2013.01); *A61F 2002/30579* (2013.01); *A61F 2002/4627* (2013.01)

(58) Field of Classification Search
CPC .... A61F 2002/30329; A61F 2002/3054; A61F 2002/30579
USPC .......................................... 623/17.11–17.16
See application file for complete search history.

(56) References Cited

U.S. PATENT DOCUMENTS

| | | | |
|---|---|---|---|
| 6,126,689 | A | 10/2000 | Brett |
| 6,179,873 | B1 | 1/2001 | Zientek |
| 6,395,031 | B1 | 5/2002 | Foley et al. |
| 6,409,766 | B1 | 6/2002 | Brett |
| 6,767,367 | B1 | 7/2004 | Michelson |
| 6,770,096 | B2 | 8/2004 | Bolger et al. |
| 6,852,129 | B2 | 2/2005 | Gerbec et al. |
| 6,905,512 | B2 | 6/2005 | Paes et al. |
| 6,953,477 | B2 | 10/2005 | Berry |
| 6,955,691 | B2 | 10/2005 | Chae et al. |
| 6,981,975 | B2 | 1/2006 | Michelson |
| 7,029,498 | B2 | 4/2006 | Boehm et al. |
| 7,094,257 | B2 | 8/2006 | Mujwid et al. |
| 7,112,206 | B2 | 9/2006 | Michelson |
| 7,267,689 | B2 | 9/2007 | Kohrs et al. |
| 7,431,735 | B2 | 10/2008 | Liu |
| 7,547,308 | B2 | 6/2009 | Bertagnoli et al. |
| 7,655,042 | B2 | 2/2010 | Foley et al. |
| 7,708,778 | B2 | 5/2010 | Gordon et al. |
| 7,727,280 | B2 | 6/2010 | Mcluen |
| 7,780,675 | B2 | 8/2010 | Schneid |
| 7,828,849 | B2 | 11/2010 | Lim |
| 7,951,199 | B2 | 5/2011 | Miller |
| 7,972,365 | B2 | 7/2011 | Michelson |
| 8,025,665 | B2 | 9/2011 | Lim et al. |
| 8,062,373 | B2 | 11/2011 | Fabian, Jr. |
| 8,062,374 | B2 | 11/2011 | Markworth et al. |
| 8,080,062 | B2 | 12/2011 | Armstrong et al. |
| 8,110,004 | B2 | 2/2012 | Valdevit et al. |
| 8,167,950 | B2 | 5/2012 | Aferson et al. |
| 8,187,332 | B2 | 5/2012 | Mcluen |
| 8,206,399 | B2 | 6/2012 | Gill et al. |
| 8,206,449 | B2 | 6/2012 | Jansen et al. |
| 8,221,501 | B2 | 7/2012 | Eisermann et al. |
| 8,221,502 | B2 | 7/2012 | Branch, Jr. |
| 8,241,358 | B2 | 8/2012 | Butler et al. |
| 8,246,686 | B1 | 8/2012 | Curran et al. |
| 8,273,125 | B2 | 9/2012 | Baccelli et al. |
| 8,287,572 | B2 | 10/2012 | Bae et al. |
| 8,292,958 | B1 | 10/2012 | Bruffey et al. |
| 8,303,658 | B2 | 11/2012 | Peterman |
| 8,349,014 | B2 | 1/2013 | Barreiro et al. |
| 8,349,015 | B2 | 1/2013 | Bae et al. |
| 8,361,148 | B2 | 1/2013 | Malberg et al. |
| 8,366,774 | B1 | 2/2013 | Bruffey et al. |
| 8,377,071 | B2 | 2/2013 | Lim et al. |
| 8,382,768 | B2 | 2/2013 | Berry et al. |
| 8,382,842 | B2 | 2/2013 | Greenhalgh et al. |
| 8,394,143 | B2 | 3/2013 | Grotz et al. |
| 8,394,145 | B2 | 3/2013 | Weiman |
| 8,398,713 | B2 | 3/2013 | Weiman |
| 8,403,990 | B2 | 3/2013 | Dryer et al. |
| 8,409,291 | B2 | 4/2013 | Blackwell et al. |
| 8,425,528 | B2 | 4/2013 | Berry et al. |
| 8,435,296 | B2 | 5/2013 | Kadaba et al. |
| 8,435,298 | B2 | 5/2013 | Weiman |
| 8,449,554 | B2 | 5/2013 | Mcclintock |
| 8,454,695 | B2 | 6/2013 | Grotz et al. |
| 8,460,385 | B1 | 6/2013 | Wensel |
| 8,480,748 | B2 | 7/2013 | Poulos |
| 8,486,147 | B2 | 7/2013 | De Villiers et al. |
| 8,486,149 | B2 | 7/2013 | Saidha et al. |
| 8,491,659 | B2 | 7/2013 | Weiman |
| 8,496,706 | B2 | 7/2013 | Ragab et al. |
| 8,506,635 | B2 | 8/2013 | Palmatier et al. |
| 8,512,348 | B2 | 8/2013 | Chabansky et al. |
| 8,518,120 | B2 | 8/2013 | Glerum et al. |
| 8,523,944 | B2 | 9/2013 | Jimenez et al. |
| 8,523,945 | B1 | 9/2013 | Wensel |
| 8,540,452 | B2 | 9/2013 | Jimenez et al. |
| 8,545,562 | B1 | 10/2013 | Materna et al. |
| 8,545,563 | B2 | 10/2013 | Brun et al. |
| 8,574,299 | B2 | 11/2013 | Barreiro et al. |
| 8,579,907 | B2 | 11/2013 | Lim et al. |
| 8,579,981 | B2 | 11/2013 | Lim et al. |
| 8,579,982 | B2 | 11/2013 | Michelson |
| 8,597,353 | B2 | 12/2013 | Kana et al. |
| 8,603,170 | B2 | 12/2013 | Cipoletti et al. |
| 8,617,245 | B2 | 12/2013 | Brett |
| 8,617,247 | B2 | 12/2013 | Lechmann et al. |
| 8,628,576 | B2 | 1/2014 | Triplett et al. |
| 8,628,577 | B1 | 1/2014 | Jimenez |
| 8,632,595 | B2 | 1/2014 | Weiman |
| 8,641,766 | B2 | 2/2014 | Donner et al. |
| 8,663,329 | B2 | 3/2014 | Ernst |
| 8,663,331 | B2 | 3/2014 | Mcclellan, III et al. |
| 8,663,332 | B1 | 3/2014 | To et al. |
| 8,685,095 | B2 | 4/2014 | Miller et al. |
| 8,685,098 | B2 | 4/2014 | Glerum et al. |
| 8,685,104 | B2 | 4/2014 | Lee et al. |
| 8,709,086 | B2 | 4/2014 | Glerum |
| 8,715,350 | B2 | 5/2014 | Janowski et al. |
| 8,778,025 | B2 | 7/2014 | Ragab et al. |
| 8,778,027 | B2 | 7/2014 | Medina |
| 8,795,366 | B2 | 8/2014 | Varela |
| 8,801,721 | B2 | 8/2014 | Berry et al. |
| 8,801,792 | B2 | 8/2014 | De Villiers et al. |
| 8,845,731 | B2 | 9/2014 | Weiman |
| 8,845,732 | B2 | 9/2014 | Weiman |
| 8,845,733 | B2 | 9/2014 | O'Neil et al. |
| 8,845,734 | B2 | 9/2014 | Weiman |
| 8,845,738 | B2 | 9/2014 | Michelson |
| 8,852,279 | B2 | 10/2014 | Weiman |
| 8,858,564 | B2 | 10/2014 | Errico et al. |
| 8,876,829 | B2 | 11/2014 | Lee |
| 8,888,853 | B2 | 11/2014 | Glerum et al. |
| 8,888,854 | B2 | 11/2014 | Glerum et al. |
| 8,894,711 | B2 | 11/2014 | Varela |
| 8,894,712 | B2 | 11/2014 | Varela |
| 8,906,100 | B2 | 12/2014 | Jimenez et al. |
| 8,906,101 | B2 | 12/2014 | Lee et al. |
| 8,920,505 | B2 | 12/2014 | Aferson et al. |
| 8,926,704 | B2 | 1/2015 | Glerum et al. |
| 8,940,052 | B2 | 1/2015 | Lechmann et al. |
| 8,956,413 | B2 | 2/2015 | Ashley et al. |
| 8,968,405 | B2 | 3/2015 | Kirwan et al. |
| 8,979,933 | B2 | 3/2015 | Vishnubholta et al. |
| 8,986,389 | B2 | 3/2015 | Lim et al. |
| 8,998,920 | B2 | 4/2015 | Berry et al. |
| 9,005,291 | B2 | 4/2015 | Loebl et al. |
| 9,034,045 | B2 | 5/2015 | Davenport et al. |
| 9,039,771 | B2 | 5/2015 | Glerum et al. |
| 9,044,337 | B2 | 6/2015 | Dinville et al. |
| 9,050,194 | B2 | 6/2015 | Thibodeau |
| 9,066,810 | B2 | 6/2015 | Hasse et al. |
| 9,066,813 | B2 | 6/2015 | Farris et al. |
| 9,101,489 | B2 | 8/2015 | Protopsaltis et al. |
| 9,101,493 | B2 | 8/2015 | Trudeau et al. |
| 9,107,761 | B2 | 8/2015 | Lee et al. |
| 9,119,726 | B2 | 9/2015 | Wei |
| 9,119,730 | B2 | 9/2015 | Glerum et al. |
| 9,125,757 | B2 | 9/2015 | Weiman |
| 9,138,275 | B2 | 9/2015 | Bae et al. |
| 9,138,276 | B2 | 9/2015 | Bae et al. |
| 9,138,328 | B2 | 9/2015 | Butler et al. |
| 9,173,749 | B2 | 11/2015 | Jacofsky et al. |
| 9,186,258 | B2 | 11/2015 | Davenport et al. |
| 9,204,974 | B2 | 12/2015 | Glerum et al. |
| 9,211,195 | B2 | 12/2015 | Poulos |
| 9,211,196 | B2 | 12/2015 | Glerum et al. |
| 9,220,606 | B2 | 12/2015 | Janowski et al. |
| 9,226,836 | B2 | 1/2016 | Glerum |

(56) References Cited

U.S. PATENT DOCUMENTS

| | | |
|---|---|---|
| 9,233,007 B2 | 1/2016 | Sungarian et al. |
| 9,233,009 B2 | 1/2016 | Gray et al. |
| 9,259,328 B2 | 2/2016 | Pabst et al. |
| 9,271,777 B2 | 3/2016 | Nichols et al. |
| 9,271,846 B2 | 3/2016 | Lim et al. |
| 9,308,099 B2 | 4/2016 | Triplett et al. |
| 9,314,348 B2 | 4/2016 | Emstad |
| 9,320,610 B2 | 4/2016 | Alheidt et al. |
| 9,333,092 B2 | 5/2016 | To et al. |
| 9,345,588 B2 | 5/2016 | Himmelberger et al. |
| 9,351,847 B2 | 5/2016 | Reed et al. |
| 9,351,848 B2 | 5/2016 | Glerum et al. |
| 9,358,123 B2 | 6/2016 | Mcluen et al. |
| 9,358,128 B2 | 6/2016 | Glerum et al. |
| 9,358,129 B2 | 6/2016 | Weiman |
| 9,358,131 B2 | 6/2016 | Lorio et al. |
| 9,370,433 B1 | 6/2016 | Morris et al. |
| 9,370,434 B2 | 6/2016 | Weiman |
| 9,381,092 B2 | 7/2016 | Jimenez et al. |
| 9,393,130 B2 | 7/2016 | Suddaby et al. |
| 9,402,733 B1 | 8/2016 | To et al. |
| 9,408,708 B2 | 8/2016 | Greenhalgh |
| 9,408,710 B2 | 8/2016 | Purcell et al. |
| 9,414,936 B2 | 8/2016 | Miller et al. |
| 9,421,110 B2 | 8/2016 | Masson et al. |
| 9,439,771 B2 | 9/2016 | Packer et al. |
| 9,445,913 B2 | 9/2016 | Donner et al. |
| 9,445,917 B2 | 9/2016 | Jimenez et al. |
| 9,445,920 B2 | 9/2016 | Baynham |
| 9,452,063 B2 | 9/2016 | Glerum et al. |
| 9,456,903 B2 | 10/2016 | Glerum et al. |
| 9,456,906 B2 | 10/2016 | Gray et al. |
| 9,463,091 B2 | 10/2016 | Brett |
| 9,463,099 B2 | 10/2016 | Levy et al. |
| 9,474,622 B2 | 10/2016 | Mclaughlin et al. |
| 9,474,625 B2 | 10/2016 | Weiman |
| 9,480,573 B2 | 11/2016 | Perloff et al. |
| 9,480,579 B2 | 11/2016 | Davenport et al. |
| 9,486,325 B2 | 11/2016 | Davenport et al. |
| 9,492,285 B2 | 11/2016 | Saidha et al. |
| 9,492,287 B2 | 11/2016 | Glerum et al. |
| 9,492,288 B2 | 11/2016 | Wagner et al. |
| 9,492,289 B2 | 11/2016 | Davenport et al. |
| 9,498,349 B2 | 11/2016 | Patterson et al. |
| 9,498,350 B2 | 11/2016 | Theofilos et al. |
| 9,510,954 B2 | 12/2016 | Glerum et al. |
| 9,510,955 B2 | 12/2016 | Marino et al. |
| 9,539,108 B2 | 1/2017 | Glerum et al. |
| 9,554,918 B2 | 1/2017 | Weiman |
| 9,561,117 B2 | 2/2017 | Lechmann et al. |
| 9,566,163 B2 | 2/2017 | Suddaby et al. |
| 9,572,677 B2 | 2/2017 | Davenport et al. |
| 9,572,685 B2 | 2/2017 | Perry |
| 9,585,766 B2 | 3/2017 | Robinson |
| 9,597,200 B2 | 3/2017 | Glerum et al. |
| 9,603,715 B2 | 3/2017 | Thibodeau |
| 9,603,717 B2 | 3/2017 | Ibarra et al. |
| 9,610,172 B2 | 4/2017 | Butler et al. |
| 9,622,876 B1 | 4/2017 | Greenhalgh et al. |
| 9,642,720 B2 | 5/2017 | Radcliffe et al. |
| 9,642,721 B2 | 5/2017 | Patterson et al. |
| 9,655,737 B2 | 5/2017 | Perloff et al. |
| 9,655,740 B1 | 5/2017 | Faulkner et al. |
| 9,655,747 B2 | 5/2017 | Glerum et al. |
| 9,662,224 B2 | 5/2017 | Weiman et al. |
| 9,687,359 B2 | 6/2017 | Perrow |
| 9,693,876 B1 | 7/2017 | Mesiwala |
| 9,700,430 B2 | 7/2017 | Perrow |
| 9,707,092 B2 | 7/2017 | Davenport et al. |
| 9,707,095 B2 | 7/2017 | Emstad |
| 9,707,099 B2 | 7/2017 | Schiffman et al. |
| 9,707,100 B2 | 7/2017 | Duffield et al. |
| 9,717,600 B1 | 8/2017 | Wensel |
| 9,730,802 B1 | 8/2017 | Harvey |
| 9,737,412 B2 | 8/2017 | Brett |
| 9,750,616 B2 | 9/2017 | Blain et al. |
| 9,750,617 B2 | 9/2017 | Lim et al. |
| 9,750,618 B1 | 9/2017 | Daffinson et al. |
| 9,757,249 B2 | 9/2017 | Radcliffe et al. |
| 9,757,252 B2 | 9/2017 | Lee et al. |
| 9,763,803 B2 | 9/2017 | Dinville et al. |
| 9,770,343 B2 | 9/2017 | Weiman |
| 9,802,297 B2 | 10/2017 | Marchand |
| 9,808,353 B2 | 11/2017 | Suddaby et al. |
| 9,820,866 B2 | 11/2017 | Whipple |
| 9,827,107 B1 | 11/2017 | Arnin |
| 9,833,336 B2 | 12/2017 | Davenport et al. |
| 9,844,445 B2 | 12/2017 | Mcmanus et al. |
| 9,848,997 B2 | 12/2017 | Glerum et al. |
| 9,855,151 B2 | 1/2018 | Weiman |
| 9,861,497 B2 | 1/2018 | Baynham |
| 9,867,715 B2 | 1/2018 | Mclaughlin et al. |
| 9,872,779 B2 | 1/2018 | Miller et al. |
| 9,889,019 B2 | 2/2018 | Rogers et al. |
| 9,901,459 B2 | 2/2018 | Faulhaber |
| 9,907,673 B2 | 3/2018 | Weiman et al. |
| 9,913,726 B2 | 3/2018 | Weiman |
| 9,925,062 B2 | 3/2018 | Glerum et al. |
| 9,931,222 B2 | 4/2018 | Grotz et al. |
| 9,937,052 B2 | 4/2018 | Abdou et al. |
| 9,943,418 B2 | 4/2018 | Davenport et al. |
| 9,949,841 B2 | 4/2018 | Glerum et al. |
| 9,949,846 B2 | 4/2018 | Duffield et al. |
| 9,956,087 B2 | 5/2018 | Seifert et al. |
| 9,962,270 B2 | 5/2018 | Alheidt et al. |
| 9,962,271 B2 | 5/2018 | Glerum |
| 9,962,272 B1 | 5/2018 | Daffinson et al. |
| 9,968,462 B2 | 5/2018 | Weiman |
| 9,974,662 B2 | 5/2018 | Hessler et al. |
| 9,974,664 B2 | 5/2018 | Emerick et al. |
| 9,980,822 B2 | 5/2018 | Perloff et al. |
| 9,987,142 B2 | 6/2018 | Mcconnell |
| 9,987,146 B1 | 6/2018 | Lentner et al. |
| 9,999,517 B2 | 6/2018 | To et al. |
| 10,010,430 B2 | 7/2018 | Glerum et al. |
| 10,016,282 B2 | 7/2018 | Seifert et al. |
| 10,022,239 B1 | 7/2018 | Lentner et al. |
| 10,022,241 B2 | 7/2018 | Faulhaber et al. |
| 10,022,245 B2 | 7/2018 | Frasier et al. |
| 10,028,842 B2 | 7/2018 | Gray et al. |
| 10,034,765 B2 | 7/2018 | Blain et al. |
| 10,034,769 B2 | 7/2018 | Baynham |
| 10,034,772 B2 | 7/2018 | Glerum et al. |
| 10,034,773 B2 | 7/2018 | Mclaughlin et al. |
| 10,052,213 B2 | 8/2018 | Glerum et al. |
| 10,052,215 B2 | 8/2018 | Hessler et al. |
| 10,058,433 B2 | 8/2018 | Lechmann et al. |
| 10,058,435 B2 | 8/2018 | Lee et al. |
| 10,060,469 B2 | 8/2018 | Jimenez et al. |
| 10,070,971 B2 | 9/2018 | Palmatier et al. |
| 10,076,421 B2 | 9/2018 | Dewey |
| 10,080,666 B2 | 9/2018 | Suddaby et al. |
| 10,080,669 B2 | 9/2018 | Davenport et al. |
| 10,092,422 B2 | 10/2018 | Mcluen et al. |
| 10,098,755 B2 | 10/2018 | Kaufmann et al. |
| 10,098,756 B2 | 10/2018 | Emstad |
| 10,098,757 B2 | 10/2018 | Logan et al. |
| 10,098,758 B2 | 10/2018 | Matthews et al. |
| 10,098,759 B2 | 10/2018 | Weiman |
| 10,105,236 B2 | 10/2018 | Donner et al. |
| 10,105,238 B2 | 10/2018 | Koch et al. |
| 10,137,001 B2 | 11/2018 | Weiman |
| 10,137,007 B2 | 11/2018 | Dewey et al. |
| 10,143,569 B2 | 12/2018 | Weiman et al. |
| 10,149,770 B2 | 12/2018 | Loebl et al. |
| 10,154,912 B2 | 12/2018 | Glerum |
| 10,172,718 B2 | 1/2019 | Wolters et al. |
| 10,182,922 B2 | 1/2019 | Nichols et al. |
| 10,188,524 B2 | 1/2019 | Buss |
| 10,188,526 B2 | 1/2019 | Kuyler |
| 10,188,527 B2 | 1/2019 | Rogers et al. |
| 10,195,050 B2 | 2/2019 | Palmatier et al. |
| 10,206,788 B2 | 2/2019 | Field et al. |
| 10,219,913 B2 | 3/2019 | Matthews et al. |

(56) References Cited

U.S. PATENT DOCUMENTS

| | | |
|---|---|---|
| 10,219,914 B2 | 3/2019 | Faulhaber |
| 10,219,916 B2 | 3/2019 | Tanaka et al. |
| 10,226,355 B2 | 3/2019 | Zeegers |
| 10,226,359 B2 | 3/2019 | Glerum et al. |
| 10,238,503 B2 | 3/2019 | Branch et al. |
| 10,265,191 B2 | 4/2019 | Lim et al. |
| 10,265,192 B2 | 4/2019 | Eastlack et al. |
| 10,271,959 B2 | 4/2019 | Bae et al. |
| 10,271,961 B2 | 4/2019 | Aferzon et al. |
| 10,278,830 B1 | 5/2019 | Walker et al. |
| 10,278,831 B2 | 5/2019 | Sandul |
| 10,285,820 B2 | 5/2019 | Greenhalgh |
| 10,292,828 B2 | 5/2019 | Greenhalgh |
| 10,292,830 B2 | 5/2019 | Mcluen et al. |
| 10,292,835 B2 | 5/2019 | Barreiro et al. |
| 10,307,265 B2 | 6/2019 | Sack |
| 10,314,719 B2 | 6/2019 | Hessler et al. |
| 10,322,007 B2 | 6/2019 | Masson et al. |
| 10,322,010 B2 | 6/2019 | Bannigan |
| 10,327,917 B2 | 6/2019 | Glerum et al. |
| 10,350,081 B2 | 7/2019 | Seifert et al. |
| 10,350,084 B1 | 7/2019 | Lin et al. |
| 10,350,085 B2 | 7/2019 | Glerum et al. |
| 10,363,142 B2 | 7/2019 | Mcclintock et al. |
| 10,376,378 B2 | 8/2019 | Ashleigh et al. |
| 10,390,962 B2 | 8/2019 | Weiman |
| 10,390,963 B2 | 8/2019 | Olmos et al. |
| 10,398,565 B2 | 9/2019 | Bender et al. |
| 10,398,566 B2 | 9/2019 | Olmos et al. |
| 10,398,567 B2 | 9/2019 | Robinson |
| 10,398,573 B2 | 9/2019 | Duffield et al. |
| 10,405,988 B2 | 9/2019 | Grotz et al. |
| 10,405,992 B2 | 9/2019 | Sack |
| 10,413,419 B2 | 9/2019 | Thibodeau |
| 10,413,422 B2 | 9/2019 | Flower et al. |
| 10,433,975 B2 | 10/2019 | Ashleigh et al. |
| 10,441,430 B2 | 10/2019 | Ludwig et al. |
| 10,441,433 B2 | 10/2019 | Patel et al. |
| 10,449,060 B2 | 10/2019 | Sack |
| 10,485,674 B2 | 11/2019 | Perloff et al. |
| 10,485,675 B2 | 11/2019 | Sharifi-Mehr et al. |
| 10,507,116 B2 | 12/2019 | Shoshtaev |
| 10,512,551 B2 | 12/2019 | Eastlack et al. |
| 10,524,924 B2 | 1/2020 | Davenport et al. |
| 10,524,929 B2 | 1/2020 | Shoshtaev |
| 10,524,930 B2 | 1/2020 | Duffield et al. |
| 10,531,961 B2 | 1/2020 | Dinville et al. |
| 10,531,964 B2 | 1/2020 | Miller et al. |
| 10,543,106 B2 | 1/2020 | Robinson |
| 10,543,108 B2 | 1/2020 | Dvorak et al. |
| 10,548,743 B2 | 2/2020 | Faulhaber |
| 10,568,747 B2 | 2/2020 | Boehm et al. |
| 10,575,960 B2 | 3/2020 | Duffield et al. |
| 10,583,015 B2 | 3/2020 | Olmos et al. |
| 10,610,374 B2 | 4/2020 | Shulock et al. |
| 10,610,376 B2 | 4/2020 | Kuyler et al. |
| 10,610,377 B2 | 4/2020 | Baynham |
| 10,617,530 B2 | 4/2020 | Siegal et al. |
| 10,617,533 B2 | 4/2020 | Glerum et al. |
| 10,631,997 B2 | 4/2020 | Ashleigh et al. |
| 10,639,166 B2 | 5/2020 | Weiman et al. |
| 10,646,351 B2 | 5/2020 | Blain et al. |
| 10,667,922 B2 | 6/2020 | Saidha et al. |
| 10,667,925 B2 | 6/2020 | Emerick et al. |
| 10,667,927 B2 | 6/2020 | Lamborne et al. |
| 10,682,239 B2 | 6/2020 | Hsu et al. |
| 10,682,241 B2 | 6/2020 | Glerum et al. |
| 10,702,391 B2 | 7/2020 | Ameil et al. |
| 10,702,392 B2 | 7/2020 | Greenhalgh |
| 10,702,393 B2 | 7/2020 | Davenport et al. |
| 10,702,396 B2 | 7/2020 | Burrows-Ownbey et al. |
| 10,709,571 B2 | 7/2020 | Iott et al. |
| 10,709,573 B2 | 7/2020 | Weiman et al. |
| 10,709,575 B2 | 7/2020 | Robinson |
| 10,722,377 B2 | 7/2020 | Glerum et al. |
| 10,722,379 B2 | 7/2020 | Mclaughlin et al. |
| 10,722,380 B1 | 7/2020 | Berry |
| 10,729,553 B2 | 8/2020 | Bell et al. |
| 10,729,561 B2 | 8/2020 | Glerum |
| 10,744,002 B2 | 8/2020 | Glerum et al. |
| 10,751,187 B2 | 8/2020 | Allain et al. |
| 10,758,368 B2 | 9/2020 | To et al. |
| 10,758,369 B2 | 9/2020 | Rogers et al. |
| 10,758,370 B2 | 9/2020 | Gilbride et al. |
| 10,758,371 B2 | 9/2020 | Hessler et al. |
| 10,765,528 B2 | 9/2020 | Weiman et al. |
| 10,765,532 B2 | 9/2020 | Ashleigh et al. |
| 10,772,737 B2 | 9/2020 | Gray et al. |
| 10,779,955 B2 | 9/2020 | Kuyler et al. |
| 10,779,956 B2 | 9/2020 | Perrow |
| 10,779,957 B2 | 9/2020 | Weiman et al. |
| 10,786,364 B2 | 9/2020 | Davenport et al. |
| 10,786,366 B2 | 9/2020 | To et al. |
| 10,786,367 B2 | 9/2020 | Sharabani |
| 10,786,368 B2 | 9/2020 | Riemhofer et al. |
| 10,799,368 B2 | 10/2020 | Glerum et al. |
| 10,806,592 B2 | 10/2020 | Donner et al. |
| 10,835,389 B2 | 11/2020 | Errico et al. |
| 10,842,633 B2 | 11/2020 | Predick et al. |
| 10,842,640 B2 | 11/2020 | Weiman et al. |
| 10,842,641 B2 | 11/2020 | Sharabani et al. |
| 10,842,643 B2 | 11/2020 | Farris et al. |
| 10,842,649 B2 | 11/2020 | Rogers et al. |
| 10,856,997 B2 | 12/2020 | Cowan et al. |
| 10,864,086 B2 | 12/2020 | Weiman |
| 10,864,087 B2 | 12/2020 | Faulhaber et al. |
| 10,869,768 B2 | 12/2020 | Weiman et al. |
| 10,869,769 B2 | 12/2020 | Eisen et al. |
| 10,874,522 B2 | 12/2020 | Weiman |
| 10,874,523 B2 | 12/2020 | Weiman et al. |
| 10,874,524 B2 | 12/2020 | Bjork |
| 10,881,524 B2 | 1/2021 | Eisen et al. |
| 10,881,531 B2 | 1/2021 | Berry |
| 10,888,433 B2 | 1/2021 | Frasier et al. |
| 10,888,434 B2 | 1/2021 | Adamo et al. |
| 10,888,435 B2 | 1/2021 | Adamo et al. |
| 10,898,344 B2 | 1/2021 | Alheidt et al. |
| 10,925,747 B2 | 2/2021 | Bae et al. |
| 10,925,748 B2 | 2/2021 | Grim et al. |
| 10,925,752 B2 | 2/2021 | Weiman |
| 10,932,920 B2 | 3/2021 | Dewey et al. |
| 10,940,014 B2 | 3/2021 | Greenhalgh |
| 10,940,016 B2 | 3/2021 | Thommen et al. |
| 10,940,018 B2 | 3/2021 | Sharifi-Mehr et al. |
| 10,940,025 B2 | 3/2021 | O'Neil et al. |
| 10,945,725 B2 | 3/2021 | Hollis et al. |
| 10,945,857 B2 | 3/2021 | Emstad |
| 10,945,859 B2 | 3/2021 | Ewer et al. |
| 10,959,856 B2 | 3/2021 | Seifert et al. |
| 10,973,648 B1 | 4/2021 | Abdou |
| 10,973,649 B2 | 4/2021 | Weiman et al. |
| 10,973,650 B2 | 4/2021 | Stein |
| 10,973,652 B2 | 4/2021 | Hawkins et al. |
| 10,980,589 B2 | 4/2021 | Defalco et al. |
| 10,980,642 B2 | 4/2021 | Glerum et al. |
| 10,980,644 B2 | 4/2021 | Purcell et al. |
| 10,987,233 B2 | 4/2021 | Siccardi et al. |
| 10,993,757 B2 | 5/2021 | Schifano et al. |
| 10,993,814 B2 | 5/2021 | Wolters |
| 10,993,815 B2 | 5/2021 | Ewer et al. |
| 10,993,816 B2 | 5/2021 | Kieser et al. |
| 11,000,385 B2 | 5/2021 | Kalhorn et al. |
| 11,007,067 B2 | 5/2021 | Masson et al. |
| 11,013,610 B2 | 5/2021 | Vigliotti et al. |
| 11,013,614 B2 | 5/2021 | Barreiro et al. |
| 11,013,617 B2 | 5/2021 | Weiman et al. |
| 11,020,238 B2 | 6/2021 | Nichols et al. |
| 11,020,239 B2 | 6/2021 | Miller et al. |
| 11,020,241 B2 | 6/2021 | Predick |
| 11,026,800 B2 | 6/2021 | Seifert et al. |
| 11,026,804 B2 | 6/2021 | Jimenez et al. |
| 11,033,401 B2 | 6/2021 | Shoshtaev |
| 11,033,402 B2 | 6/2021 | Melkent et al. |
| 11,033,403 B2 | 6/2021 | Predick et al. |

(56) References Cited

U.S. PATENT DOCUMENTS

| | | |
|---|---|---|
| 11,033,404 B2 | 6/2021 | Faulhaber |
| 11,045,325 B2 | 6/2021 | Bernard et al. |
| 11,045,326 B2 | 6/2021 | Seifert et al. |
| 2006/0122701 A1 | 6/2006 | Kiester |
| 2008/0281346 A1 | 11/2008 | Greenhalgh |
| 2009/0281629 A1 | 11/2009 | Roebling et al. |
| 2012/0029644 A1 | 2/2012 | Markworth et al. |
| 2012/0078371 A1 | 3/2012 | Gamache et al. |
| 2012/0095559 A1 | 4/2012 | Woods et al. |
| 2013/0085572 A1 | 4/2013 | Glerum et al. |
| 2013/0116791 A1 | 5/2013 | Theofilos |
| 2014/0094917 A1 | 4/2014 | Salerni |
| 2014/0172104 A1 | 6/2014 | Dugal et al. |
| 2014/0194992 A1 | 7/2014 | Medina |
| 2014/0277501 A1 | 9/2014 | Northcutt et al. |
| 2014/0379085 A1 | 12/2014 | Duffield et al. |
| 2015/0100128 A1 | 4/2015 | Glerum et al. |
| 2015/0182347 A1 | 7/2015 | Robinson |
| 2015/0230931 A1 | 8/2015 | Greenhalgh |
| 2015/0305880 A1 | 10/2015 | Kim et al. |
| 2016/0030190 A1 | 2/2016 | Robinson |
| 2016/0095717 A1 | 4/2016 | Poulos |
| 2016/0151169 A1 | 6/2016 | Hawkins et al. |
| 2016/0166396 A1* | 6/2016 | McClintock ............ A61F 2/446 623/17.16 |
| 2016/0256291 A1 | 9/2016 | Miller |
| 2016/0310291 A1 | 10/2016 | Greenhalgh |
| 2017/0042695 A1 | 2/2017 | Foley et al. |
| 2017/0056179 A1 | 3/2017 | Lorio |
| 2017/0100255 A1 | 4/2017 | Hleihil et al. |
| 2017/0100257 A1 | 4/2017 | Weiman et al. |
| 2017/0119538 A1 | 5/2017 | Baynham |
| 2017/0165082 A1 | 6/2017 | Faulhaber |
| 2017/0181863 A1 | 6/2017 | Bjork |
| 2017/0231780 A1 | 8/2017 | D'Urso |
| 2017/0239063 A1 | 8/2017 | Predick |
| 2017/0281358 A1 | 10/2017 | Wagner et al. |
| 2017/0290677 A1 | 10/2017 | Olmos et al. |
| 2017/0319353 A1 | 11/2017 | Greenhalgh et al. |
| 2017/0333198 A1 | 11/2017 | Robinson |
| 2017/0333199 A1 | 11/2017 | Sharifi-Mehr et al. |
| 2017/0333200 A1 | 11/2017 | Arnin |
| 2017/0348115 A1 | 12/2017 | Greenhalgh et al. |
| 2017/0348116 A1 | 12/2017 | Weiman |
| 2017/0354512 A1 | 12/2017 | Weiman et al. |
| 2017/0367844 A1 | 12/2017 | Eisen et al. |
| 2017/0367845 A1 | 12/2017 | Eisen et al. |
| 2018/0064554 A1 | 3/2018 | Brett |
| 2018/0064555 A1 | 3/2018 | Poulos |
| 2018/0092753 A1 | 4/2018 | Dinville et al. |
| 2018/0110629 A1 | 4/2018 | Ewer et al. |
| 2018/0116815 A1* | 5/2018 | Kuyler ................ A61F 2/4455 |
| 2018/0161175 A1 | 6/2018 | Frasier et al. |
| 2018/0177603 A1 | 6/2018 | Weiman et al. |
| 2018/0185163 A1* | 7/2018 | Weiman ................ A61F 2/442 |
| 2018/0193164 A1 | 7/2018 | Shoshtaev |
| 2018/0207003 A1 | 7/2018 | Melkent et al. |
| 2018/0256359 A1 | 9/2018 | Greenhalgh |
| 2018/0303621 A1 | 10/2018 | Brotman et al. |
| 2018/0303625 A1 | 10/2018 | Alheidt et al. |
| 2018/0311048 A1 | 11/2018 | Glerum et al. |
| 2018/0318101 A1 | 11/2018 | Engstrom |
| 2018/0325693 A1 | 11/2018 | Weiman et al. |
| 2018/0338838 A1 | 11/2018 | Cryder et al. |
| 2018/0344476 A1 | 12/2018 | Koch |
| 2018/0360616 A1 | 12/2018 | Luu |
| 2018/0368987 A9 | 12/2018 | Davis et al. |
| 2019/0000640 A1 | 1/2019 | Weiman |
| 2019/0008654 A1 | 1/2019 | Thommen et al. |
| 2019/0021868 A1 | 1/2019 | Ludwig et al. |
| 2019/0060083 A1 | 2/2019 | Weiman et al. |
| 2019/0076263 A1 | 3/2019 | Emstad |
| 2019/0091033 A1 | 3/2019 | Dewey et al. |
| 2019/0091034 A1 | 3/2019 | Dewey et al. |
| 2019/0091036 A1 | 3/2019 | Levy et al. |
| 2019/0105174 A1 | 4/2019 | Kaufmann et al. |
| 2019/0110900 A1 | 4/2019 | Suddaby |
| 2019/0110902 A1 | 4/2019 | Vigliotti et al. |
| 2019/0133780 A1 | 5/2019 | Matthews et al. |
| 2019/0133784 A1 | 5/2019 | Gunn et al. |
| 2019/0151111 A1 | 5/2019 | Dewey |
| 2019/0151115 A1 | 5/2019 | Nichols et al. |
| 2019/0168115 A1 | 6/2019 | Deridder et al. |
| 2019/0183656 A1 | 6/2019 | Stein |
| 2019/0201209 A1 | 7/2019 | Branch et al. |
| 2019/0201210 A1 | 7/2019 | Besaw et al. |
| 2019/0224017 A1 | 7/2019 | Grim et al. |
| 2019/0224021 A1 | 7/2019 | Bae et al. |
| 2019/0231548 A1 | 8/2019 | Ewer et al. |
| 2019/0231552 A1 | 8/2019 | Sandul |
| 2019/0240039 A1 | 8/2019 | Walker et al. |
| 2019/0240043 A1 | 8/2019 | Greenhalgh |
| 2019/0254836 A1 | 8/2019 | Cowan et al. |
| 2019/0254839 A1 | 8/2019 | Nichols et al. |
| 2019/0262139 A1 | 8/2019 | Wolters |
| 2019/0262140 A1 | 8/2019 | Bannigan |
| 2019/0262141 A1 | 8/2019 | Barreiro et al. |
| 2019/0269521 A1 | 9/2019 | Shoshtaev |
| 2019/0271997 A1 | 9/2019 | Harvey |
| 2019/0274836 A1 | 9/2019 | Eisen et al. |
| 2019/0274837 A1 | 9/2019 | Eisen et al. |
| 2019/0274841 A1 | 9/2019 | Hawkes et al. |
| 2019/0274845 A1 | 9/2019 | Ludwig et al. |
| 2019/0282372 A1 | 9/2019 | Sack |
| 2019/0282373 A1 | 9/2019 | Alheidt |
| 2019/0290446 A1 | 9/2019 | Masson et al. |
| 2019/0290448 A1 | 9/2019 | Predick et al. |
| 2019/0298524 A1 | 10/2019 | Lauf et al. |
| 2019/0298540 A1 | 10/2019 | Aghayev et al. |
| 2019/0307577 A1 | 10/2019 | Predick et al. |
| 2019/0314167 A1 | 10/2019 | Bender et al. |
| 2019/0314168 A1 | 10/2019 | Faulhaber |
| 2019/0321190 A1 | 10/2019 | Wagner et al. |
| 2019/0321191 A1 | 10/2019 | Glerum et al. |
| 2019/0328540 A1 | 10/2019 | Seifert et al. |
| 2019/0328543 A1 | 10/2019 | Lin et al. |
| 2019/0328544 A1 | 10/2019 | Ashley et al. |
| 2019/0336299 A1 | 11/2019 | Bernard et al. |
| 2019/0336300 A1 | 11/2019 | Bernard et al. |
| 2019/0336301 A1 | 11/2019 | Engstrom |
| 2019/0336302 A1 | 11/2019 | Seifert et al. |
| 2019/0336303 A1 | 11/2019 | Ashleigh et al. |
| 2019/0336305 A1 | 11/2019 | Joly et al. |
| 2019/0343654 A1 | 11/2019 | Laurence et al. |
| 2019/0343655 A1 | 11/2019 | Bruffey et al. |
| 2019/0343657 A1 | 11/2019 | Duffield et al. |
| 2019/0358049 A1 | 11/2019 | Faulhaber |
| 2019/0374345 A1 | 12/2019 | Thibodeau |
| 2019/0388231 A1 | 12/2019 | Biedermann et al. |
| 2019/0388232 A1 | 12/2019 | Purcell et al. |
| 2019/0388238 A1 | 12/2019 | Lechmann et al. |
| 2020/0000606 A1 | 1/2020 | Grotz et al. |
| 2020/0000607 A1 | 1/2020 | To et al. |
| 2020/0008951 A1 | 1/2020 | Mcclintock et al. |
| 2020/0008955 A1 | 1/2020 | Ashleigh et al. |
| 2020/0015986 A1 | 1/2020 | Sack |
| 2020/0030110 A1 | 1/2020 | Sharabani et al. |
| 2020/0046514 A1 | 2/2020 | Gilbride et al. |
| 2020/0046515 A1 | 2/2020 | To et al. |
| 2020/0046516 A1 | 2/2020 | Curran et al. |
| 2020/0046517 A1 | 2/2020 | Perloff et al. |
| 2020/0054455 A1 | 2/2020 | Renani |
| 2020/0054461 A1 | 2/2020 | Marrocco et al. |
| 2020/0054463 A1 | 2/2020 | Himmelberger et al. |
| 2020/0069435 A1 | 3/2020 | Eastlack et al. |
| 2020/0078190 A1 | 3/2020 | Rogers et al. |
| 2020/0085586 A1 | 3/2020 | Ludwig et al. |
| 2020/0093603 A1 | 3/2020 | Manwill et al. |
| 2020/0093607 A1 | 3/2020 | Davenport et al. |
| 2020/0093609 A1 | 3/2020 | Shoshtaev |
| 2020/0100905 A1 | 4/2020 | Sharifi-Mehr et al. |
| 2020/0107938 A1 | 4/2020 | Faulhaber |
| 2020/0113708 A1 | 4/2020 | Dinville et al. |
| 2020/0121471 A1 | 4/2020 | Sharifi-Mehr et al. |

(56) References Cited

U.S. PATENT DOCUMENTS

| | | |
|---|---|---|
| 2020/0129306 A1 | 4/2020 | Miller et al. |
| 2020/0129307 A1 | 4/2020 | Hunziker et al. |
| 2020/0138588 A1 | 5/2020 | Lorio |
| 2020/0138594 A1 | 5/2020 | Renganath et al. |
| 2020/0138595 A1 | 5/2020 | Shoshtaev et al. |
| 2020/0138600 A1 | 5/2020 | Weiman et al. |
| 2020/0146840 A1 | 5/2020 | Black et al. |
| 2020/0146843 A1 | 5/2020 | Faulhaber |
| 2020/0170806 A1 | 6/2020 | Ashleigh et al. |
| 2020/0179135 A1 | 6/2020 | Castro |
| 2020/0188128 A1 | 6/2020 | Sack |
| 2020/0188131 A1 | 6/2020 | Mcluen et al. |
| 2020/0205992 A1 | 7/2020 | Bernard et al. |
| 2020/0205993 A1 | 7/2020 | Davenport et al. |
| 2020/0214851 A1 | 7/2020 | Kalhorn et al. |
| 2020/0222202 A1 | 7/2020 | Kuyler et al. |
| 2020/0229936 A1 | 7/2020 | Milz et al. |
| 2020/0229944 A1 | 7/2020 | Suh et al. |
| 2020/0237521 A1 | 7/2020 | Siegal et al. |
| 2020/0237525 A1 | 7/2020 | Weiman et al. |
| 2020/0246159 A1 | 8/2020 | Suh et al. |
| 2020/0253744 A1 | 8/2020 | Saidha et al. |
| 2020/0253746 A1 | 8/2020 | Duffield et al. |
| 2020/0253748 A1 | 8/2020 | Mcluen et al. |
| 2020/0261236 A1 | 8/2020 | Prevost et al. |
| 2020/0261238 A1 | 8/2020 | Robinson |
| 2020/0261241 A1 | 8/2020 | Robinson |
| 2020/0268524 A1 | 8/2020 | Glerum et al. |
| 2020/0276028 A1 | 9/2020 | Blain et al. |
| 2020/0281739 A1 | 9/2020 | Jimenez et al. |
| 2020/0281741 A1 | 9/2020 | Grotz |
| 2020/0289289 A1 | 9/2020 | Shulock et al. |
| 2020/0297506 A1 | 9/2020 | Olmos et al. |
| 2020/0297507 A1 | 9/2020 | Iott et al. |
| 2020/0297510 A1 | 9/2020 | Woodruff |
| 2020/0297511 A1 | 9/2020 | Gray et al. |
| 2020/0315679 A1 | 10/2020 | Vrionis et al. |
| 2020/0315811 A1 | 10/2020 | Cryder et al. |
| 2020/0323643 A1 | 10/2020 | Glerum et al. |
| 2020/0330239 A1 | 10/2020 | Davenport et al. |
| 2020/0330240 A1 | 10/2020 | Greenhalgh et al. |
| 2020/0330241 A1 | 10/2020 | Blain et al. |
| 2020/0337854 A1 | 10/2020 | Schmura et al. |
| 2020/0337862 A1 | 10/2020 | Baker et al. |
| 2020/0345511 A1 | 11/2020 | Daffinson et al. |
| 2020/0345512 A1 | 11/2020 | Zakelj |
| 2020/0345513 A1 | 11/2020 | Glerum et al. |
| 2020/0352730 A1 | 11/2020 | Bell et al. |
| 2020/0352732 A1 | 11/2020 | To et al. |
| 2020/0352738 A1 | 11/2020 | Berry |
| 2020/0352740 A1 | 11/2020 | Vazifehdan et al. |
| 2020/0360151 A1 | 11/2020 | Kuyler et al. |
| 2020/0360152 A1 | 11/2020 | Kim et al. |
| 2020/0360153 A1 | 11/2020 | Weiman et al. |
| 2020/0360156 A1 | 11/2020 | Knapp et al. |
| 2020/0368034 A1 | 11/2020 | Etminan |
| 2020/0368035 A1 | 11/2020 | Gilbride et al. |
| 2020/0375751 A1 | 12/2020 | Dinville et al. |
| 2020/0375752 A1 | 12/2020 | Ashleigh et al. |
| 2020/0375753 A1 | 12/2020 | Mclaughlin et al. |
| 2020/0375755 A1 | 12/2020 | Cain |
| 2020/0383798 A1 | 12/2020 | Butler et al. |
| 2020/0383799 A1 | 12/2020 | Cain |
| 2020/0390565 A1 | 12/2020 | Jimenez et al. |
| 2020/0397593 A1 | 12/2020 | Davenport et al. |
| 2020/0405497 A1 | 12/2020 | Olmos et al. |
| 2020/0405499 A1 | 12/2020 | Gerbec et al. |
| 2020/0405500 A1 | 12/2020 | Marden et al. |
| 2021/0000160 A1 | 1/2021 | Olmos et al. |
| 2021/0000610 A1 | 1/2021 | Rogers et al. |
| 2021/0007860 A1 | 1/2021 | Glerum et al. |
| 2021/0015627 A1 | 1/2021 | Weiman et al. |
| 2021/0015631 A1 | 1/2021 | Davenport et al. |
| 2021/0022884 A1 | 1/2021 | Oglaza et al. |
| 2021/0030555 A1 | 2/2021 | Weiman et al. |
| 2021/0030556 A1 | 2/2021 | Perrow |
| 2021/0030557 A1 | 2/2021 | Robinson |
| 2021/0030560 A1 | 2/2021 | Abu-Mulaweh et al. |
| 2021/0030561 A1 | 2/2021 | Gleason |
| 2021/0038406 A1 | 2/2021 | Pimenta et al. |
| 2021/0052395 A1 | 2/2021 | Iott et al. |
| 2021/0059839 A1 | 3/2021 | Hessler et al. |
| 2021/0068959 A1 | 3/2021 | Mcluen et al. |
| 2021/0068973 A1 | 3/2021 | Mcluen et al. |
| 2021/0068974 A1 | 3/2021 | Cowan et al. |
| 2021/0068976 A1 | 3/2021 | Predick et al. |
| 2021/0068977 A1 | 3/2021 | Faulhaber |
| 2021/0068982 A1 | 3/2021 | Carnes et al. |
| 2021/0069584 A1 | 3/2021 | Deridder et al. |
| 2021/0077157 A1 | 3/2021 | Bosio et al. |
| 2021/0077272 A1 | 3/2021 | Eisen et al. |
| 2021/0077273 A1 | 3/2021 | Sharabani et al. |
| 2021/0077274 A1 | 3/2021 | Robie |
| 2021/0085485 A1 | 3/2021 | Reimhofer et al. |
| 2021/0085486 A1 | 3/2021 | Burrows-Ownbey et al. |
| 2021/0093463 A1 | 4/2021 | Eisen et al. |
| 2021/0093467 A1 | 4/2021 | Adamo et al. |
| 2021/0106430 A1 | 4/2021 | Mermuys et al. |
| 2021/0106434 A1 | 4/2021 | Alheidt et al. |
| 2021/0113347 A1 | 4/2021 | Fessler et al. |
| 2021/0113348 A1 | 4/2021 | Lopez |
| 2021/0113349 A1 | 4/2021 | Weiman et al. |
| 2021/0113350 A1 | 4/2021 | Adamo et al. |
| 2021/0121299 A1 | 4/2021 | Hyder |
| 2021/0121300 A1 | 4/2021 | Weiman et al. |
| 2021/0128315 A1 | 5/2021 | Predick |
| 2021/0137685 A1 | 5/2021 | Kahmer et al. |
| 2021/0137697 A1 | 5/2021 | Weiman |
| 2021/0137699 A1 | 5/2021 | Jang et al. |
| 2021/0145600 A1 | 5/2021 | Sharifi-Mehr et al. |
| 2021/0145607 A1 | 5/2021 | Kuyler et al. |
| 2021/0154021 A1 | 5/2021 | Bae et al. |
| 2021/0161678 A1 | 6/2021 | Dewey et al. |
| 2021/0161682 A1 | 6/2021 | O'Neil et al. |
| 2021/0169656 A1 | 6/2021 | Hawkins et al. |
| 2021/0169659 A1 | 6/2021 | Grim et al. |
| 2021/0177618 A1 | 6/2021 | Branch et al. |
| 2021/0177619 A1 | 6/2021 | Voellmicke et al. |
| 2021/0186706 A1 | 6/2021 | Spitler et al. |
| 2021/0259848 A1 | 8/2021 | Kang et al. |
| 2022/0387184 A1* | 12/2022 | Josse .................. A61F 2/30749 |
| 2023/0293314 A1* | 9/2023 | Davis .................. A61F 2/30749 606/86 A |

FOREIGN PATENT DOCUMENTS

| | | |
|---|---|---|
| DE | 102013102955 B4 | 7/2017 |
| DE | 202017105466 U1 | 9/2017 |
| DE | 102018206693 B3 | 2/2019 |
| DE | 102015101675 B4 | 3/2019 |
| EP | 0977529 B1 | 2/2003 |
| EP | 1001722 B1 | 10/2003 |
| EP | 1014899 B1 | 8/2004 |
| EP | 1532949 B1 | 7/2007 |
| EP | 1698305 B1 | 8/2007 |
| EP | 1290985 B1 | 4/2008 |
| EP | 1925272 B1 | 1/2010 |
| EP | 1843723 B1 | 3/2010 |
| EP | 1372540 B1 | 11/2010 |
| EP | 1706075 B1 | 1/2011 |
| EP | 1903994 B9 | 6/2011 |
| EP | 1385457 B1 | 10/2011 |
| EP | 1793768 B1 | 11/2011 |
| EP | 2157938 B1 | 2/2012 |
| EP | 1699389 B1 | 4/2012 |
| EP | 1718216 B1 | 4/2012 |
| EP | 2226039 B1 | 11/2015 |
| EP | 2967659 A1 | 1/2016 |
| EP | 2967906 A1 | 1/2016 |
| EP | 2719360 B1 | 5/2016 |
| EP | 3016617 A2 | 5/2016 |
| EP | 3031424 A1 | 6/2016 |
| EP | 2729092 B1 | 9/2016 |
| EP | 2508150 B1 | 10/2016 |

(56) References Cited

FOREIGN PATENT DOCUMENTS

| | | | |
|---|---|---|---|
| EP | 2931181 | B1 | 10/2016 |
| EP | 3076903 | A1 | 10/2016 |
| EP | 3169279 | A1 | 5/2017 |
| EP | 3213720 | A1 | 9/2017 |
| EP | 2967917 | B1 | 11/2017 |
| EP | 3247315 | A1 | 11/2017 |
| EP | 3263072 | A1 | 1/2018 |
| EP | 2654627 | B1 | 3/2018 |
| EP | 3294223 | A1 | 3/2018 |
| EP | 3315095 | A1 | 5/2018 |
| EP | 3344194 | A1 | 7/2018 |
| EP | 3345575 | A1 | 7/2018 |
| EP | 2793760 | B1 | 8/2018 |
| EP | 3362000 | A1 | 8/2018 |
| EP | 3366263 | A1 | 8/2018 |
| EP | 2904991 | B1 | 10/2018 |
| EP | 3397212 | A1 | 11/2018 |
| EP | 2051660 | B1 | 2/2019 |
| EP | 2735286 | B1 | 3/2019 |
| EP | 2747714 | B1 | 4/2019 |
| EP | 3474782 | A2 | 5/2019 |
| EP | 3474783 | A2 | 5/2019 |
| EP | 3474784 | A2 | 5/2019 |
| EP | 2961352 | B1 | 6/2019 |
| EP | 2611395 | B1 | 7/2019 |
| EP | 3240506 | B1 | 7/2019 |
| EP | 3247295 | B1 | 8/2019 |
| EP | 3253335 | B1 | 8/2019 |
| EP | 2958525 | B1 | 9/2019 |
| EP | 3534811 | A1 | 9/2019 |
| EP | 2838454 | B1 | 10/2019 |
| EP | 3177233 | B1 | 10/2019 |
| EP | 2764851 | B1 | 11/2019 |
| EP | 3324895 | B1 | 11/2019 |
| EP | 3568109 | A1 | 11/2019 |
| EP | 3621554 | A1 | 3/2020 |
| EP | 3622920 | A1 | 3/2020 |
| EP | 3638157 | A1 | 4/2020 |
| EP | 2967901 | B1 | 5/2020 |
| EP | 3435924 | B1 | 5/2020 |
| EP | 3310304 | B1 | 9/2020 |
| EP | 3384877 | B1 | 10/2020 |
| EP | 3727207 | A1 | 10/2020 |
| EP | 3742990 | A1 | 12/2020 |
| EP | 3818965 | A1 | 5/2021 |
| ES | 2361099 | B1 | 5/2012 |
| FR | 2763836 | B1 | 7/1999 |
| FR | 2866228 | B1 | 9/2006 |
| FR | 2981261 | B1 | 11/2013 |
| FR | 3058043 | B1 | 11/2020 |
| WO | 2006134262 | A1 | 12/2006 |
| WO | WO2014144696 | A1 | 9/2014 |
| WO | WO2016127139 | A1 | 8/2016 |
| WO | WO2019023251 | A1 | 1/2019 |
| WO | WO2019079090 | A1 | 4/2019 |
| WO | WO2019161393 | A1 | 8/2019 |
| WO | WO2019165152 | A1 | 8/2019 |
| WO | WO2019165157 | A1 | 8/2019 |
| WO | WO2019169036 | A1 | 9/2019 |
| WO | WO2019170739 | A1 | 9/2019 |
| WO | WO2019170744 | A1 | 9/2019 |
| WO | WO2019191745 | A1 | 10/2019 |
| WO | WO2019246441 | A1 | 12/2019 |
| WO | WO2020084158 | A1 | 4/2020 |
| WO | WO2020095745 | A1 | 5/2020 |
| WO | WO2020104788 | A1 | 5/2020 |
| WO | WO2020104790 | A1 | 5/2020 |
| WO | WO2020104792 | A1 | 5/2020 |
| WO | WO2020209722 | A1 | 10/2020 |
| WO | WO2020251943 | A1 | 12/2020 |

OTHER PUBLICATIONS

US 11,026,806 B2, 06/2021, Olmos et al. (withdrawn)
International Search Report and Written Opinion for corresponding PCT Appl. No. PCT/EP2024/051180 mailed May 22, 2024.
Extended European Search Report for corresponding EP Application No. 21186249.5 dated Jan. 17, 2022 (7 pages).
Extended European Search Report for corresponding EP Application No. 21186250.3 dated Jan. 31, 2022 (13 pages).
Extended European Search Report for corresponding EP Application No. 21186251.1 dated Jan. 28, 2022 (11 pages).
Extended European Search Report for corresponding EP Application No. 21186272.7 dated Mar. 2, 2022 (9 pages).
International Search Report and Written Opinion for corresponding PCT Application No. PCT/EP2022/069885 mailed Oct. 19, 2022 (9 pages).
International Search Report and Written Opinion for corresponding PCT Application No. PCT/EP2022/069886 mailed Nov. 3, 2022 (13 pages).
International Search Report and Written Opinion for corresponding PCT Application No. PCT/EP2022069888 mailed Nov. 8, 2022 (13 pages).
International Search Report and Written Opinion for corresponding PCT Application No. PCT/EP2022069906 mailed Nov. 7, 2022 (13 pages).

\* cited by examiner

ADJUSTABLE SPINAL IMPLANTS AND RELATED DEPLOYMENT INSTRUMENTS

CROSS-REFERENCE TO RELATED APPLICATIONS

This application claims priority to U.S. Provisional Application Ser. No. 63/439,749, filed Jan. 18, 2023, and is related to the following commonly assigned patent applications: (1) U.S. application Ser. No. 17/865,755 filed Jul. 15, 2022, which claims the benefit of priority to U.S. provisional application Nos. 63/222,482, 63/222,498 and 63,222,506, all of which were filed Jul. 16, 2021; and (2) International Patent Application No. PCT/EP2022/069886 filed Jul. 15, 2022, which claims benefit of priority to U.S. provisional application No. 63/222,498 as well as European Patent Application Nos. 21186520.3 and 21186272.7, all of which were filed Jul. 16, 2021, the complete disclosures of which are incorporated herein by reference in their entirety for all purposes.

TECHNICAL FIELD

The present disclosure relates to implantable devices for stabilizing and/or promoting the fusion of adjacent bony structures and, more particularly, to implantable spinal fusion cages that can adjust in height and/or angle to accommodate spacing constraints and/or address lordosis within an intervertebral space.

BACKGROUND

Implantable spinal devices can be used to treat a variety of spinal disorders, including degenerative disc disease. For example, in one type of spinal disorder, the intervertebral disc has deteriorated or become damaged due to acute injury or trauma, disc disease or simply the natural aging process. The standard treatment today may involve surgical removal of a portion, or all, of the diseased or damaged intervertebral disc in a process known as a partial or total discectomy, respectively. The discectomy is often followed by the insertion of an interbody cage or spacer to stabilize this weakened or damaged spinal region and/or to restore disc height. This cage or spacer serves to reduce or inhibit mobility in the treated area, in order to avoid further progression of the damage and/or to reduce or alleviate pain caused by the damage or injury. Moreover, these types of cages or spacers serve as mechanical or structural scaffolds to restore and maintain normal disc height, and in some cases, can also provide a space for inserting bone graft material to promote bony fusion between the adjacent vertebrae.

One of the current challenges of these types of procedures is the very limited working space afforded the surgeon to manipulate and insert the cage into the intervertebral area to be treated. Access to the intervertebral space requires navigation around retracted adjacent vessels and tissues such as the aorta, vena cava, dura and nerve roots, leaving a very narrow pathway for access. The opening to the intradiscal space itself is also relatively small. Hence, there are physical limitations on the actual size of the cage that can be inserted without significantly disrupting the surrounding tissue or the vertebral bodies themselves.

Further complicating the issue is the fact that the vertebral bodies are not positioned parallel to one another in a normal spine. There is a natural curvature to the spine due to the angular relationship of the vertebral bodies relative to one another. The ideal interbody fusion cage must be able to accommodate this angular relationship of the vertebral bodies, or else the cage will not sit properly when inside the intervertebral space. An improperly fitted cage would either become dislodged or migrate out of position, and lose effectiveness over time, or worse, further damage the already weakened area.

Another challenge with implanting interbody fusion cages is that, in order to insert the cage between the adjacent vertebra, at least a portion, if not all, of the intervertebral disc is removed to make room for the cage. The removal of the entire disc or disc portion disrupts the normal lordotic or kyphotic curvature of the spine. Traditional fusion cages do not attempt to correct this curvature, and over time as the vertebrae settle around the implanted cages, kyphotic deformity results.

It is therefore desirable to provide implantable spinal devices that have the ability to maintain and restore the normal anatomy of the fused spine segment. It is particularly desirable to provide interbody cages or spacers that not only have the mechanical strength or structural integrity to restore disc height or vertebral alignment to the spinal segment to be treated, but also can easily pass through the narrow access pathway into the intervertebral space, and accommodate the angular constraints of this space and/or correct the lordotic or kyphotic curvature created by removal of the disc.

SUMMARY

The present disclosure provides adjustable spinal devices and related instruments for their deployment. The present disclosure further provides methods for adjusting the height and/or lordosis angles of the spinal devices, and methods for implanting such devices to treat spinal conditions or disorders.

In one aspect, an adjustable spinal fusion device includes an upper plate component having an outer surface for placement against a first vertebral body, and a lower plate component having an outer surface for placement against a second vertebral body. The device further includes a translation member configured to move longitudinally relative to the upper and lower plates to adjust an angle between the upper and lower plates (e.g., the angle of lordosis of the implant). A locking member is coupled to the translation member and configured to secure a longitudinal position of the translation member relative to the upper and lower endplates.

The device has a first configuration for advancing through a narrow access pathway into the intervertebral space, and a second configuration, wherein the device may be adjusted in angle to accommodate the angular constraints of this space and/or correct the lordotic or kyphotic curvature. The locking member is movable between an unlocked position, wherein the translation member is capable of moving in the longitudinal direction, to a locked position, wherein the translation member is inhibited from moving in the longitudinal direction. This ensures that the angle of lordosis can only be adjusted when the locking member is in the unlocked position. For example, the locking member may be in the locked position when the device is advanced through a narrow access pathway into the intervertebral space to ensure that the upper and lower endplates remain fixed relative to each other until the surgeon is ready to adjust lordosis. At this point, the locking member may be moved into the unlocked position to allow for angle adjustment of the endplates.

In some embodiments, the translation member comprises a bore having one or more mating features for cooperating with an actuator shaft of a surgical instrument to move the translation member in the longitudinal direction. The locking member is rotatably coupled to the translation member within the bore for movement between the locked and unlocked positions. The locking member may comprise one or more mating features for cooperating with the actuator shaft of the surgical instrument such that rotation of at least a portion of the surgical instrument causes rotation of the locking member within the bore.

In some embodiments, the device comprises one or more engagement elements coupled to, or integral with, one of the upper and lower endplates. The locking member comprises one or more locking members that engage the engagement elements in one of the upper and lower endplates in the locked position. In an exemplary embodiment, the locking members of the locking member comprise a plurality of projections and the engagement elements of one of the upper and lower endplates comprise a plurality of teeth that engage the projections in the locked position.

In some embodiments, rotation of the locking member into the unlocked position causes the mating features of the translation member to secure to mating features of the surgical instrument. This secures at least a portion of the surgical instrument to the translation member, allowing the translation member to be advanced longitudinally relative to the upper and lower endplates when the locking member is in the unlocked position.

In some embodiments, the upper and lower endplates each have proximal and distal ends. The proximal ends are pivotally coupled to each other and the distal ends are movable relative to each other to adjust a distance therebetween. The translation member may comprise an angled surface extending downward from the upper endplate towards the lower endplate in the proximal direction. The device may further comprise a ramp for cooperating with the angled surface of the translation member.

The device may comprise a hinge pivotally coupling the internal support member to the lower endplate. In certain embodiments, proximal translation of the translation member causes the angled surface to engage the ramp and move the distal end of the upper endplate away from the distal end of the lower endplate such that the proximal ends of the endplates remain substantially fixed relative to each other as the distal ends are moved apart.

In one embodiment, the upper endplate comprises the ramp. In another embodiment, the device further comprises an internal support member coupled to, or integral with, the upper endplate and pivotally coupled to the lower endplate. In this embodiment, the internal support member comprises the ramp.

In certain embodiments, longitudinal translation of the translation member also adjusts a height of the endplates. In one such embodiment, the upper endplate comprises proximal and distal ramps and the translation member comprises proximal and distal angled surfaces for cooperating with the proximal and distal ramps of the upper endplate to adjust a distance between the proximal and distal ends of the endplates. Thus, longitudinal movement of the translation member relative to the endplates results in adjustment of both the angle and the height of the endplates.

In certain embodiments, the device may comprise a second translation member. Longitudinal movement of the second translation member relative to the first translation member adjusts the height between the upper and lower endplates. This allows for independent adjustment of the devices height and angle after it has been implanted between the vertebral bodies. The second translation member may include a second movable wedge with at least one angled surface. The upper and lower endplates may each comprise a ramp for cooperating with the angled surface of the second movable wedge of the second translation member such that longitudinal movement of the second movable wedge adjusts a distance between the proximal ends of the upper and lower endplates.

In some embodiments, the upper and lower endplates are separate components. They may be manufactured separately, or manufactured together and then separated. In embodiments, the translation member, the internal support member and/or the lower endplate comprise at least one projection, such as a pin, extending laterally away from the longitudinal axis. The upper endplate comprises an opening or slot for receiving the projection. The projection(s) are configured to pass through the opening(s) to couple the endplates to each other. In certain embodiments, the projection(s) are located on the translation member and are configured to slide within slot(s) to stabilize the upper and lower endplates during longitudinal movement of the first translation member.

In some embodiments, the device comprises a mechanism for providing discrete "steps" in the movement of the translation member relative to the endplates. These steps correlate with height and/or angle adjustments of the endplates. In one such embodiment, the translation member comprises a plurality of projections and one of the upper or lower endplates comprise a plurality of teeth that cooperate with the projections. The projections move relative to the teeth as the translation member is moved longitudinally. The teeth may comprise spaces therebetween that provide discrete increments of angle and/or height adjustment for the endplates.

In some embodiments, the device is fabricated through additive manufacturing techniques, such as 3D printing. The implant may be formed layer by layer, such as in one example, in the longitudinal direction from the proximal end to the distal end. Upon completion of manufacturing, the upper and lower endplates are separated from each other and remain together during use by the projections that extend through the openings of the upper endplate.

In one such embodiment, the device further comprises a support member pivotally coupled to the lower endplate and the one or more projections extend laterally outward form the support member. In another embodiment, the openings are slots and the translation member comprises one or more projections extending laterally therefrom and through the slots to couple the translation member to the upper endplate. In yet another embodiment, the device further comprising a flexible hinge coupling the upper endplate to the lower endplate. The flexible hinge may comprise a leaf spring having a proximal end coupled to the lower endplate and a distal end coupled to the upper endplate.

In some embodiments, at least one of the upper and lower endplates comprises a surface with one or more exhaust openings for extracting metal powder from within the device. This allows more efficient extraction of metal powder that may, for example, remain in the cage after 3D printing.

In another aspect, a spinal fusion system comprises an adjustable spinal fusion device having an upper endplate with an outer surface for placement against a first vertebral body and a lower endplate with an outer surface for placement against a second vertebral body. The device includes a translation member configured to move longitudinally relative to the upper and lower plates to adjust an angle and/or a distance between the upper and lower plates. A locking member is coupled to the translation member and configured to secure a longitudinal position of the translation member relative to the upper and lower endplates. The system further comprises an instrument having a proximal handle, an elongate shaft and a mating feature on the elongate shaft for cooperating with the locking member. An actuator on the elongate shaft is coupled to the proximal handle for moving the translation member longitudinally relative to the upper and lower endplates.

In some embodiments, the mating feature on the surgical instrument is configured to rotate the locking member from an unlocked position, wherein the translation member is capable of moving in the longitudinal direction, to a locked position, wherein the translation member is inhibited from moving in the longitudinal direction.

The instrument may comprise a second mating feature coupled to the actuator. The translation member comprises a bore having one or more engagement elements for cooperating with the second mating feature to secure the translation member to the instrument such that longitudinal movement of the instrument causes the translation member to move longitudinally relative to the upper and lower endplates.

The locking member may be rotatably coupled to the translation member within the bore such that rotation of the locking member into the unlocked position causes the engagement features of the translation member to secure to the second mating feature of the surgical instrument. In one embodiment, the second mating feature comprises one or more projections extending from a distal end of the shaft of the surgical instrument and the engagement features of the translation member comprise one or more recesses in an interior surface of the bore. The first mating feature may be located proximal to the second mating feature on the elongate shaft.

In some embodiments, the device comprises one or more engagement elements coupled to one of the upper and lower endplates. The locking member comprises one or more locking members that engage the engagement elements in one of the upper and lower endplates in the locked position. In an exemplary embodiment, the locking members of the locking member comprise a plurality of projections and the engagement elements of one of the upper and lower endplates comprise a plurality of teeth that engage the projections in the locked position.

In some embodiments, the upper and lower endplates each have proximal and distal ends. The proximal ends are pivotally coupled to each other and the distal ends are movable relative to each other to adjust a distance therebetween. The translation member may comprise an angled surface extending downward from the upper endplate towards the lower endplate in the proximal direction. The device may further comprise a ramp for cooperating with the angled surface of the translation member.

The device may comprise a hinge pivotally coupling the internal support member to the lower endplate. In certain embodiments, proximal translation of the translation member causes the angled surface to engage the ramp and move the distal end of the upper endplate away from the distal end of the lower endplate such that the proximal ends of the endplates remain substantially fixed relative to each other as the distal ends are moved apart.

In one embodiment, the upper endplate comprises the ramp. In another embodiment, the device further comprises an internal support member coupled to, or integral with, the upper endplate and pivotally coupled to the lower endplate. The lower internal support member comprises the ramp.

In certain embodiments, longitudinal translation of the translation member also adjusts a height of the endplates. In one such embodiment, the upper endplate comprises proximal and distal ramps and the translation member comprises proximal and distal angled surfaces for cooperating with the proximal and distal ramps of the upper endplate to adjust a distance between the proximal and distal ends of the endplates. Thus, longitudinal movement of the translation member relative to the endplates results in adjustment of both the angle and height of endplates.

In certain embodiments, the device may comprise a second translation member. Longitudinal movement of the second translation member relative to the first translation member adjusts the height between the upper and lower endplates. This allows for independent adjustment of the devices height and angle after it has been implanted between the vertebral bodies. The second translation member may include a second movable wedge with at least one angled surface. The upper and lower endplates may each comprise a ramp for cooperating with the angled surface of the second movable wedge of the second translation member such that longitudinal movement of the second movable wedge adjusts a distance between the proximal ends of the upper and lower endplates.

In another aspect, a method for implanting a spinal fusion device in a patient comprises coupling a distal end of a surgical instrument to the spinal fusion device and positioning the spinal fusion device between first and second vertebrae in the patient. A first portion of the surgical instrument is actuated to unlock a translation member within the spinal fusion device. A second portion of the surgical instrument is translated longitudinally to advance the translation member in a longitudinal direction relative to upper and lower endplates of the spinal fusion device to adjust an angle between the upper and lower endplates.

In some embodiments, the first portion of the surgical instrument is rotated to rotate a locking member into a locked position and thereby lock the longitudinal position of the translation member relative to the upper and lower endplates.

In some embodiments, the method further comprises translating the second portion of the surgical instrument longitudinally to adjust a height between the upper and lower endplates.

In some embodiments, the method comprises inserting a distal end of a shaft of the surgical instrument through a bore in the translation member and rotating the distal end of the shaft to lock the instrument to the translation member. In an exemplary embodiment, The translation member comprises one or more recesses within an interior surface of the bore and the shaft comprises one or more projections, wherein the method further comprises rotating the projections into the recesses such that the translation member is moved into the unlocked position.

In another aspect, a surgical instrument for implanting a spinal fusion device in a patient comprises an elongate shaft having a proximal handle and a distal end portion. The shaft includes a first mating feature for securing the shaft of the instrument to the spinal fusion device, a second mating feature on the distal end portion for engaging a translation member of the spinal fusion device and a third mating feature on the distal end portion for engaging a locking member of the spinal fusion device.

In some embodiments, the instrument comprises a rod extending through a lumen of the shaft and the first and second mating features are positioned on a distal portion of the rod. The rod may be rotatable relative to the shaft to rotate the locking member of the spinal fusion device. The rod may be configured to translate in a longitudinal direction relative to the shaft to translate the translation member of the spinal fusion device.

In some embodiments, the first mating feature comprises first and second gripping arms configured to engage and secure to a proximal portion of the spinal fusion device. The second mating feature comprises one or more projections extending from the distal portion of the rod and the third mating feature comprises one or more projections extending from the distal portion of the rod proximal to the second mating feature. In an exemplary embodiment, the projections of the second mating feature are distal to the projections of the first mating feature on the rod of the instrument. In an exemplary embodiment, the second mating feature is configured to secure to the translation member when the third mating feature moves the locking member into an unlocked position that allows translation of the translation member.

In some embodiments, the instrument comprises a rotatable knob on the proximal handle coupled to the rod and configured to translate the rod relative to the shaft.

In some embodiments, the instrument comprises a gauge on the proximal handle coupled to the rotatable knob and configured to indicate a lordosis angle of first and second endplates on the spinal fusion device.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DESCRIPTION OF THE EMBODIMENTS

Figure 1:
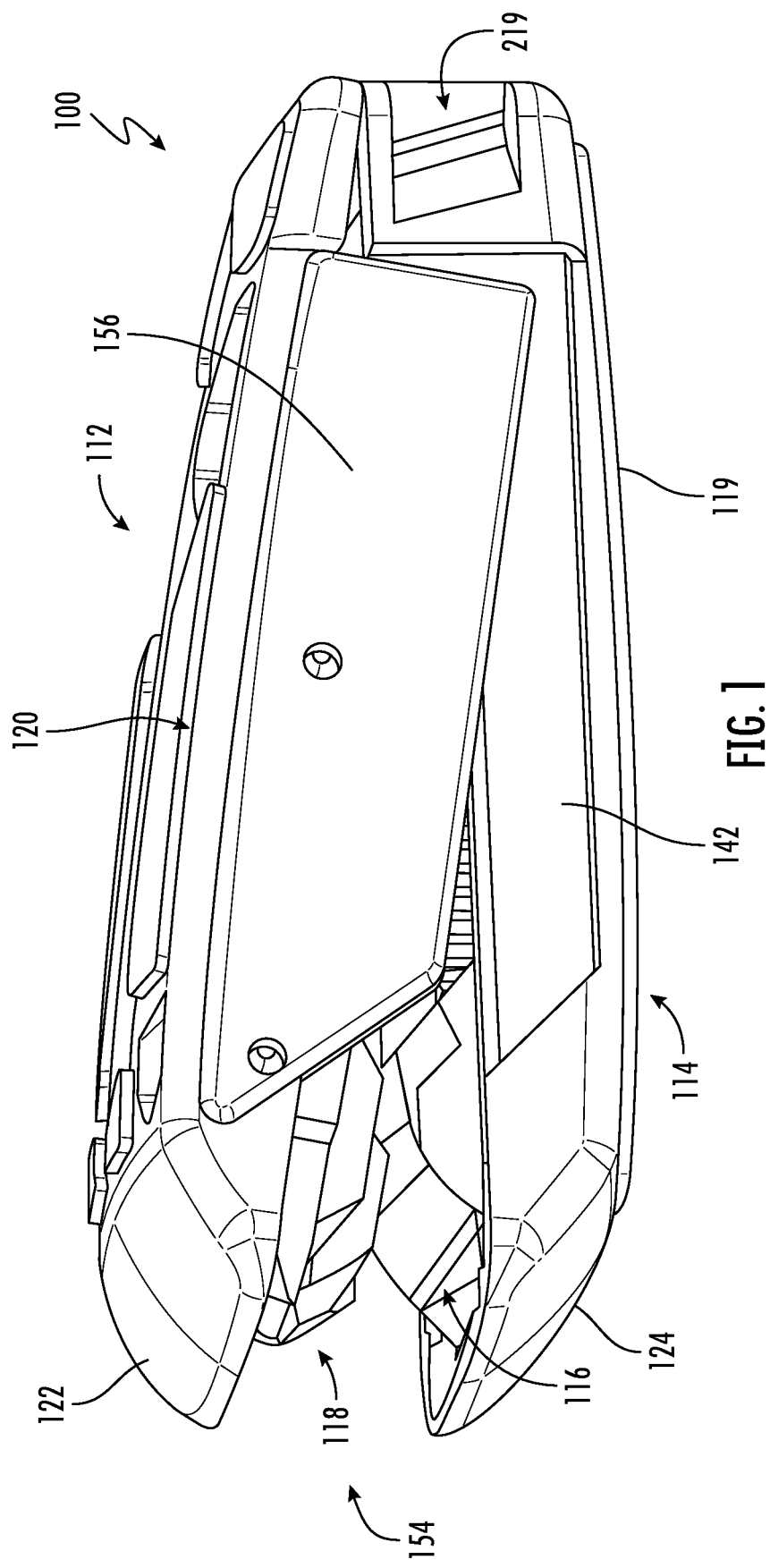
FIG. 1 is a perspective view of one embodiment of an adjustable implantable spinal device.
Figure 2:
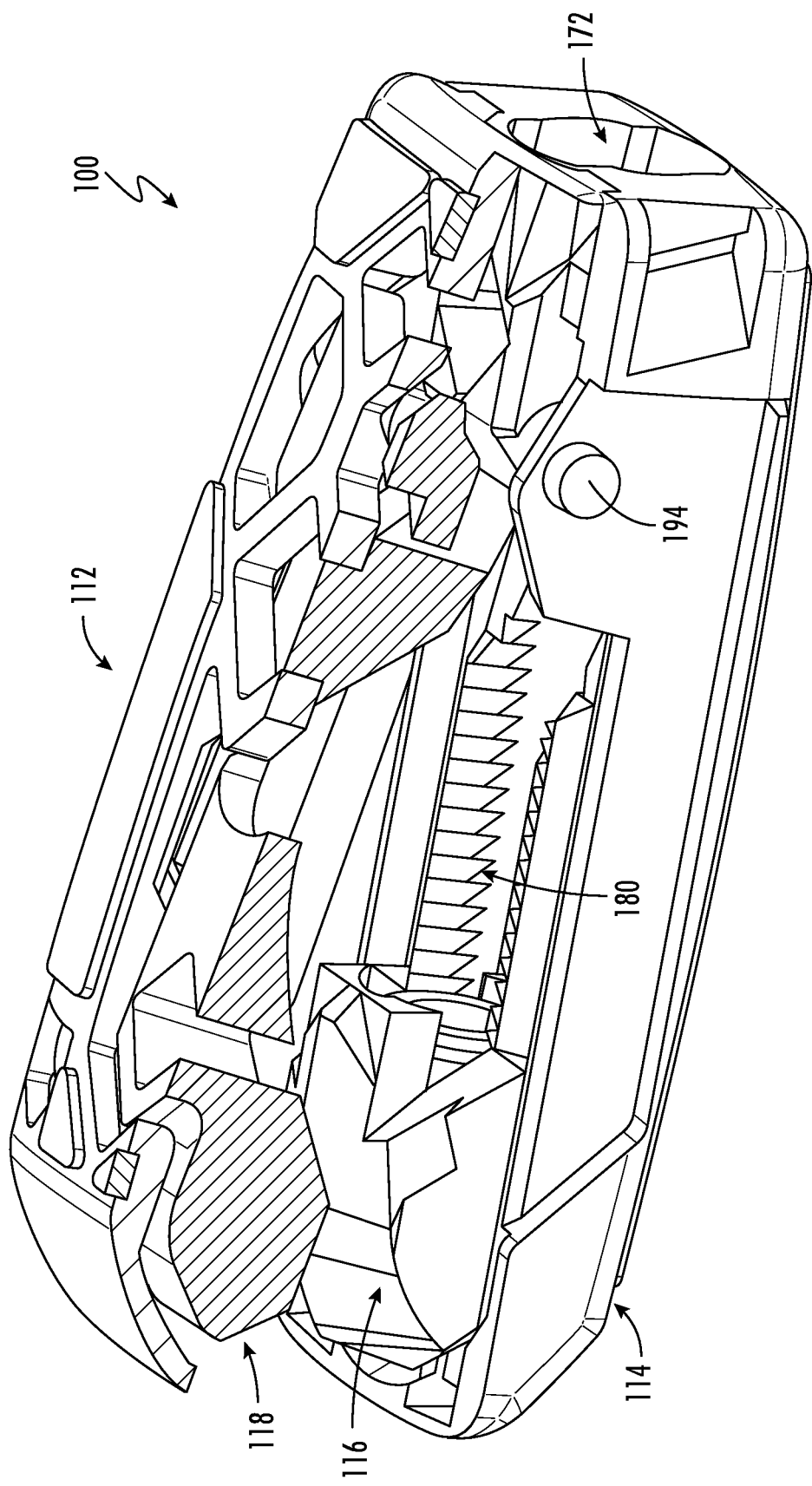
FIG. 2 is a partial cutaway view of the spinal device of FIG. 1.
Figure 3:
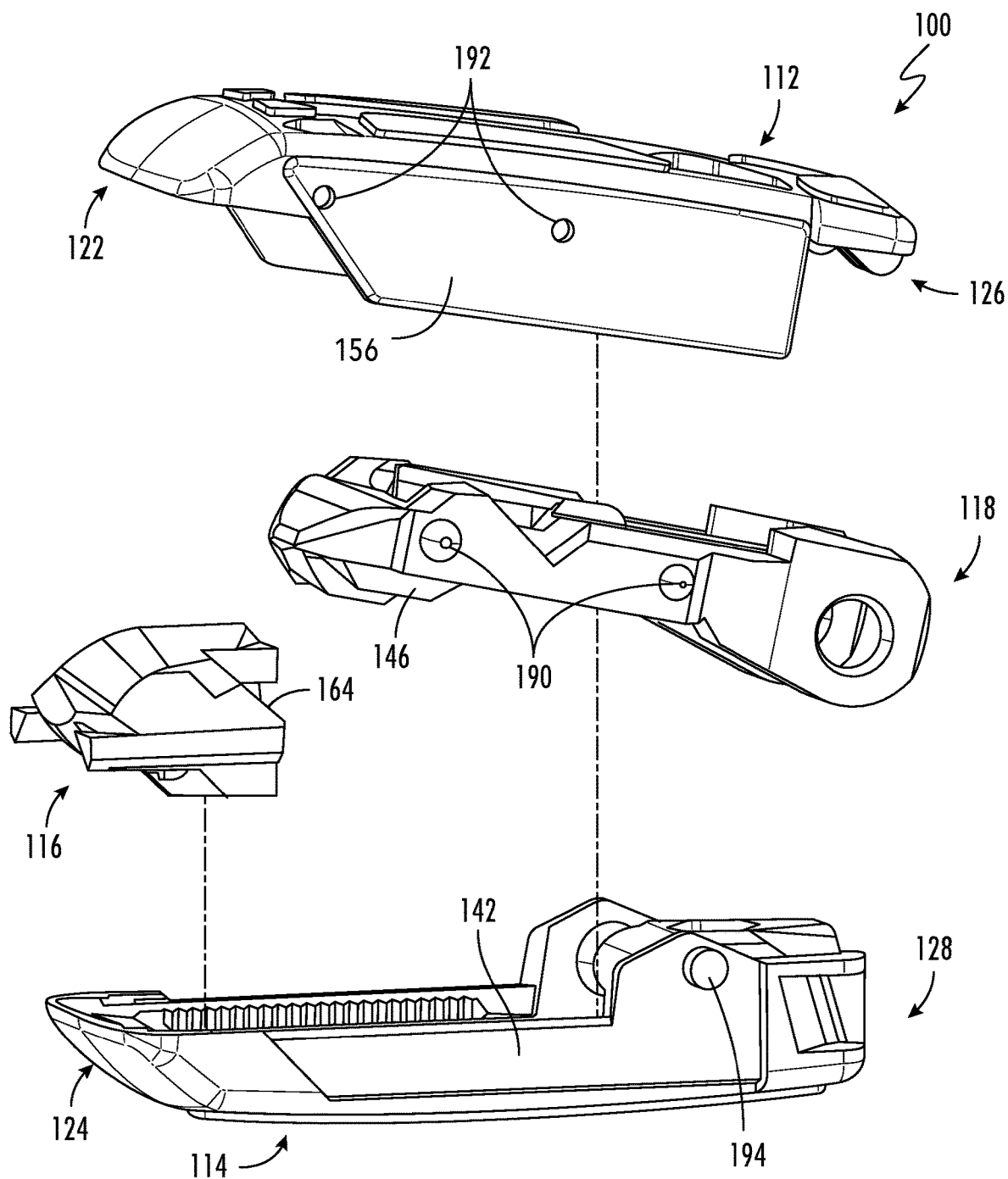
FIG. 3 is an exploded view of the device of FIG. 1.

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Referring now to FIGS. 1-7, one embodiment of a spinal implant 100 according to the present disclosure is configured for placement between two vertebral bodies. In some embodiments, implant 100 is particularly useful for placement from a posterior approach outside of the facet joint (transforaminal lumbar interbody fusion or TLIF), although it will be recognized that the implants disclosed herein may be employed in a variety of different surgical approaches, such as anterior lumbar interbody fusion (ALIF), posterior lumbar interbody fusion (PLIF) and/or lateral lumbar interbody fusion (LLIF).

As shown, implant 100 includes upper and lower endplates 112, 114, an internal support member 118 and a translation member 116. In this embodiment, the angle of lordosis between upper and lower endplates 112, 114 may be adjusted. However, the overall height or distance between the endplates is not adjustable. More specifically, the distance between distal ends 122, 124 of endplates 112, 114 may be adjusted whereas the distance between proximal ends 126, 128 generally remains substantially fixed.

Figure 8A:
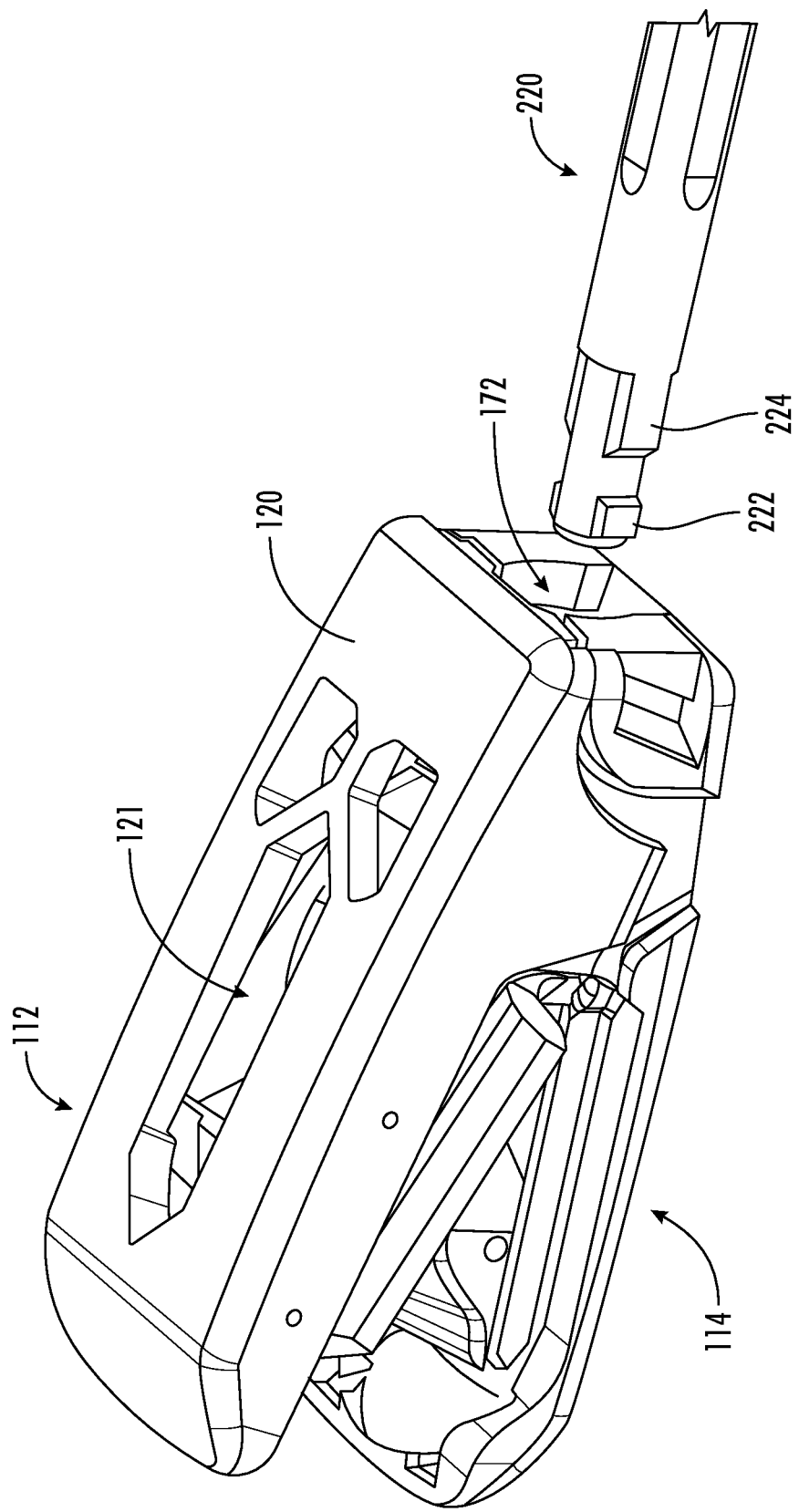
FIG. 8A illustrates a perspective view of the spinal device and a distal tip of a surgical instrument.
Figure 8B:
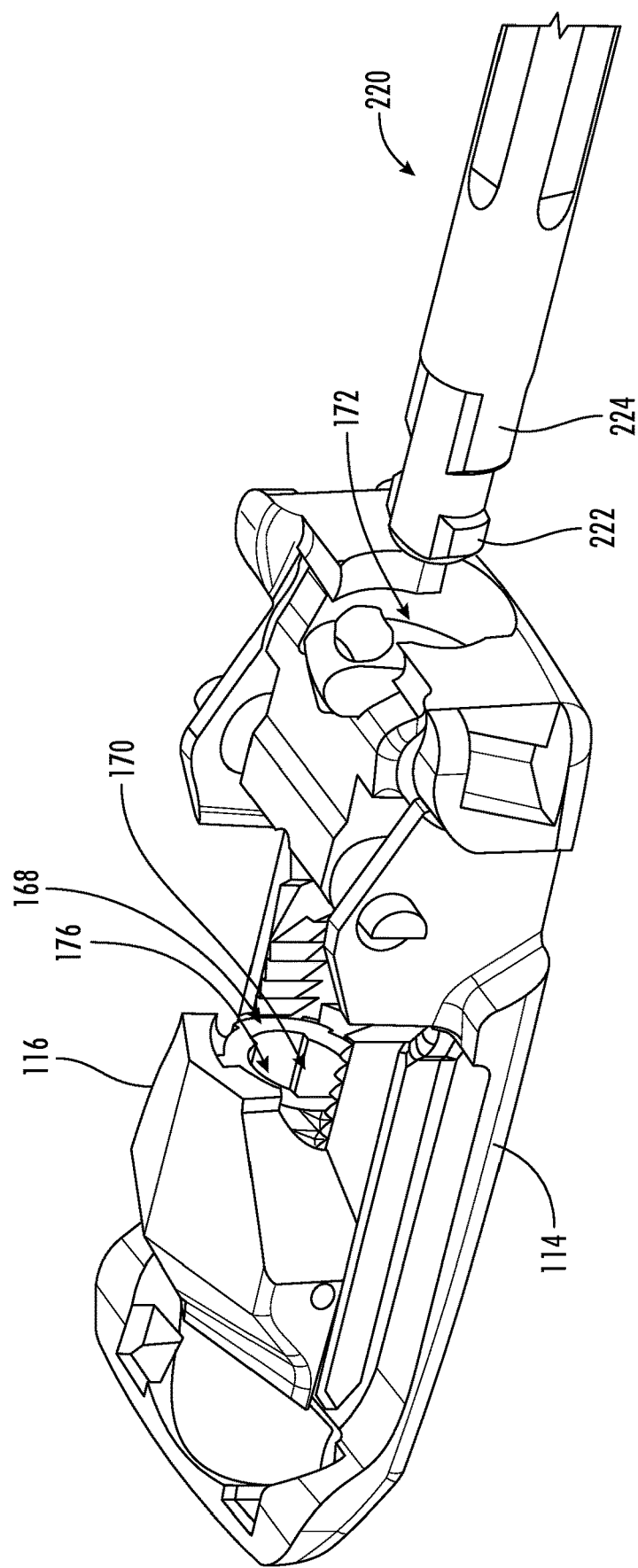
FIG. 8B illustrates a partial cutaway view of the spinal device and the distal tip of the instrument.

Upper and lower endplates 112, 114 each include an outer surface 119, 120 for contacting the surface of a vertebral body. Outer surfaces 120, 119 are preferably roughened with a surface treatment that facilitates attachment to the vertebral body. The surface treatment preferably creates a diamond structure (e.g., diamond 20-1.5), although other patterns may be used. Upper and lower endplates 112, 114 may also include one or more openings 121, 123 that extend through the entire endplates and, in one embodiment, are substantially aligned with each other (see FIGS. 4 and 8A). Similarly, internal support member 118 includes a central opening or bore 125 that, in one embodiment, may be substantially aligned with endplate openings 121, 123 (see FIG. 6). These openings create space for the addition of bone graft or other substances into the implant, as well as to allow for bony ingrowth through the implant 100.

Upper and lower endplates 112, 114 have substantially open proximal ends 126, 128 and tapered distal ends 122, 124 to form a closed wedge-shaped nose 154 at the distal end of the implant when distal ends 122, 124 are in the closed position. Upper endplate 112 includes two side walls 156 that extend downward towards, and at least partially overlap with, side walls 142, 144 of lower endplate 14.

Internal support member 118 may be coupled to, or integral with, upper endplate 112 and/or lower endplate 114. In one embodiment, internal support member 118 is coupled to upper endplate 112 such that support member 118 and upper endplate 112 move with each other. In an exemplary embodiment, support member 118 includes one or more projections, such as conical pins 190, extending through openings 192 in upper endplate 112 (see FIGS. 3 and 5) that couple support member 118 to upper endplate 112 (discussed in more detail below). Support member 118 is pivotally coupled to lower endplate 114 with a hinge located near proximal ends 126, 128 of endplates 112, 114. This hinge allows internal support member 118 and upper endplate 112 to pivot relative to lower endplate 114 around an axis substantially perpendicular to the longitudinal axis of implant 100, thereby moving distal ends 122, 124 of the endplates towards and away from each other. This adjusts the lordosis angle of implant 100 between two vertebral bodies in a patient, as discussed in further detail below.

Figure 6:
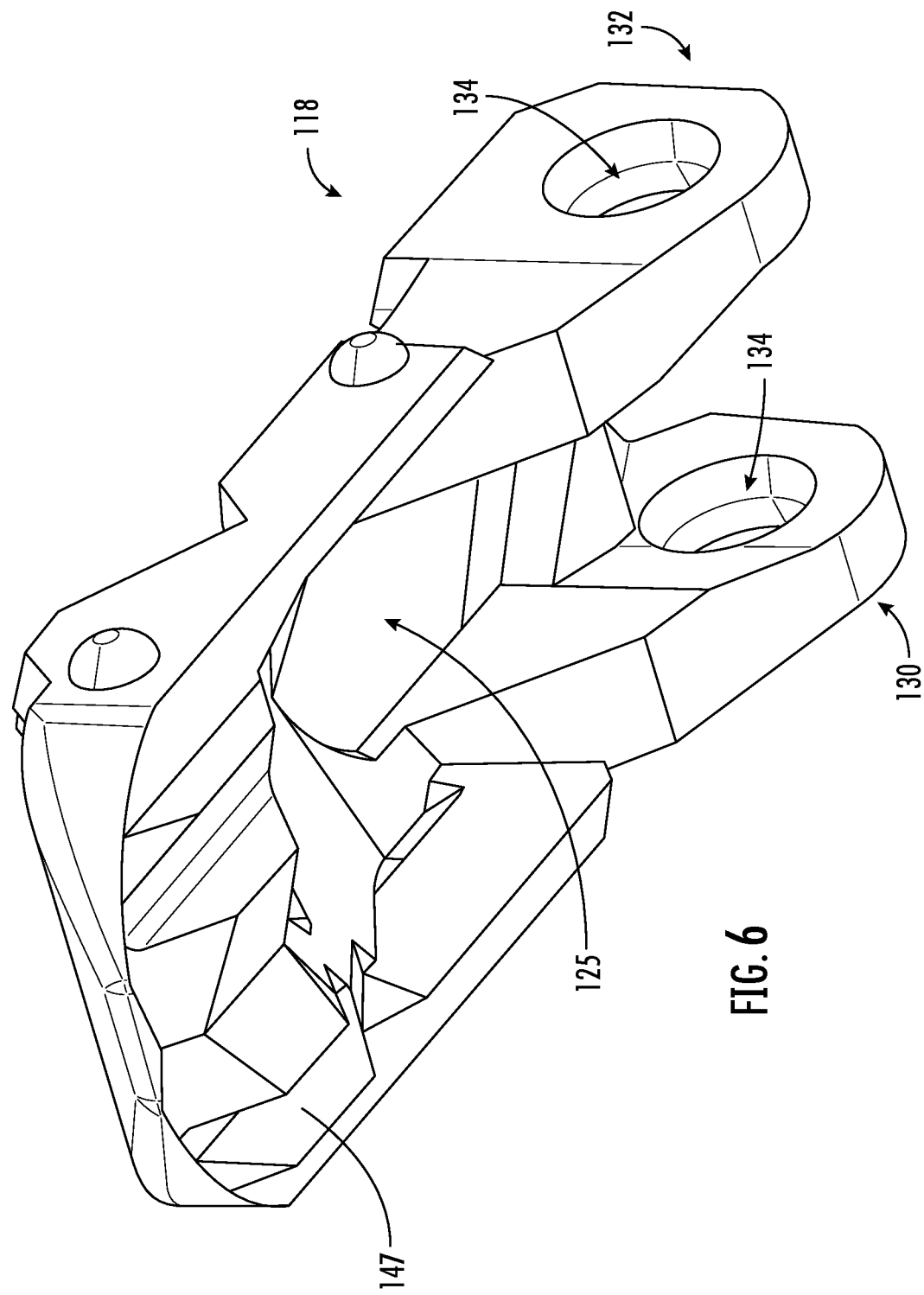
FIG. 6 illustrates an internal support member of the device of FIG. 1.

In an exemplary embodiment, support member 118 includes first and second proximal arms 130, 132 laterally spaced from each other and each having an opening 134 therethrough (see FIG. 6). Lower endplate 114 includes a central main body 140 and side walls 142, 144 (see FIG. 4). Main body 140 is spaced from side walls 142, 144 to form first and second channels or gaps 146, 148 therebetween for receiving first and second arms 130, 132 of support member 118. Lower endplate 114 further includes first and second projections 150, 152 extending inwardly from walls 142, 144 towards main body 140 within gaps 146, 148. Projections 150, 152 also extend into openings 134 in arms 130, 132 of support member 118 and are designed to cooperate with these openings in support member 118 to form the hinge.

Figure 4:
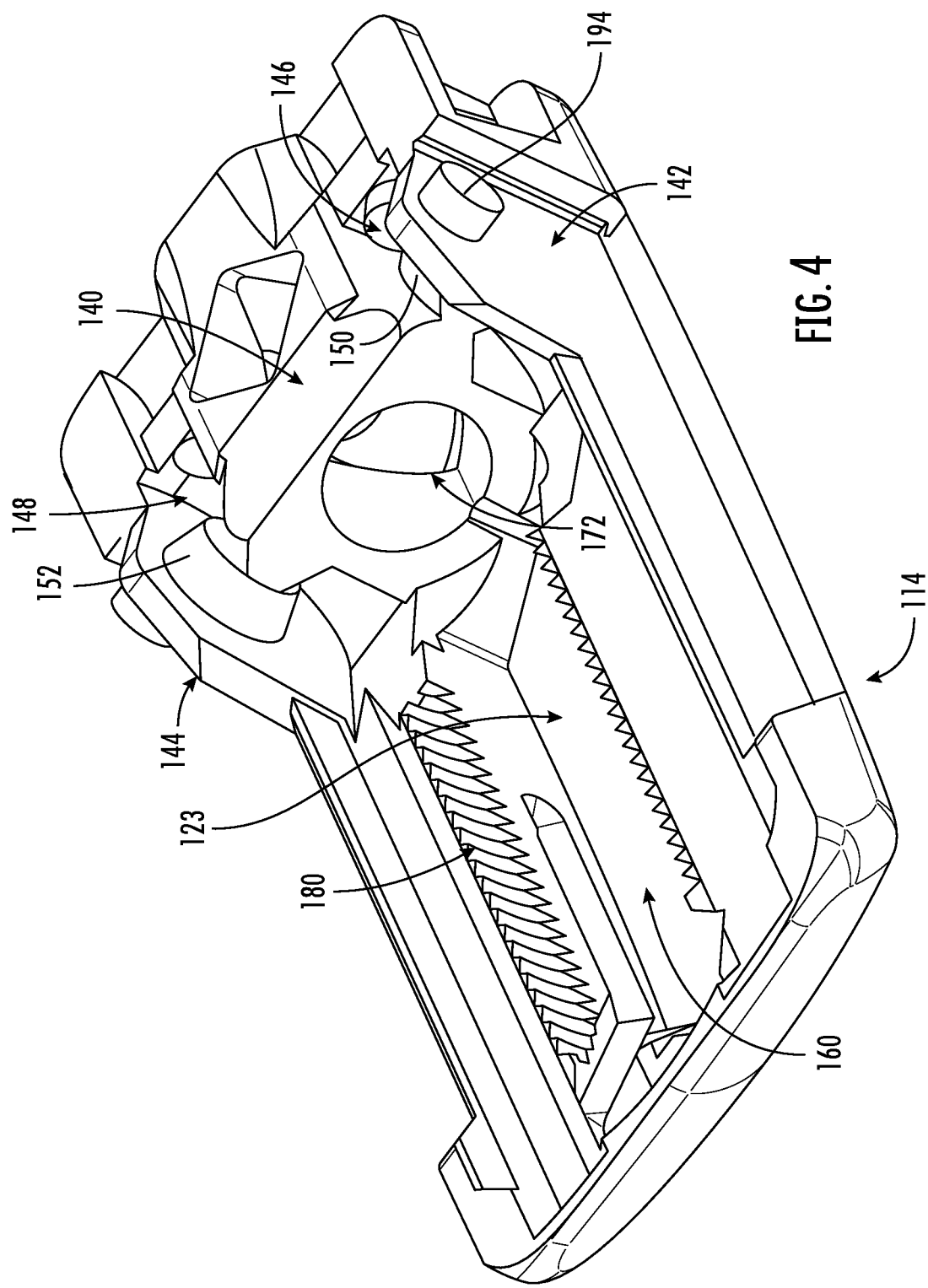
FIG. 4 illustrates a lower endplate of the device of FIG. 1
Figure 5:
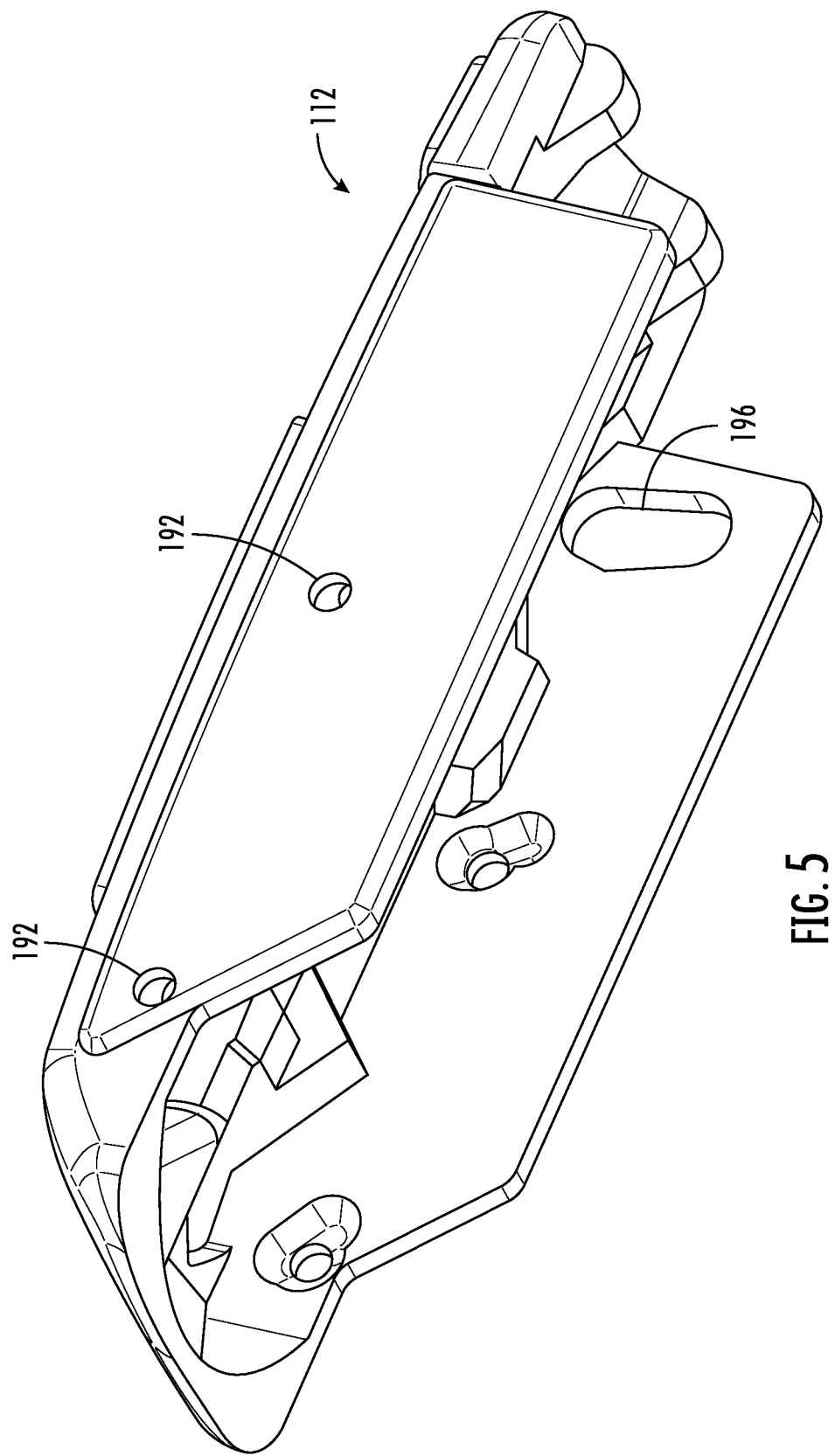
FIG. 5 illustrates an upper endplate of the device of FIG. 1.

As shown in FIG. 4, lower endplate 114 includes a central channel 160 for receiving translation member 116. Translation member 116 is movable in the longitudinal direction within channel 160 relative to endplates 112, 114 and support member 118. Translation member 116 includes one or more angles surfaces or wedges 164 designed to cooperate with angled surfaces or ramps 147 on support member 118 (see FIG. 6). Longitudinal movement of translation member 116 relative to the endplates causes these wedges 164 to move along the ramps 147 of support member 118, thereby moving support member 118 towards or away from the lower endplate (while pivoting about the hinge at the proximal end of implant 100). Support member 118, in turn, causes the distal end 122 of upper endplate 112 to move towards or away from distal end 124 of lower endplate 114.

Figure 7A:
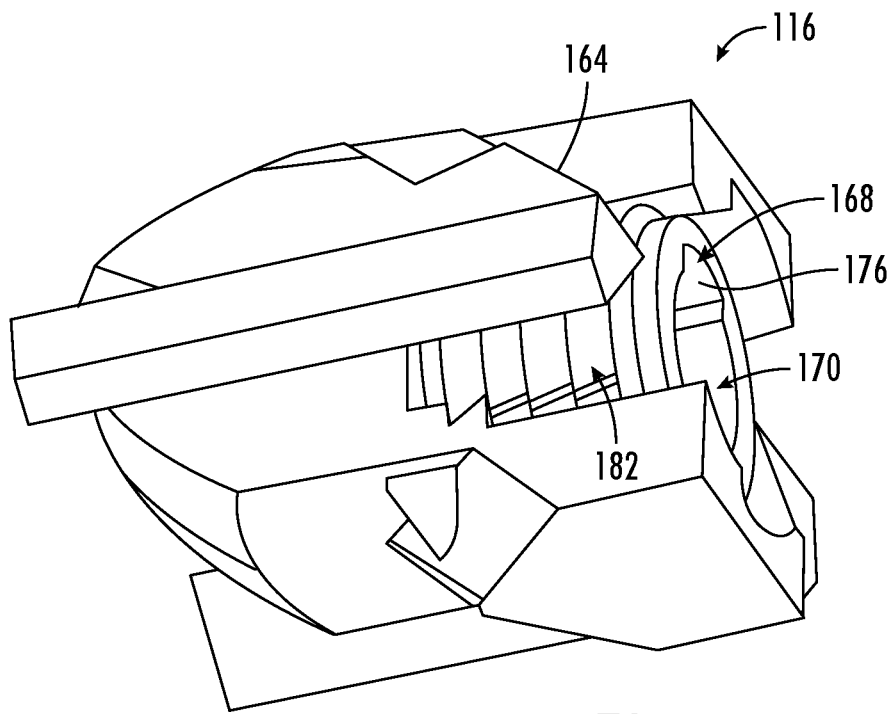
FIG. 7A illustrates an angle translation member of the device of FIG. 1.
Figure 7B:
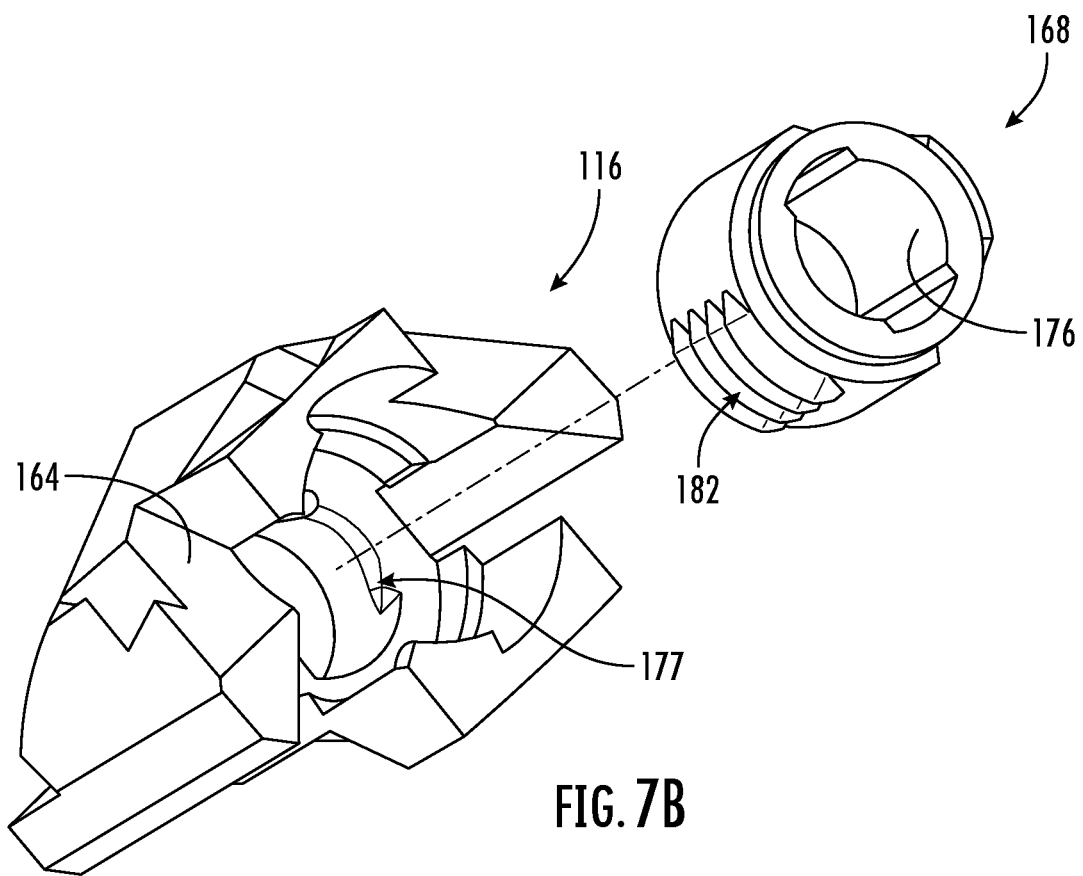
FIG. 7B is an exploded view of the translation member of FIG. 7A and a locking element.

As shown in FIGS. 7A and 7B, translation member 116 includes a locking member 168 that is rotatably coupled to translation member 116 such that locking member 168 may be rotated about the longitudinal axis relative to translation member 116. Locking member 168 includes a central bore 170 for receiving an actuator shaft 220 of a surgical instrument 200 (see FIGS. 8A-11) that causes longitudinal movement of translation member 116. To that end, bore 170 includes a first annular mating feature 177 configured to receive, and couple to, a first mating feature 222 of the rod 202. Note that first mating feature 177 may be formed within locking member 168 and/or translation member 116 (i.e., distal to locking member 168). In the latter embodiment, bore 170 extends entirely through locking member 168 and into a distal portion of translation member 116.

In an exemplary embodiment, this mating feature 177 includes a cavity or cut-out sized to receive first mating feature 222 of rod 202 (discussed in more detail below). The cavity may include includes a proximal rim or projection (not shown) that extends towards the longitudinal axis and has a smaller inner diameter than the inner diameter of the cavity. Once actuator shaft 220 is coupled to translation member 116, longitudinal translation of actuator shaft 220 causes proximal translation member 116 to move longitudinally relative to the endplates 112, 114, thereby moving the endplates towards or away from each other.

Locking member 168 further includes a second mating feature 176 configured to cooperate with a second mating feature 224 of surgical instrument 200 (see FIGS. 8A-11). Second mating feature 176 is configured to cooperate with second mating feature 224 to rotate locking member 168 relative to translation member 116, as discussed in more detail below.

Lower endplate 114 may also include a central bore 172 at its proximal end for receiving actuator shaft 220, which passes through bore 172 and central channel 160 of lower endplate 114 to cooperate with the mating features in locking member 168 and/or translation member 116 (discussed in more detail below).

Figure 15:
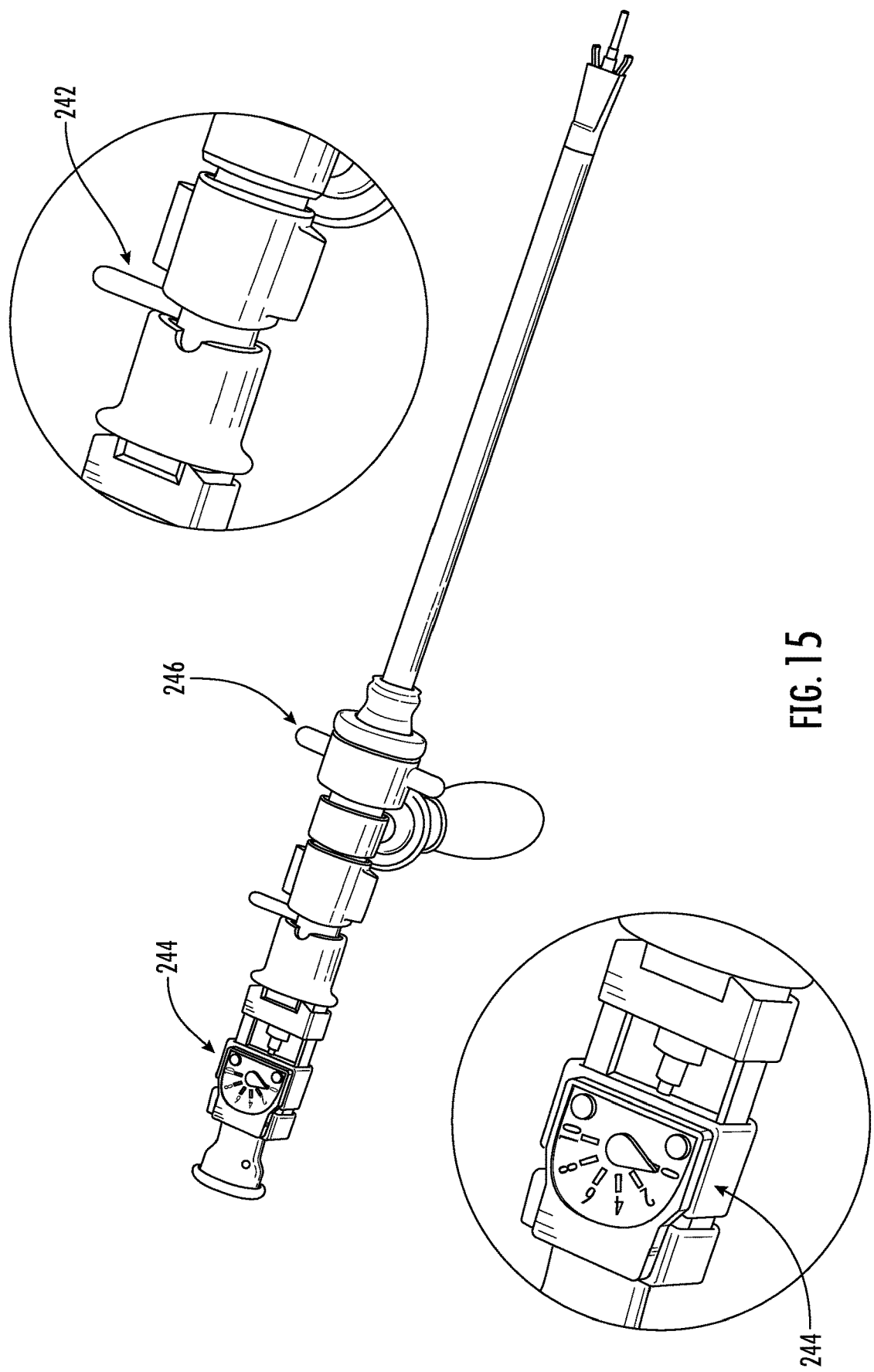
FIG. 15 illustrates the surgical instrument of FIG. 12 with two enlarged views of a proximal portion of the surgical instrument of FIG. 12.

Implant 100 may include a system for providing discrete steps as translation member 116 is moved related to endplates 112, 114. These steps correlate with angle adjustments of the endplates. In one embodiment, this system includes a lordosis gauge 244 on surgical instrument 200 (see FIG. 15). The lordosis gauge 2444 provides discrete steps to indicate the angle of lordosis of the implant 100.

In an alternative embodiment, the system comprises a series of projections or teeth 180 within channel 160 of lower endplate 114 that cooperate with a series of projections 182 on locking member 168. As translation member 116 moves longitudinally, the projections 182 are configured to move from the space between two teeth 180 to the space between adjoining teeth, or ratchet. These spaces provide the discrete steps or increments. In addition, teeth 180 may assist in holding translation member 116 in position relative to endplate 112 to maintain a particular angle between the upper and lower endplates. The projections also may inhibit reverse movement (i.e., distal movement) of translation member 116 relative to the endplates.

In another alternative embodiment, upper endplate 112 may include the clicker arm (not shown) and translation member 116 may include projections or teeth (not shown) that extend upwards towards the clicker arm on upper endplate 112. Alternatively, both upper and lower endplates 112, 114 may include clicker arms.

Implant 100 may include a number of features that couple the components together and/or stabilize the implant during angle adjustment. In an exemplary embodiment, support member 118 includes one or more projections, such as conical pins 190, extending through openings 192 in upper endplate 112 (see FIGS. 3 and 5). Lower endplate 114 may also include projections 194 for coupling to one or more openings or slots 196 in upper endplate 112 (see FIGS. 4 and 5). These projections serve to stabilize the endplates during angular adjustment.

In other embodiments, upper and lower endplates 112, 114 may further include first and second flexible hinges or leaf springs (not shown) on either side of the endplates that couple the endplates together to further stabilize the endplates. The endplates are separate components that are only coupled to each other by the leaf springs and the connections created by the various conical pins riding through slots in the upper endplate (discussed above). The leaf springs are each formed as an elongate component that extends from a proximal portion of the lower endplate to a distal portion of the lower endplate. The elongate component has a relatively small cross-sectional area that creates flexibility in the elongate component as the endplates move relative to each other. This allows it to flex with this movement and remained coupled to the endplates. This provides positional stability to the endplates during height and angle adjustment.

Referring now to FIGS. 8A-11, a surgical instrument 200 (further described below in reference to FIGS. 12-15) includes an actuator rod 220 with first and second mating features 222, 224 at a distal end thereof. Actuator rod 220 is configured to pass through central bore 172 of endplates 112, 114 and into bore 170 of locking member 168 to couple rod 220 with translation member 116 (see FIG. 9A). As discussed above, first mating feature 222 cooperates with the internal cavity or cut-out 177 in locking member 168 and/or translation member 116 to couple rod 220 with translation member 116 (see FIGS. 7B and 9B). Second mating feature 224, in turn, cooperates with second mating feature 176 on locking member 168 to lock or unlock translation member 116 relative to endplates 112, 114. More specifically, second mating feature 224 may be oriented to unlock translation member 116 so that it is able to move longitudinally relative to endplates 112, 114.

Figure 9A:
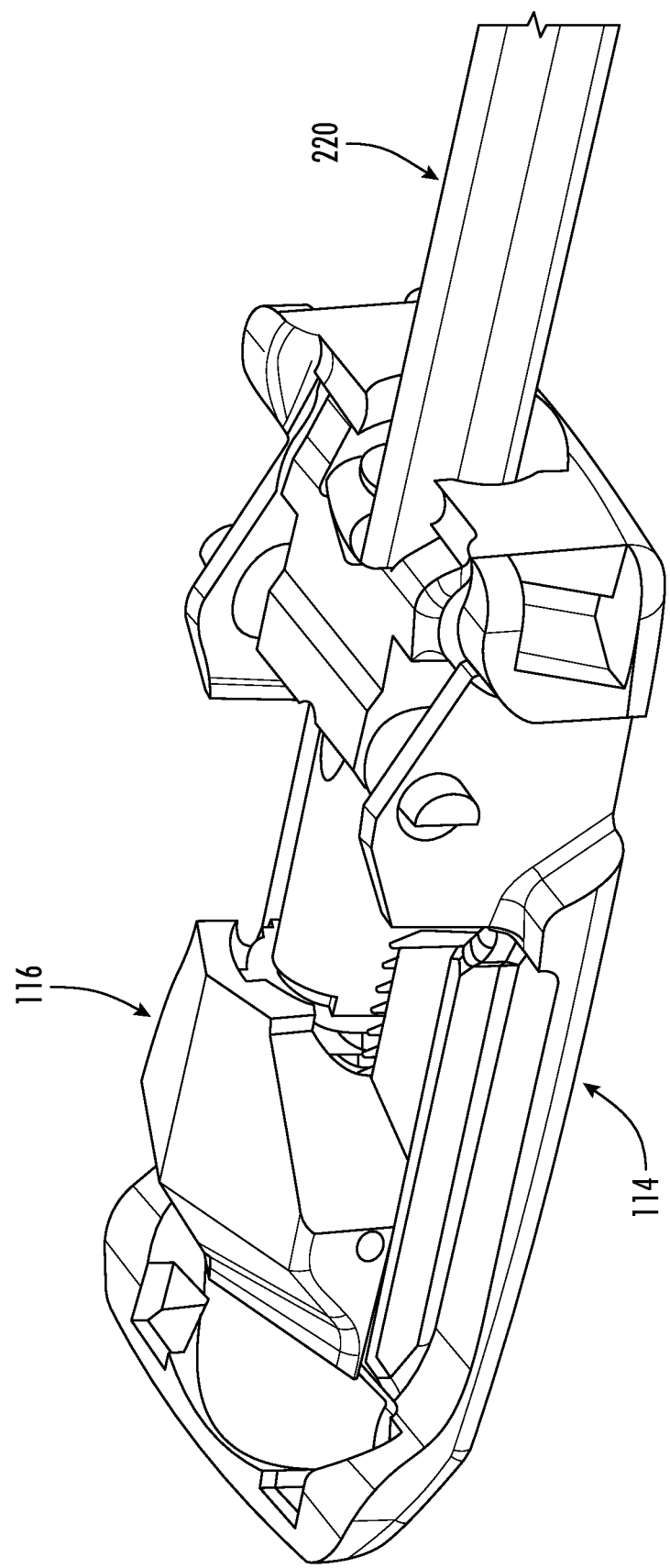
FIGS. 9A and 9B illustrate two partial cutaway views of the spinal device with the distal tip of the instrument engaging a locking member of the device.
Figure 9B:
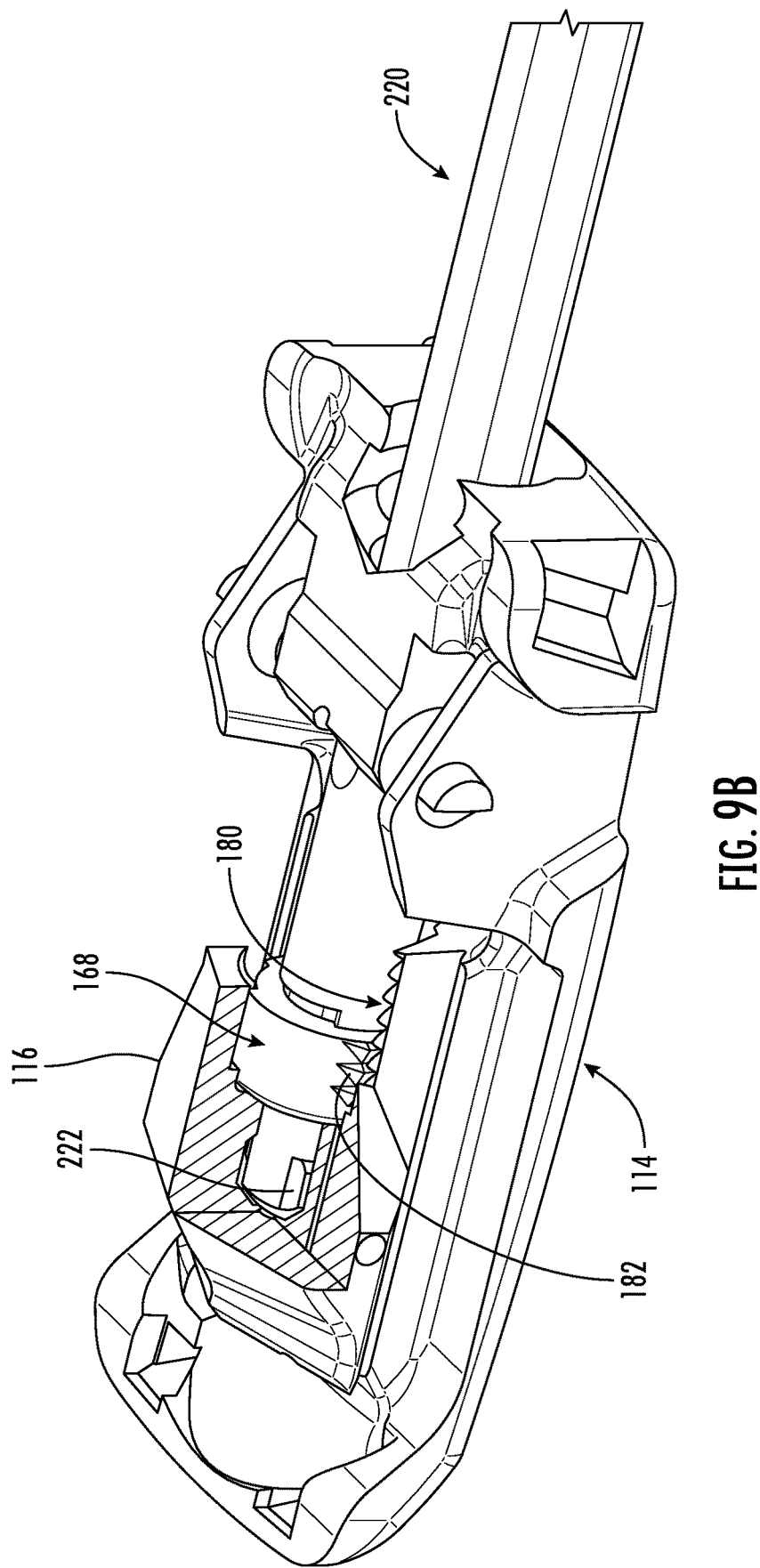
Figure 10:
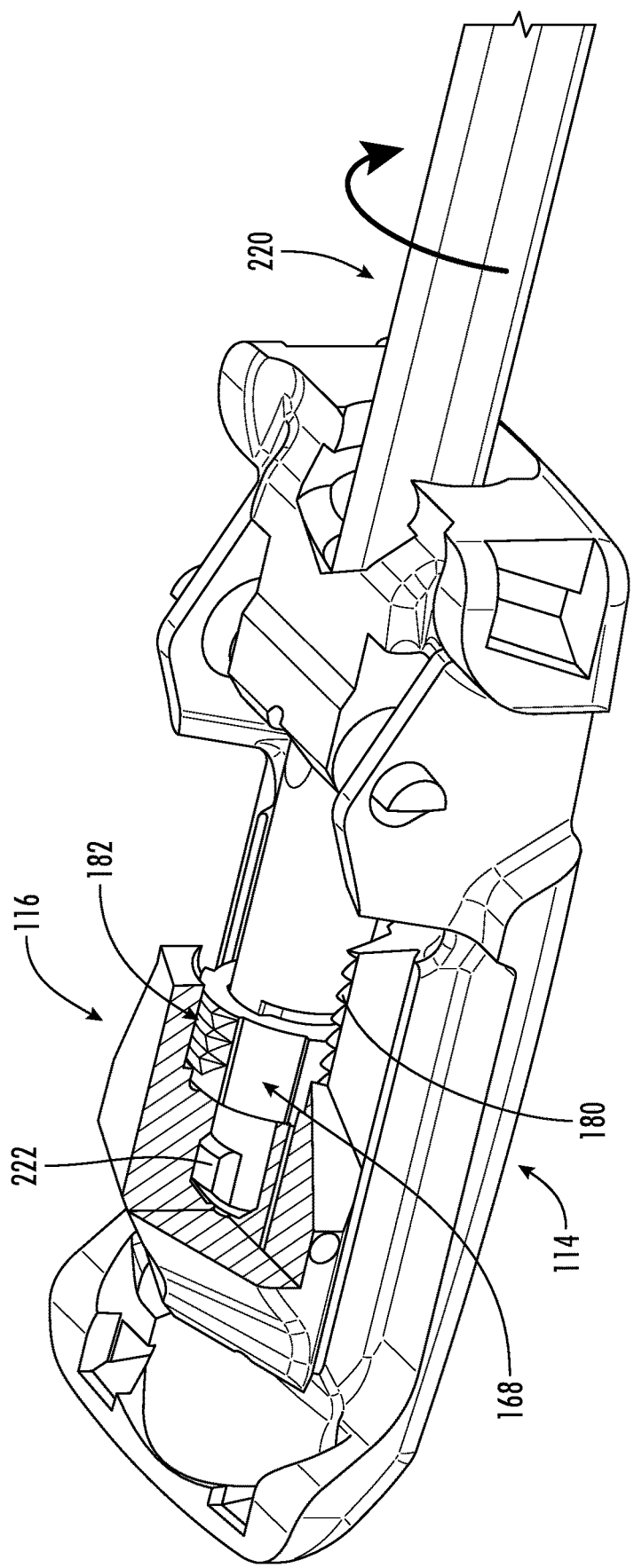
FIG. 10 illustrates the locking member in an unlocked position.
Figure 11:
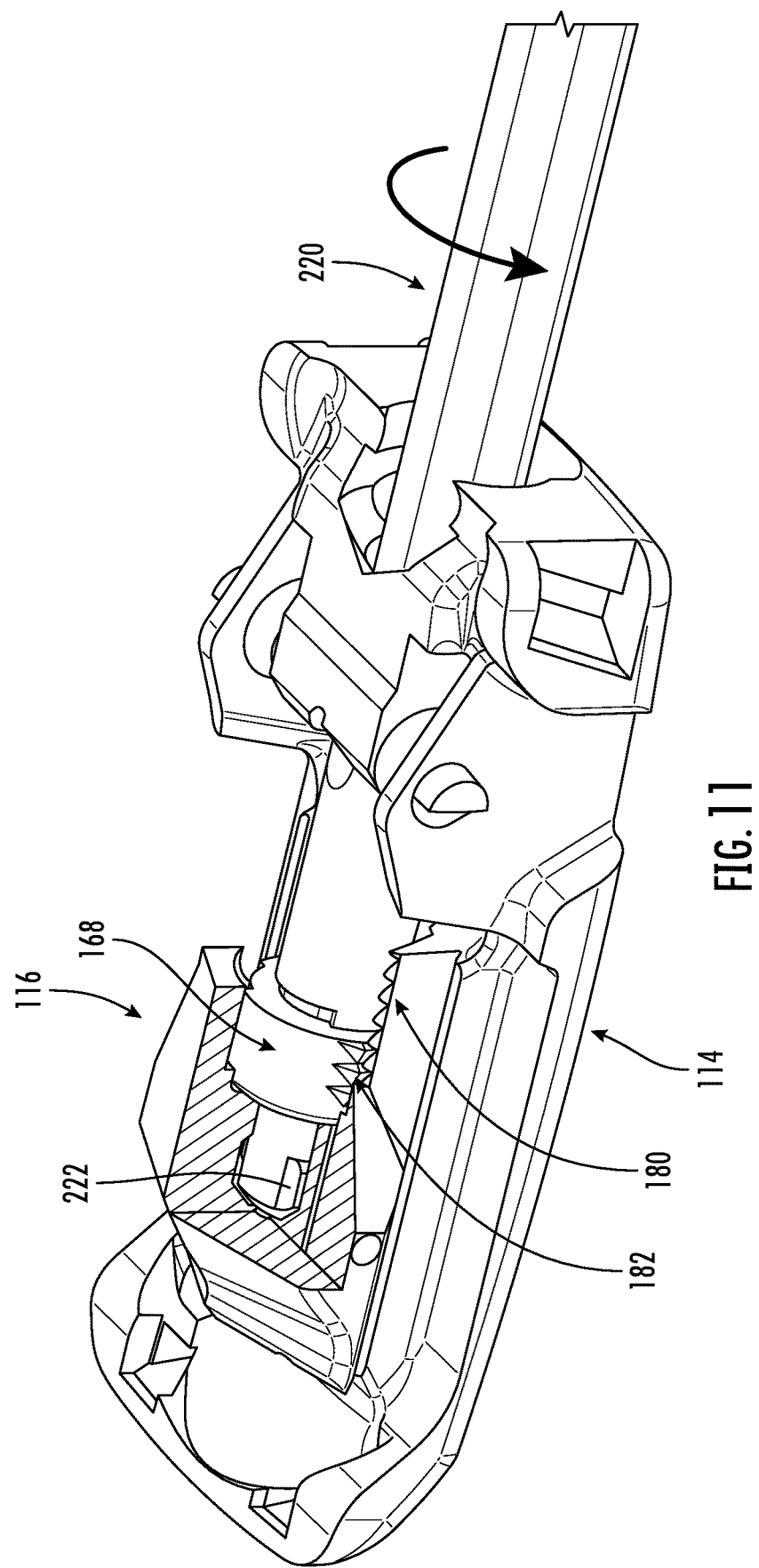
FIG. 11 illustrates the locking member in a locked position.
Figure 12:
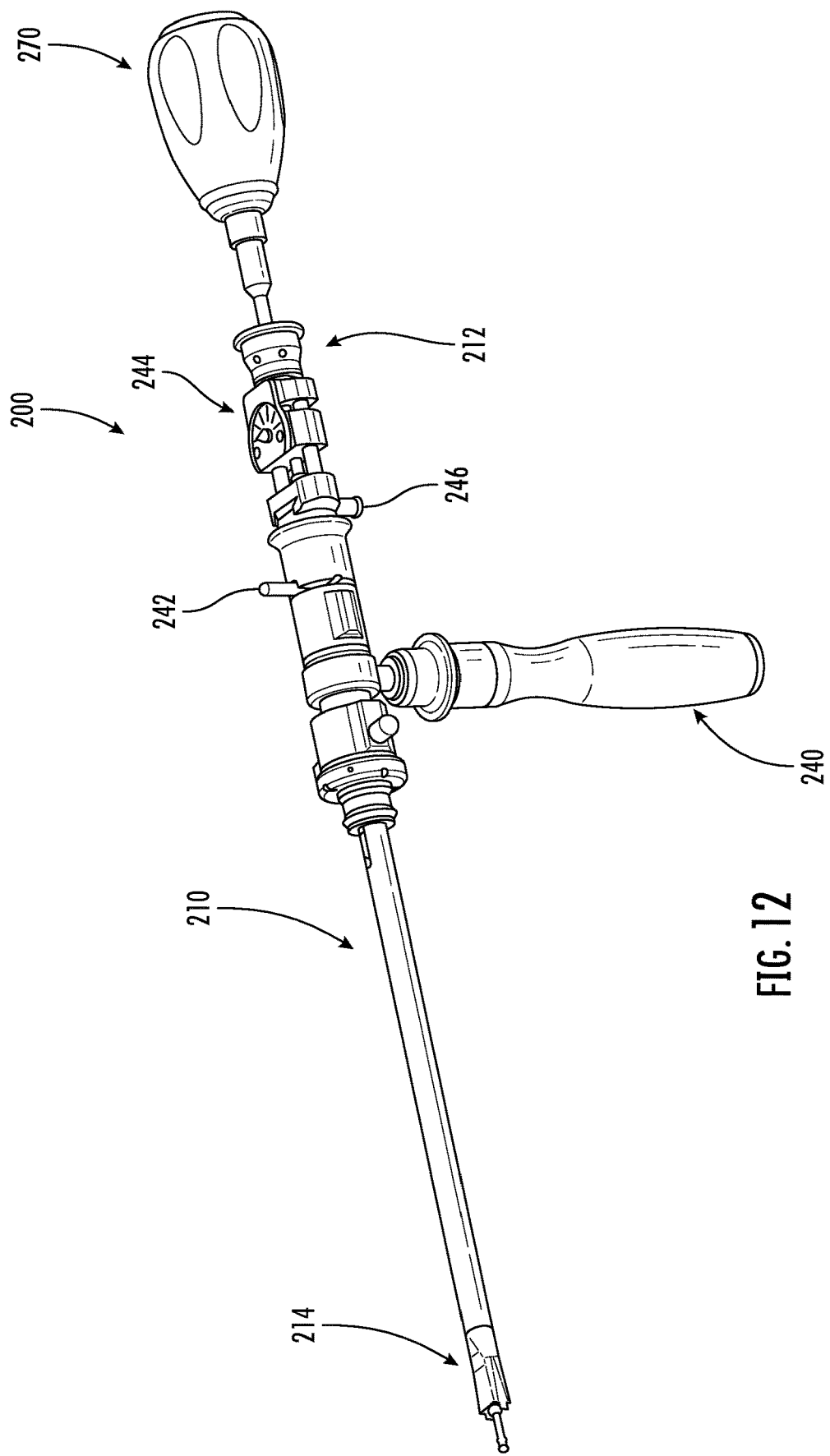
FIG. 12 is a perspective view of a surgical instrument for use with the spinal devices described herein.

Referring now to FIGS. 9B, 10 and 11, operation of actuation rod 220 and translation member 116 will now be discussed. As actuation rod 220 is advanced into bore 170 of locking member 168, first and second mating features 222, 224 are oriented in a locked position relative to translation member 116 (see FIG. 9B). In the locked position, projections 182 of translation member 116 engage with projections or teeth 180 within channel 160 of lower endplate 114 to prevent longitudinal movement of translation member 116. In this locked position, first mating feature 222 is not engaged with the internal cavity or cut-out 177 within translation member 116 so that rod 220 is not yet secured to translation member 116.

As shown in FIG. 10, rotation of actuator rod 220 causes both mating features 222, 224 to rotate. Second mating feature 224 rotates locking member 168 such that projections 182 rotate away from teeth 180 of endplate 114 to unlock translation member 116 (i.e., translation member 116 is no longer secured to lower endplate 114). At the same time, first mating feature 222 engages with the internal cutout 177 in translation member 116 so that rod 220 is secured to translation member 116. At this point, longitudinal movement of rod 220 will cause translation member 116 to move longitudinally relative to endplates 112, 114 to adjust the angle of distal ends 126, 128, as discussed above.

In an exemplary embodiment, rod 220 is rotated in a clockwise direction about 90 degrees to move locking member 168 from the locked to the unlocked position. In other embodiments, rod 220 may be rotated in a counterclockwise direction to unlock translation member 116. Also it should be noted that the device is not limited to a 90 degree rotation of rod 220. In certain embodiments, rod 220 may be rotated less than 90 degrees or more than 90 degrees to move locking member 168 between the locked and unlocked positions.

As shown in FIG. 11, to lock translation member 116, rod 220 is turned about 90 degrees in a counterclockwise direction to rotate first and second mating features 222, 224 relative to translation member 116. This causes projections 182 to rotate into engagement with teeth 180. In addition, it causes first mating feature 222 to disengage with cavity 177 of translation member 116 such that rod 220 can be removed from implant 100.

Referring now to FIGS. 12-15, an insertion instrument 200 for use with the implants described herein comprises an elongated shaft 210 with a proximal handle 212 and a distal gripping element 214 for removably coupling instrument 200 to spinal implant 10. Elongate shaft 210 includes inner and outer concentric rods 220, 230 surrounding an internal shaft 238. Inner rod 220 can be extended through bore 172 of endplates 112, 114 and into bore 170 of locking member 168, as discussed above. Outer rod 230 is coupled to gripping element 214 and may be extended to a proximal end of endplates 112, 114 to couple shaft 210 to implant 100.

In one embodiment, distal gripping element 214 includes first and second gripping arms 216, 218 for coupling to proximal mating features 219 on either side of upper and/or lower endplates 112, 114 (see also FIG. 1). Distal gripping arms 216, 218 are coupled to actuator rod 230 to move arms 216, 218 in a substantially lateral direction relative to the longitudinal axis of shaft 210. Arms 216, 218 can be moved together to hold the endplates and moved apart to release lower endplates. In certain embodiments, distal gripping element 214 may further include a sheath 236 that extends over a proximal portion of gripping element 214.

Instrument 200 includes a locking bar 242, a cage fixation screw 246, a lordosis gauge 244 and a torque limiting knob 270 on proximal handle 212 coupled to a proximal end of inner rod 220. As discussed below, locking bar 242 may be rotated to rotate inner rod 220 and locking member 168. Torque limiting knob 270 is also coupled to inner rod 220 such that rotation of knob 270 causes longitudinal translation of inner rod 220 to move translation member 116 relative to endplates 112, 114 to adjust lordosis. Cage fixation screw 246 is coupled to a proximal end of outer rod 230 and may be used to attach and detach gripping arms 216, 218 to implant 100.

Figure 13:
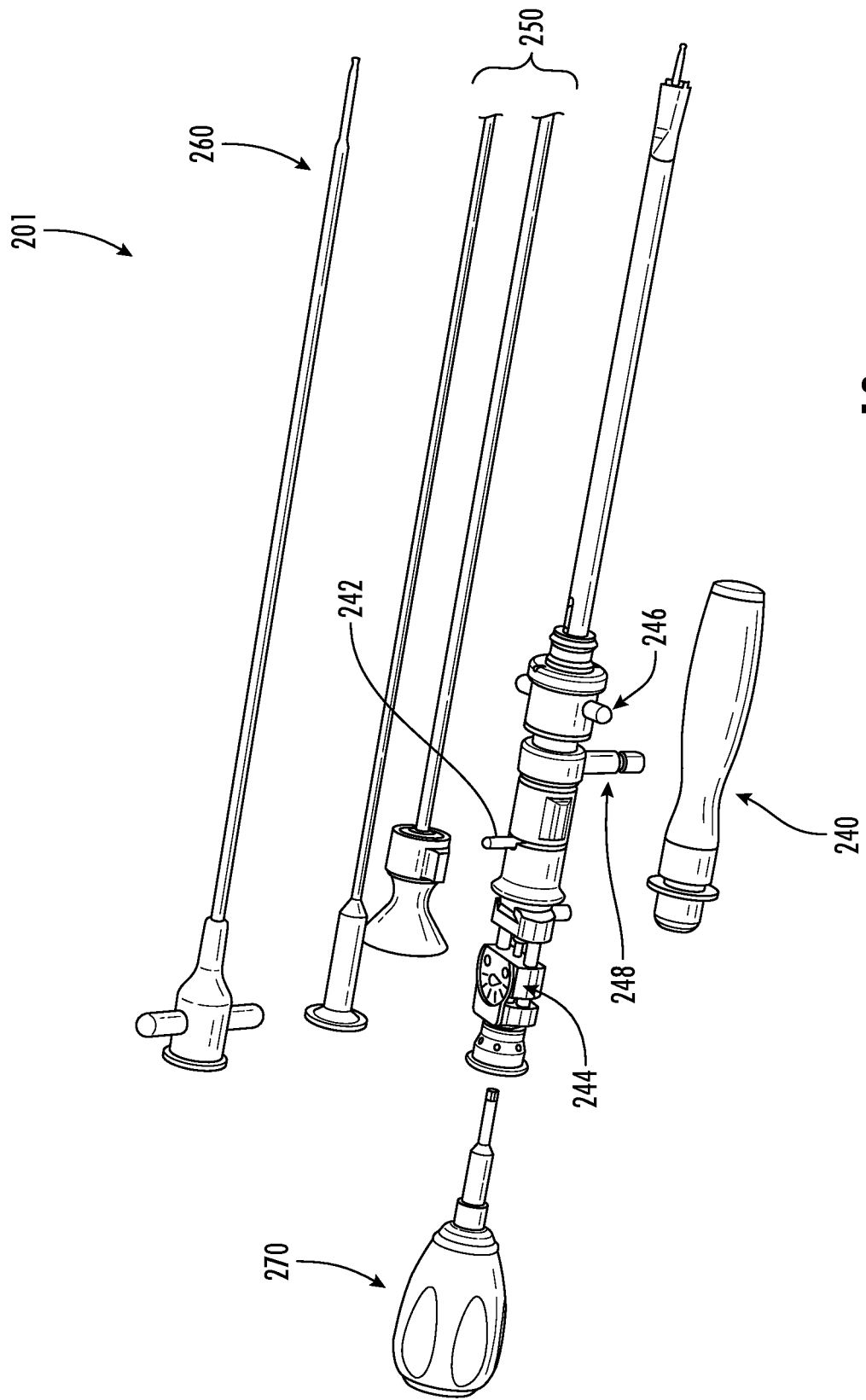
FIG. 13 illustrates various components of a surgical instrument system including the instrument of FIG. 12.
Figure 14:
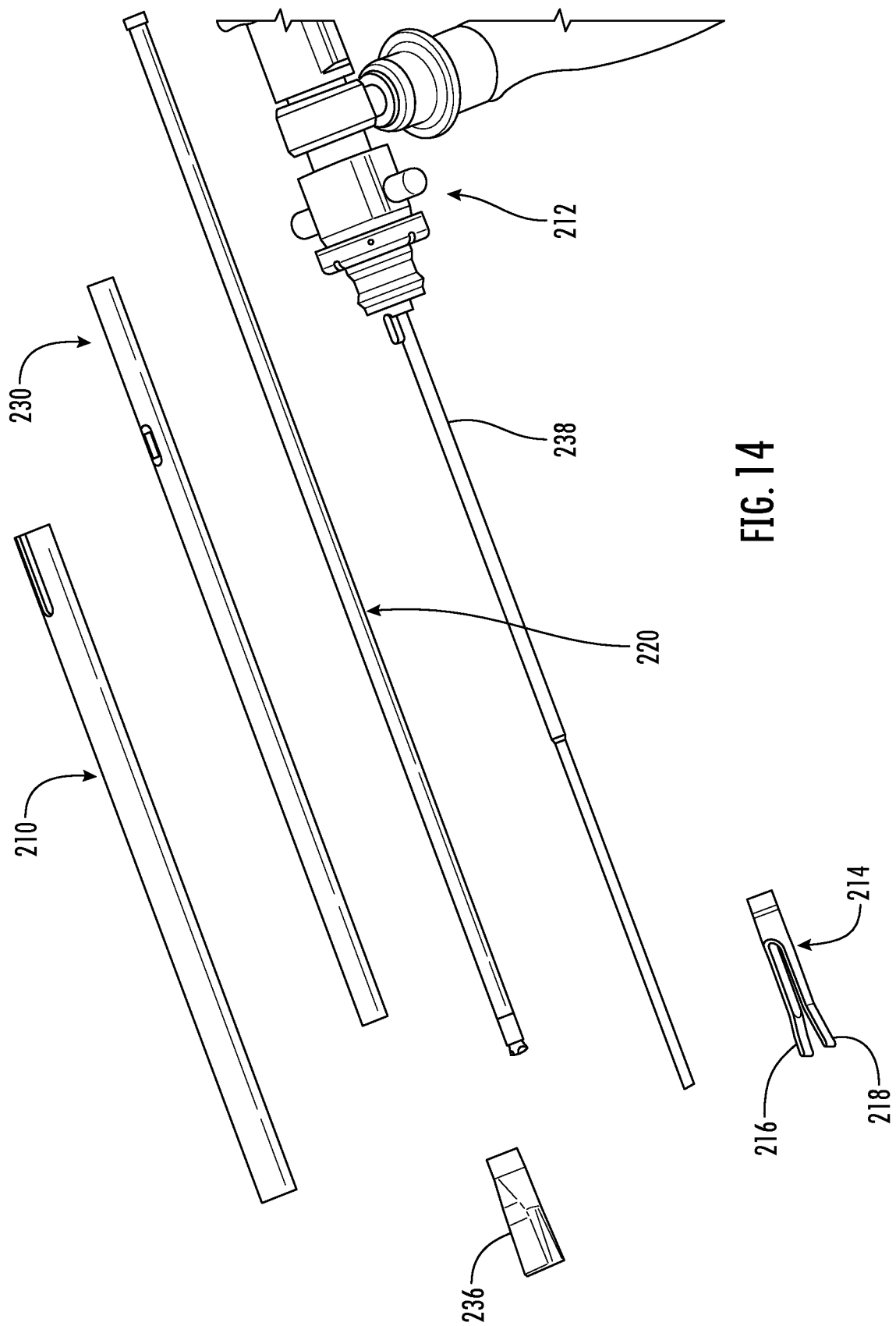
FIG. 14 is an exploded view of certain components of the distal portion of the surgical instrument of FIG. 12.

As shown in FIG. 13, an instrument assembly 201 may also include a grafting set 250 and a reverse tool 260. The function and operation of these components will be described in more detail below. Instrument 200 may further include a lateral handle 240 coupled to a lateral extension 248 on proximal handle 212 of instrument 200. Lateral handle 240 provides a gripping element for the surgeon to handle and control instrument 200.

Figure 16:
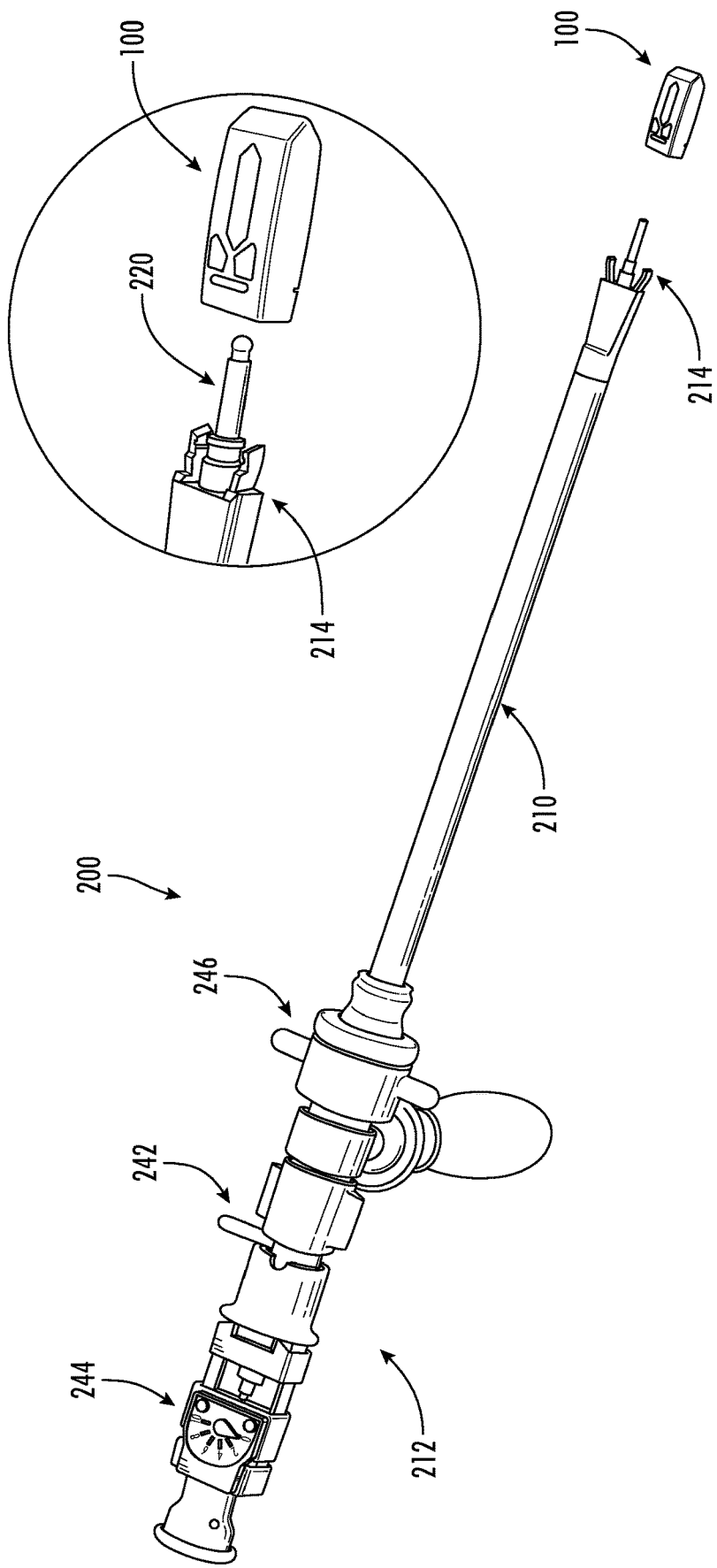
FIG. 16 illustrates the surgical instrument of FIG. 12 with an enlarged view of the instrument being attached to a spinal device.

Referring now to FIGS. 16-25, a method for positioning implant 100 within an intervertebral space between adjacent intervertebral bodies 280, 282 will now be described. As shown in FIG. 16, instrument 100 is inserted in a collapsed configuration such that endplates 112, 114 are substantially parallel to each other and translation member 116 is positioned in its most distal location within implant 100 (see FIG. 8B). Locking bar 242 is configured in an open position such that mating features 222, 224 on inner rod 220 may extend through bore 170 of locking member 168. Cage fixation screw 246 is also configured in an open position such that gripping arms 216, 218 are open and capable of being positioned around a proximal interface 219 (see FIG. 1) of endplates 112, 114.

Figure 17:
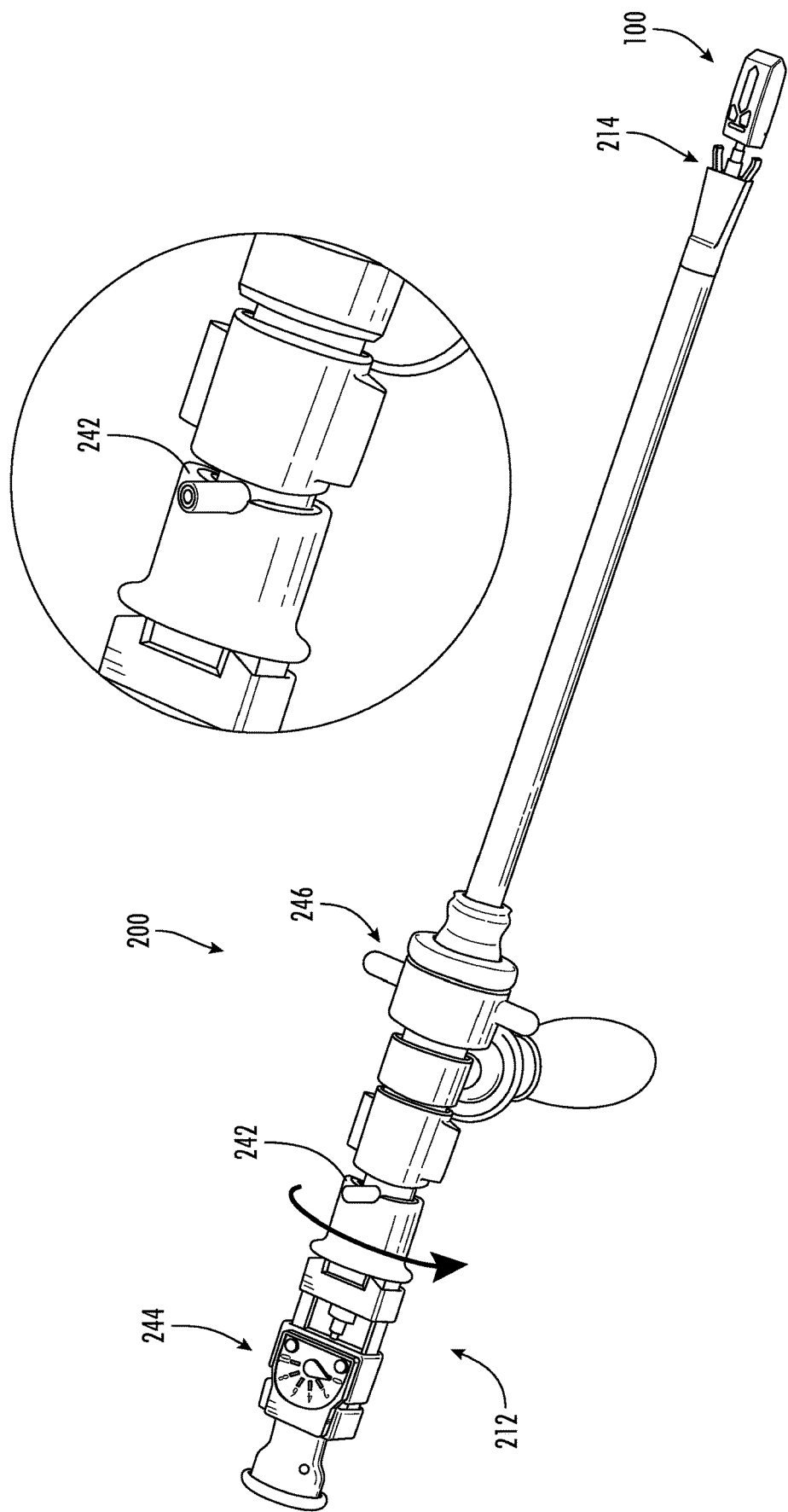
FIG. 17 illustrates the surgical instrument with an enlarged view of a closed locking bar to secure the instrument to the spinal device.

As shown in FIG. 17, inner rod 220 of instrument 100 is advanced through bores 172 of endplates 112, 114 and bore 170 of locking member 168. Locking bar 242 is then rotated to rotate inner rod 220 relative to implant 100. As discussed above, this causes both mating features 222, 224 to rotate. Second mating feature 224 rotates locking member 168 such that projections 182 rotate away from teeth 180 of endplate 114 to unlock translation member 116 (i.e., translation member 116 is no longer secured to lower endplate 114). At the same time, first mating feature 222 engages with the internal cutout in translation member 116 so that rod 220 is secured to translation member 116.

Figure 18:
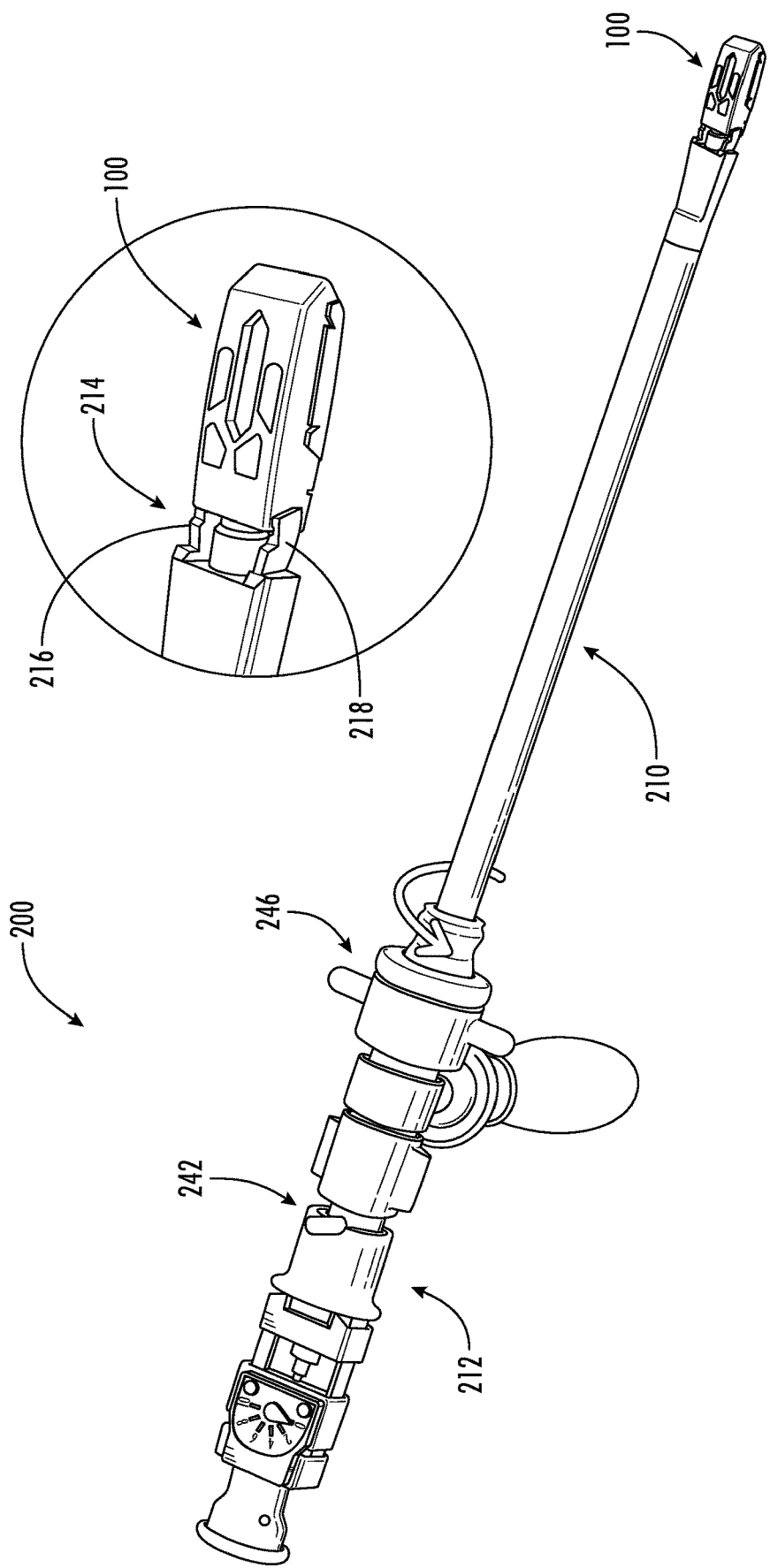
FIG. 18 illustrates the surgical instrument with an enlarged view showing tightening of a cage fixation screw on the surgical instrument.
Figure 19:
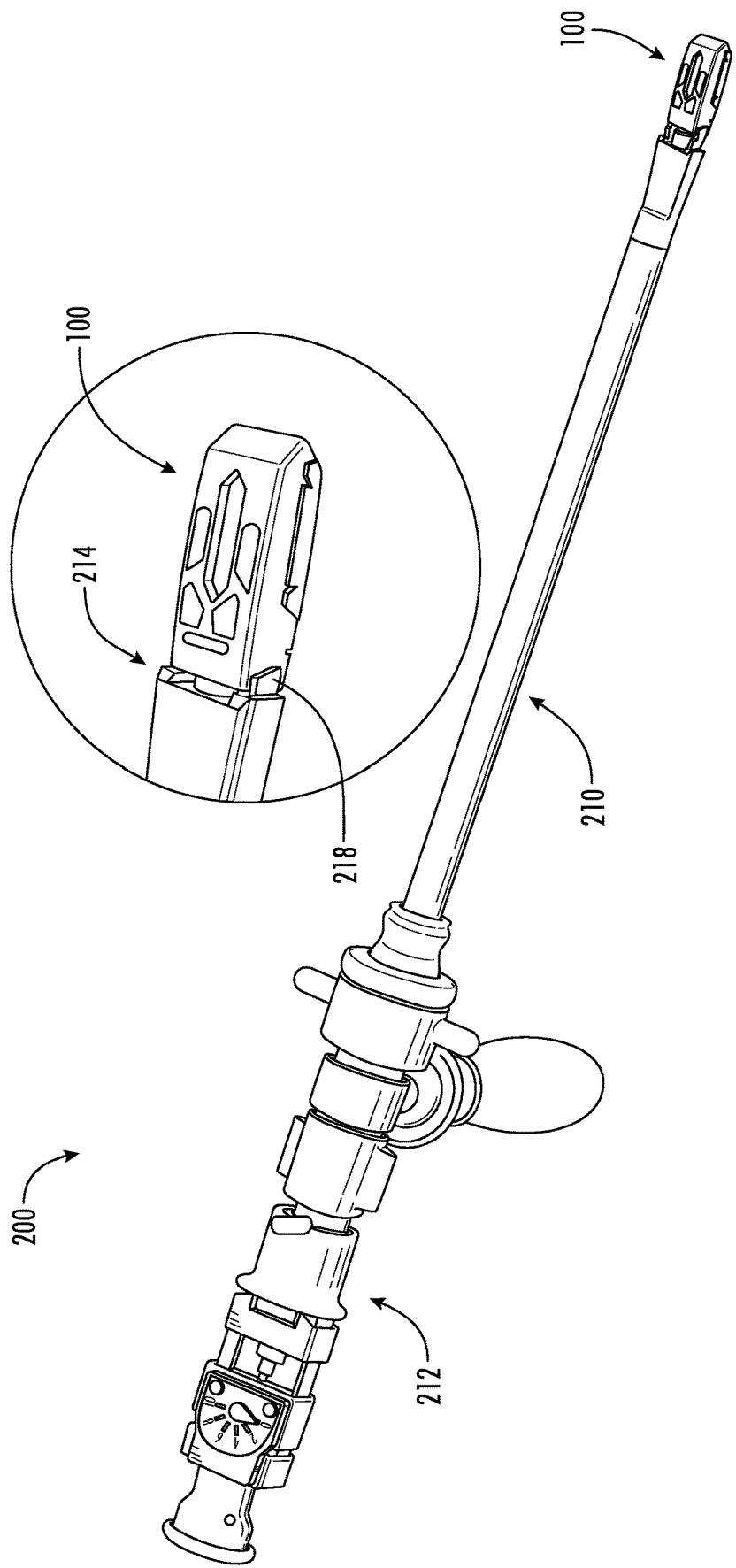
FIG. 19 illustrates the surgical instrument with an enlarged view showing a gripper interface of the case in a closed and locked position.
Figure 20:
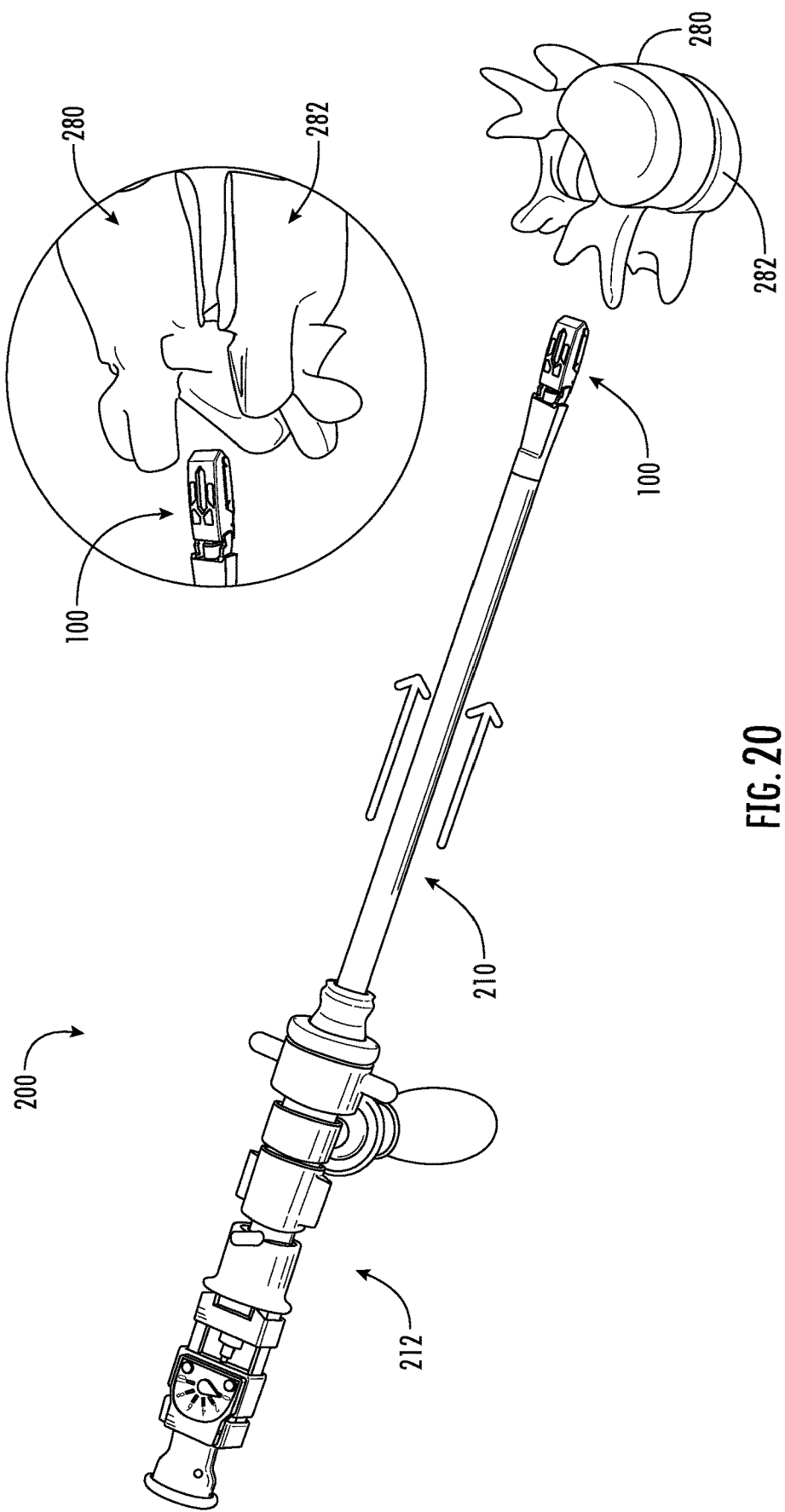
FIG. 20 illustrates a step of inserting the spinal device between two adjacent vertebra in the spine.

As shown in FIGS. 18 and 19, cage fixation screw 246 is then tightened such that gripping arms 216, 218 are closed to engage interface 219 to further secure the instrument 200 to implant 100. The implant 100 may then be advanced into the intervertebral space between adjacent vertebral bodies 280, 281 (see FIG. 20).

Figure 21:
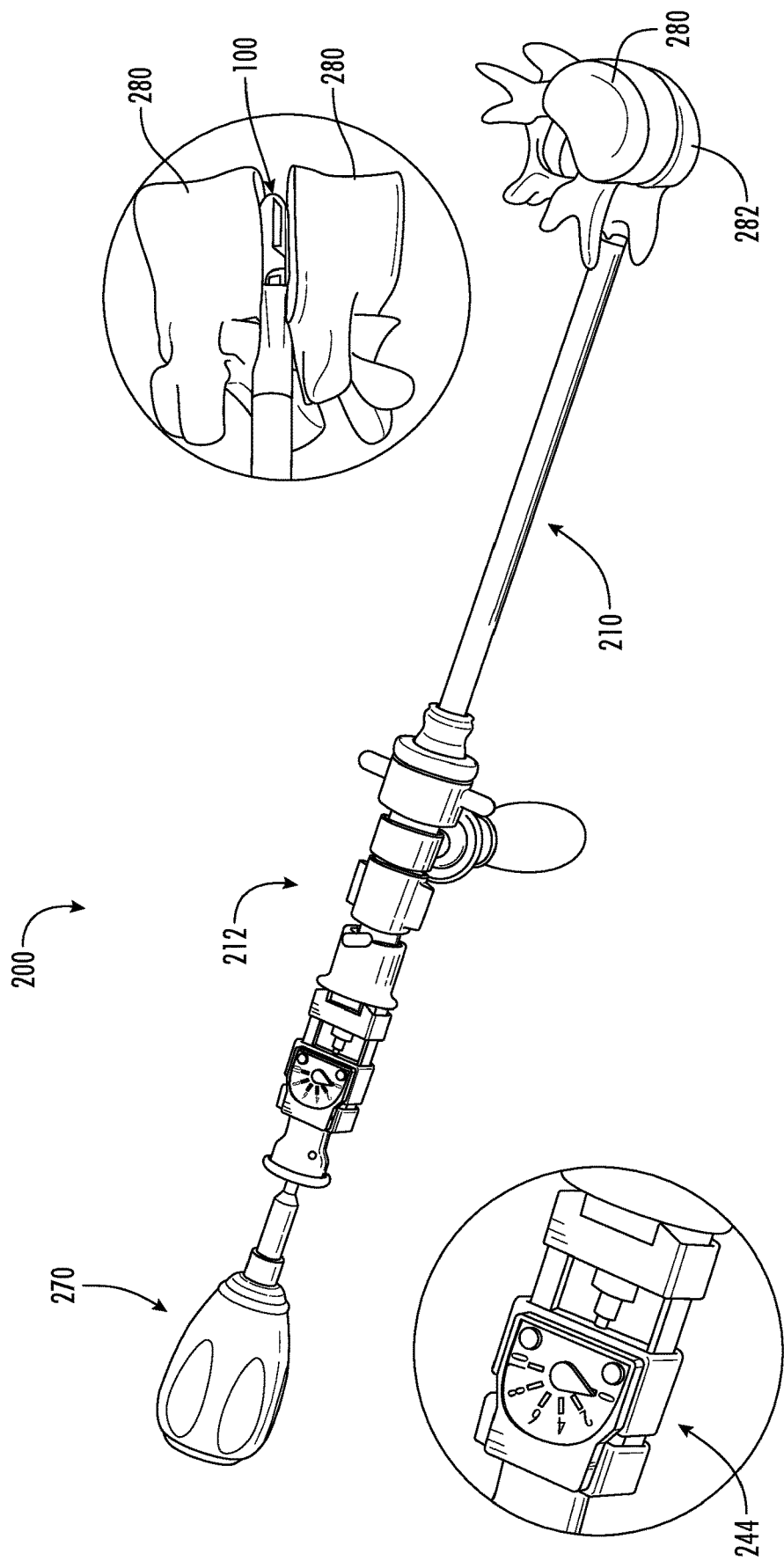
FIG. 21 illustrates the instrument and the spinal device prior to lordosis expansion.
Figure 22:
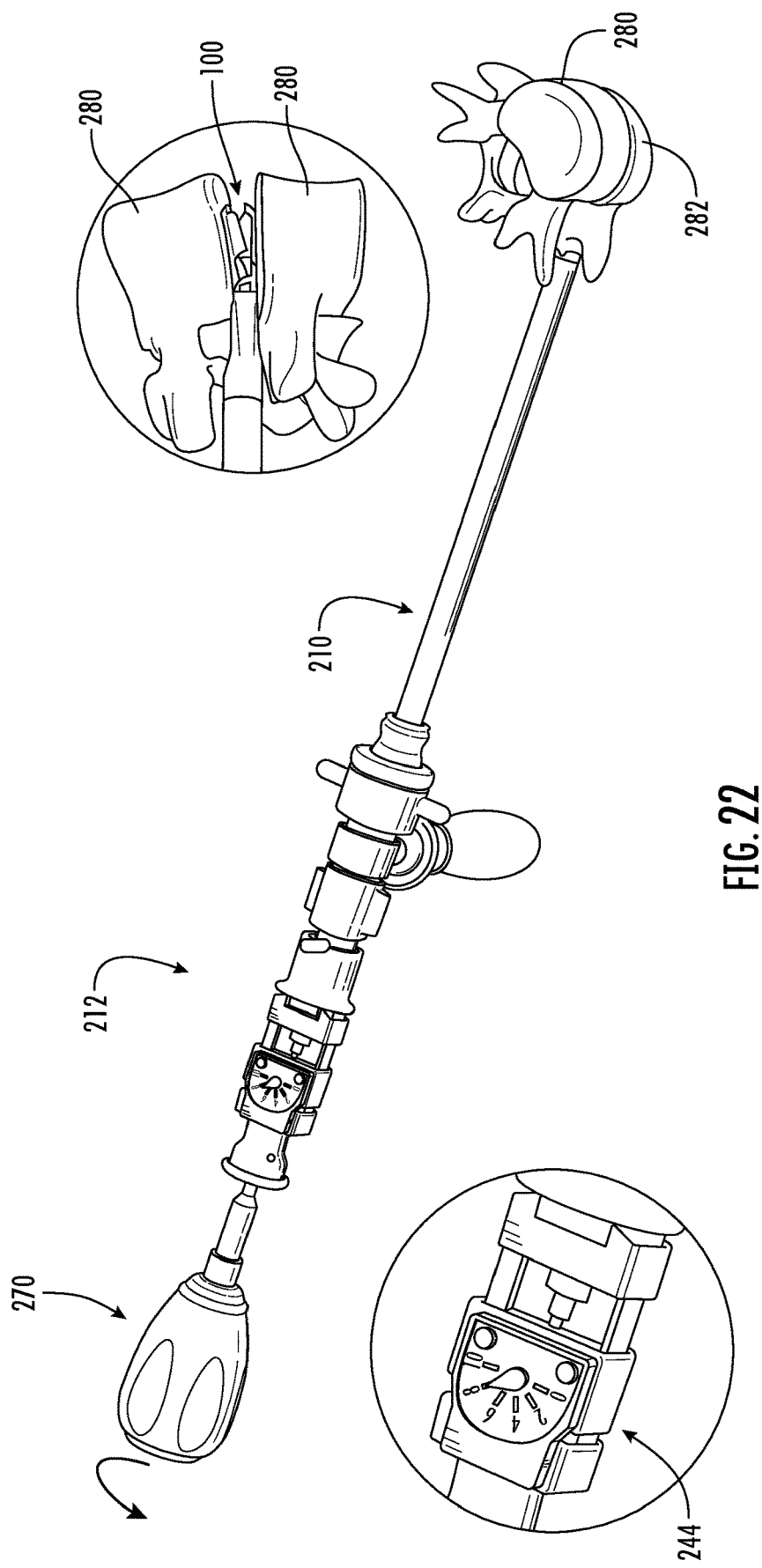
FIG. 22 illustrates lordosis expansion with the surgical instrument.

Referring now to FIGS. 21 and 22, to increase the angle of lordosis of implant 100, distal ends 122, 124 of endplates 12, 14 are moved away from each other. To that end, torque limiting knob 270 may be rotated to translate inner rod 220 in the proximal direction. This moves translation member 116 in the proximal direction, causing its wedges to engage with the ramps of support member 118 such that the distal ends of endplates 112, 114 move apart from each other, as discussed above.

As shown in FIG. 21, lordosis gauge 244 initially indicates a lordosis angle of 0 degrees when implant 100 is positioned within the intervertebral space. As this angle is increased, an arrow on lordosis gauge 244 will rotate within gauge to illustrate the angle of lordosis of the implant 100 (see FIG. 22).

When the appropriate angle of lordosis has been set, locking bar 242 is rotated into a locked position (see FIG. 23), thereby rotating locking member 168 within translation member 116. As discussed above, this causes projections 182 to rotate into engagement with teeth 180 such that translation member 116 can no longer move relative to endplates 112, 114. In addition, it causes first mating feature 222 to disengage with cavity 192 of translation member 116 such that rod 220 can be removed from implant 100. This ensures that implant 100 remains fixed in the lordosis angle chosen by the physician when instrument 200 is decoupled from implant 100.

Figure 23:
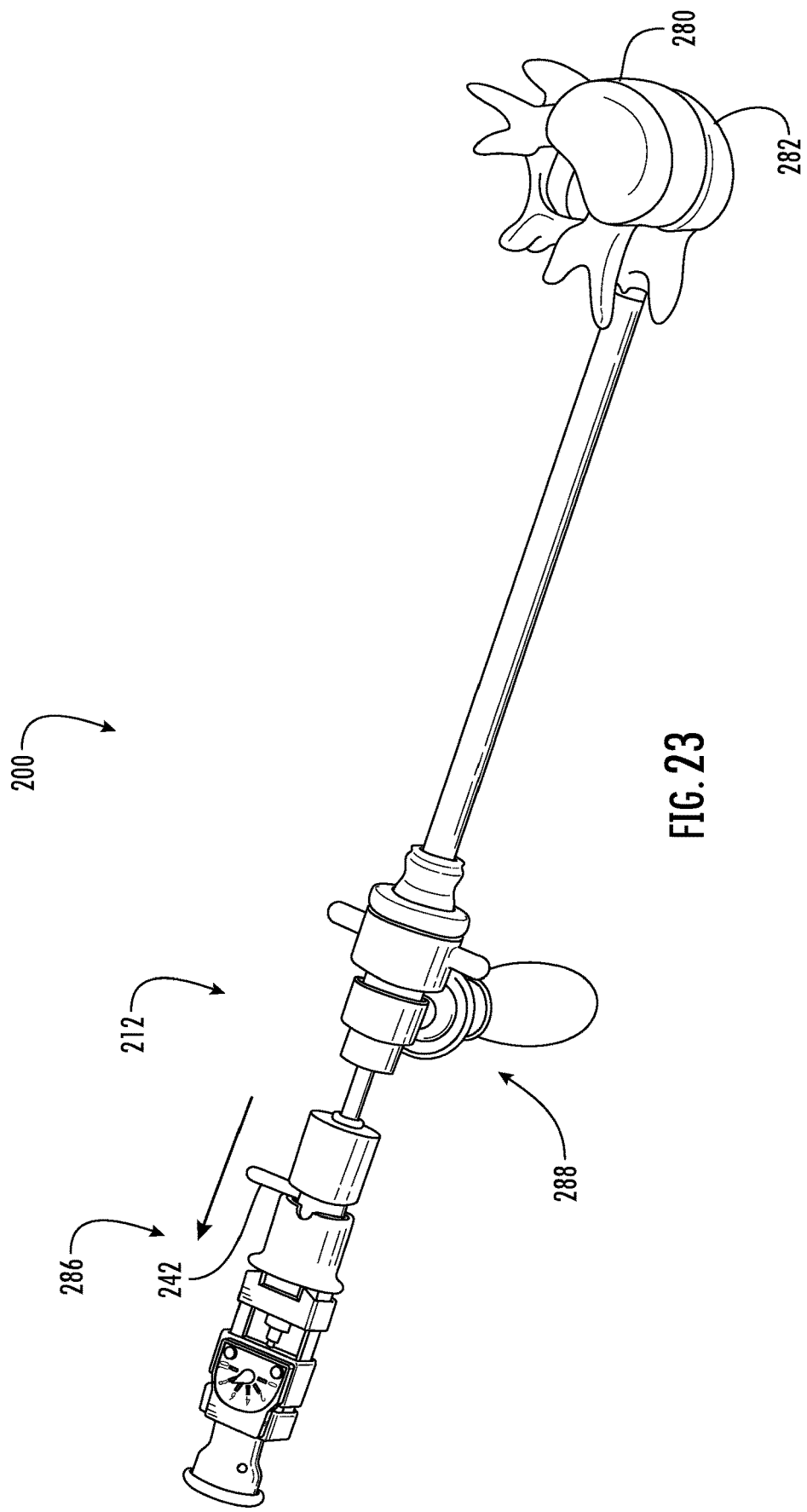
FIG. 23 illustrates removal of a proximal portion of the surgical instrument in preparation for bone graft backfilling.
Figure 24:
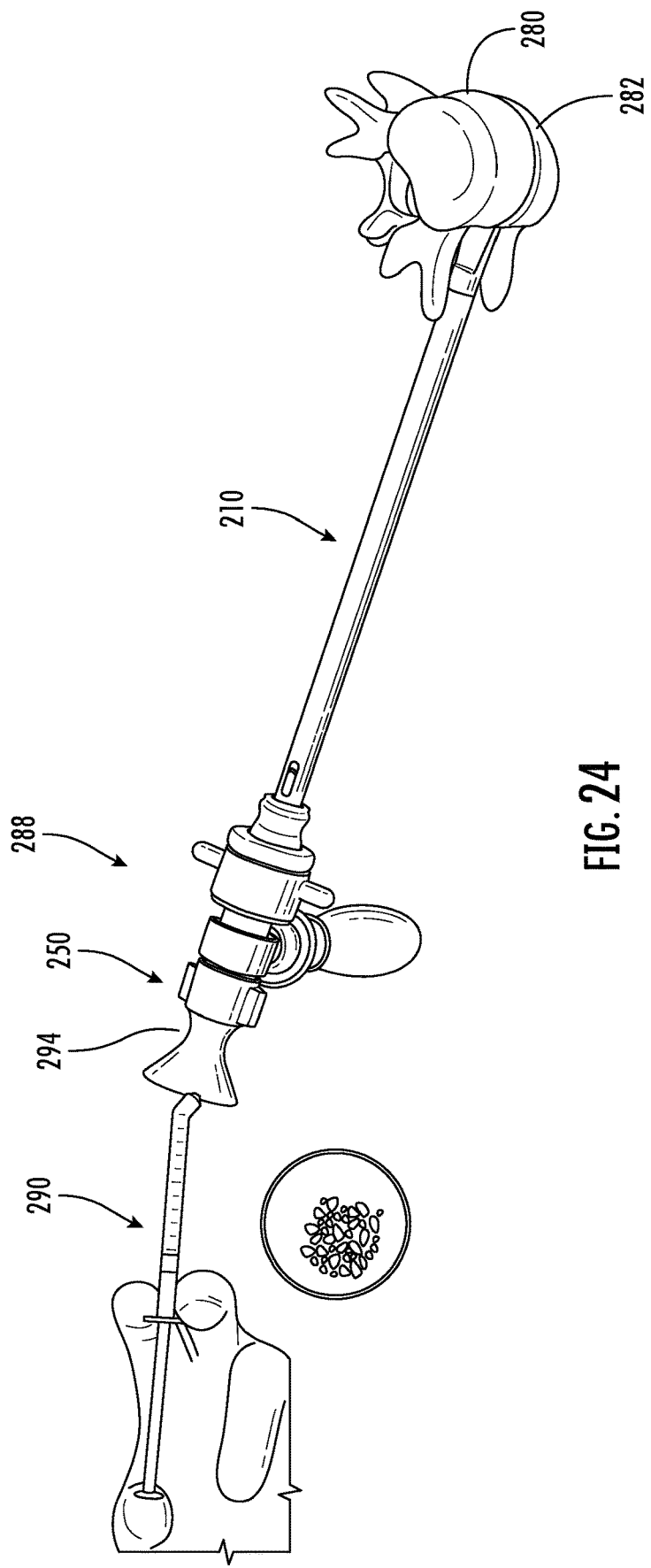
FIGS. 24 and 25 illustrate the surgical instrument used for bone graft backfilling.
Figure 25:
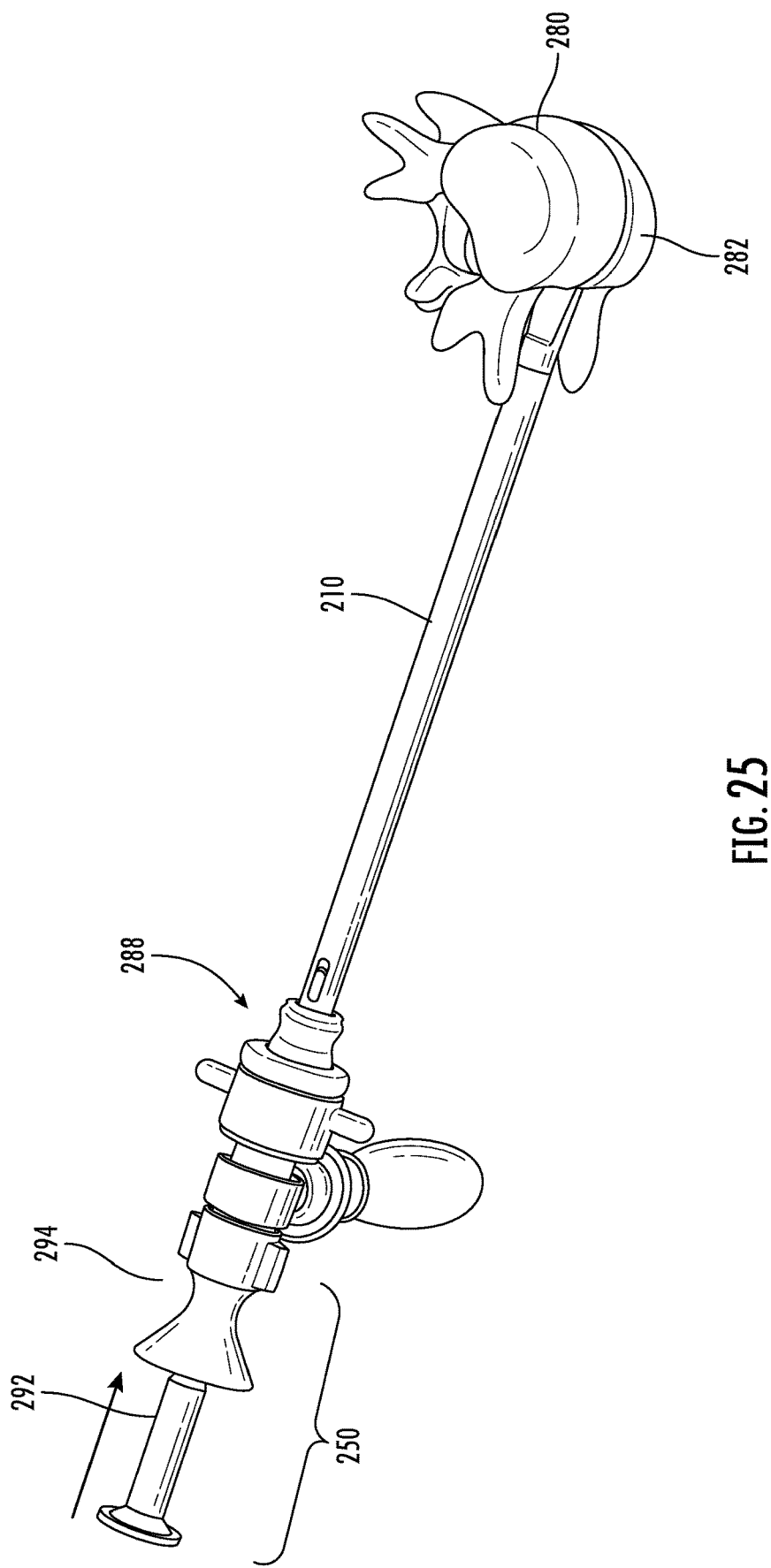

In certain embodiments, instrument 200 may include a proximal actuation unit 286 that may be removed from the rest of instrument 200 to allow for bone graft backfilling of implant 100. As shown in FIGS. 23 and 24, once locking bar 242 is rotated into the locked position, proximal actuation unit 286 may be withdrawn proximally to allow a graft funnel 294 to be coupled to the proximal end of instrument 288. Bone graft may then be introduced through shaft 210 and into implant 100 with, for example, a syringe 290 or other suitable method known to those in the art. The bone graft may be advanced into implant 100 with a graft pusher 292 or other component (see FIG. 25). Once the physician has completed the lordosis angle adjustment and/or the graft filling step, cage fixation screw 246 is loosened to open gripping arms 216, 218 so that the physician may remove the instrument from the patient.

The process of angle adjustment is reversible. For example, the above process can be reversed such that the inner rod is moved distally to move translation member 116 distally and bring the distal ends of endplates closer to each other.

Figure 26:
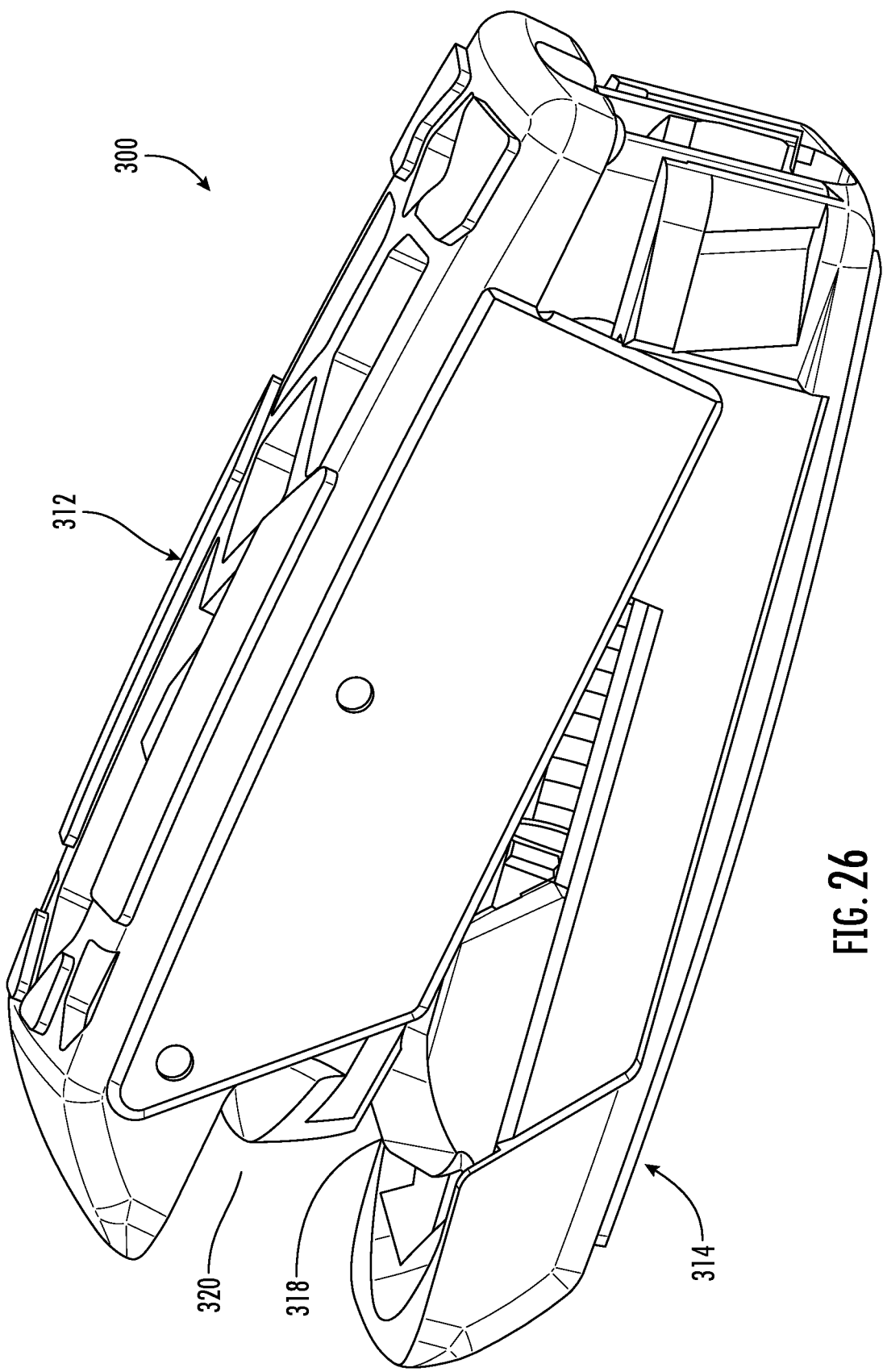
FIG. 26 is a perspective view of another embodiment of a spinal device.
Figure 27:
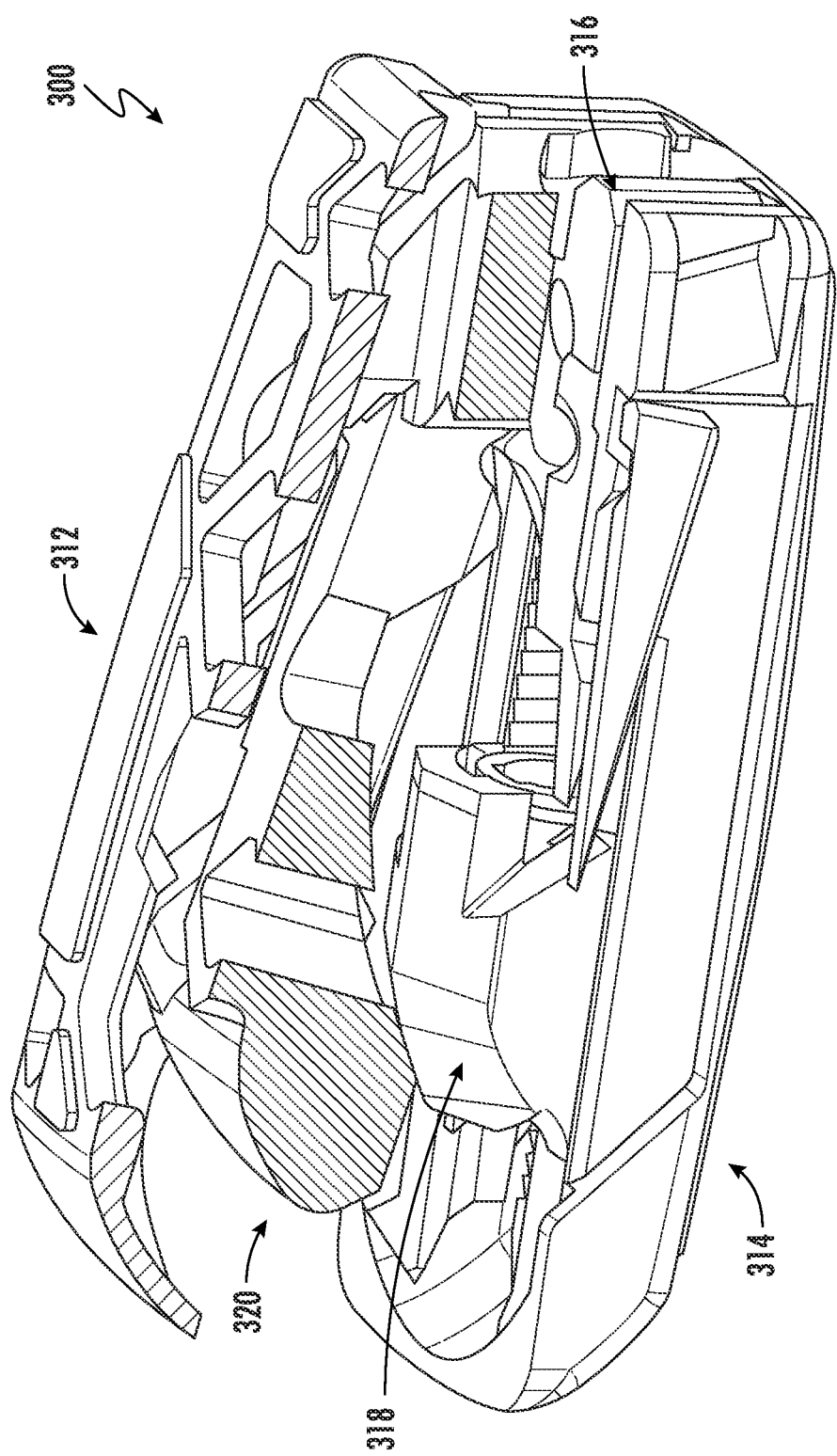
FIG. 27 is a partial cutaway of the device of FIG. 26.
Figure 28:
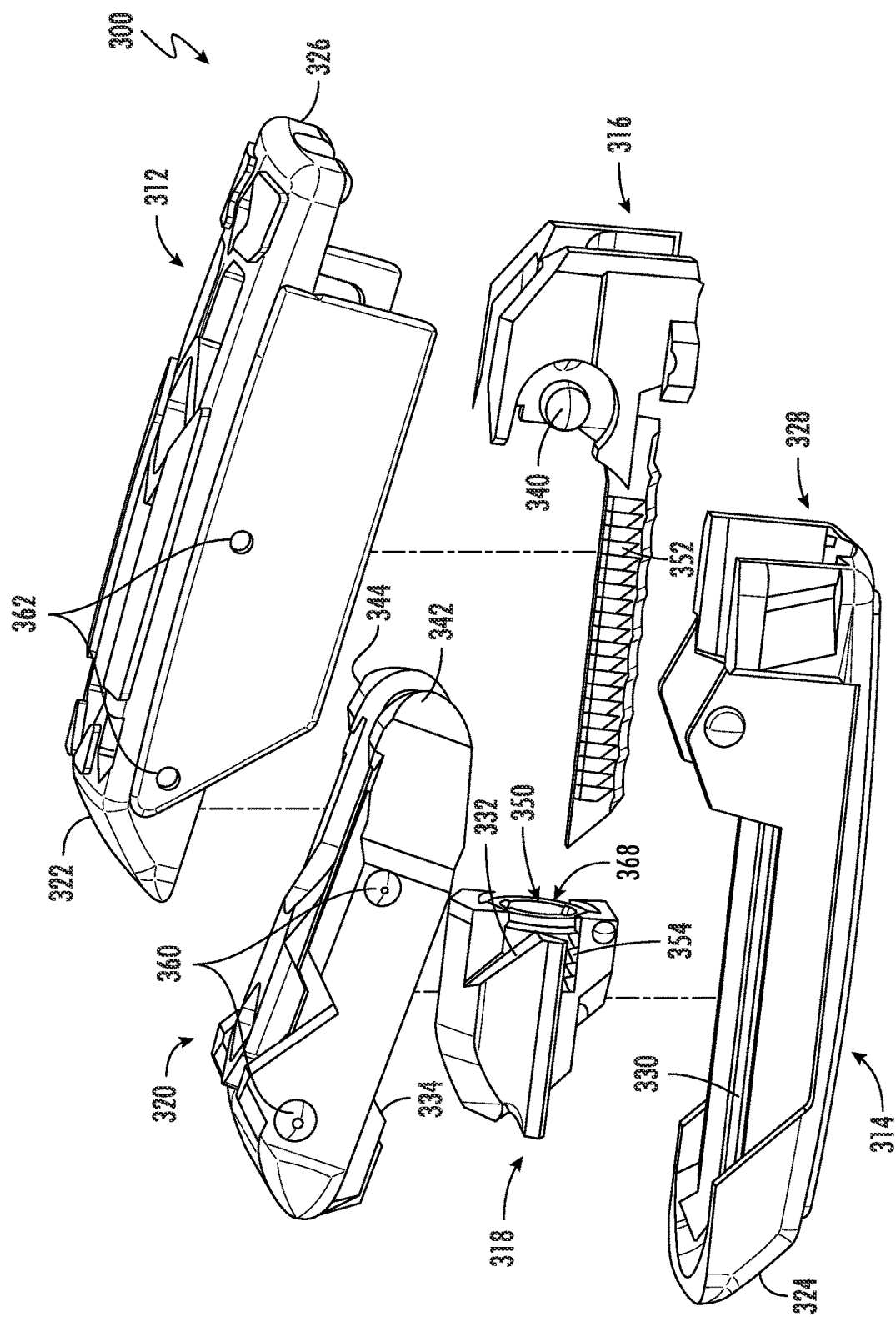
FIG. 28 is an exploded view of the device of FIG. 26.
Figure 29:
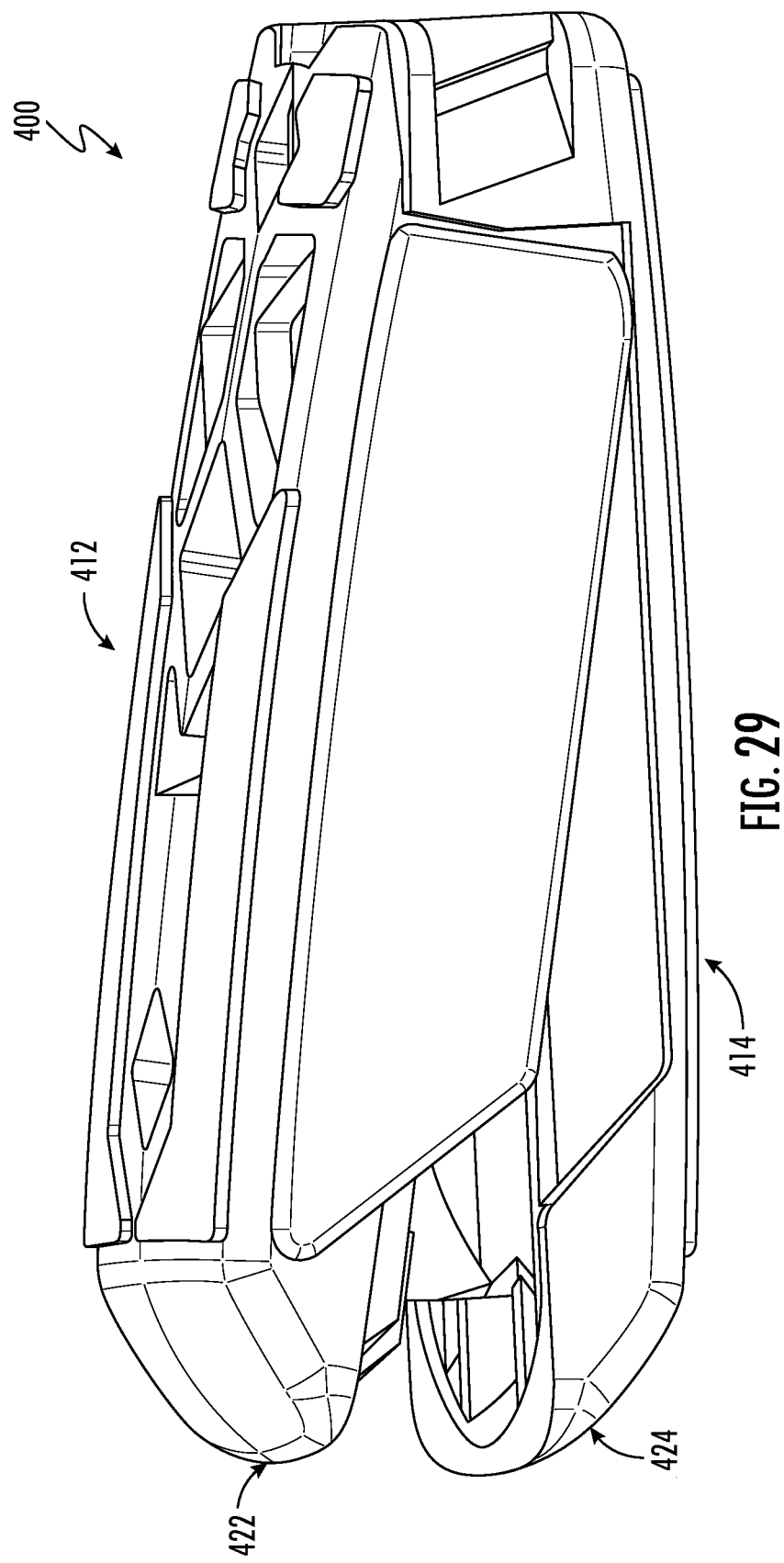
FIG. 29 is a perspective view of another embodiment of a spinal device.
Figure 30:
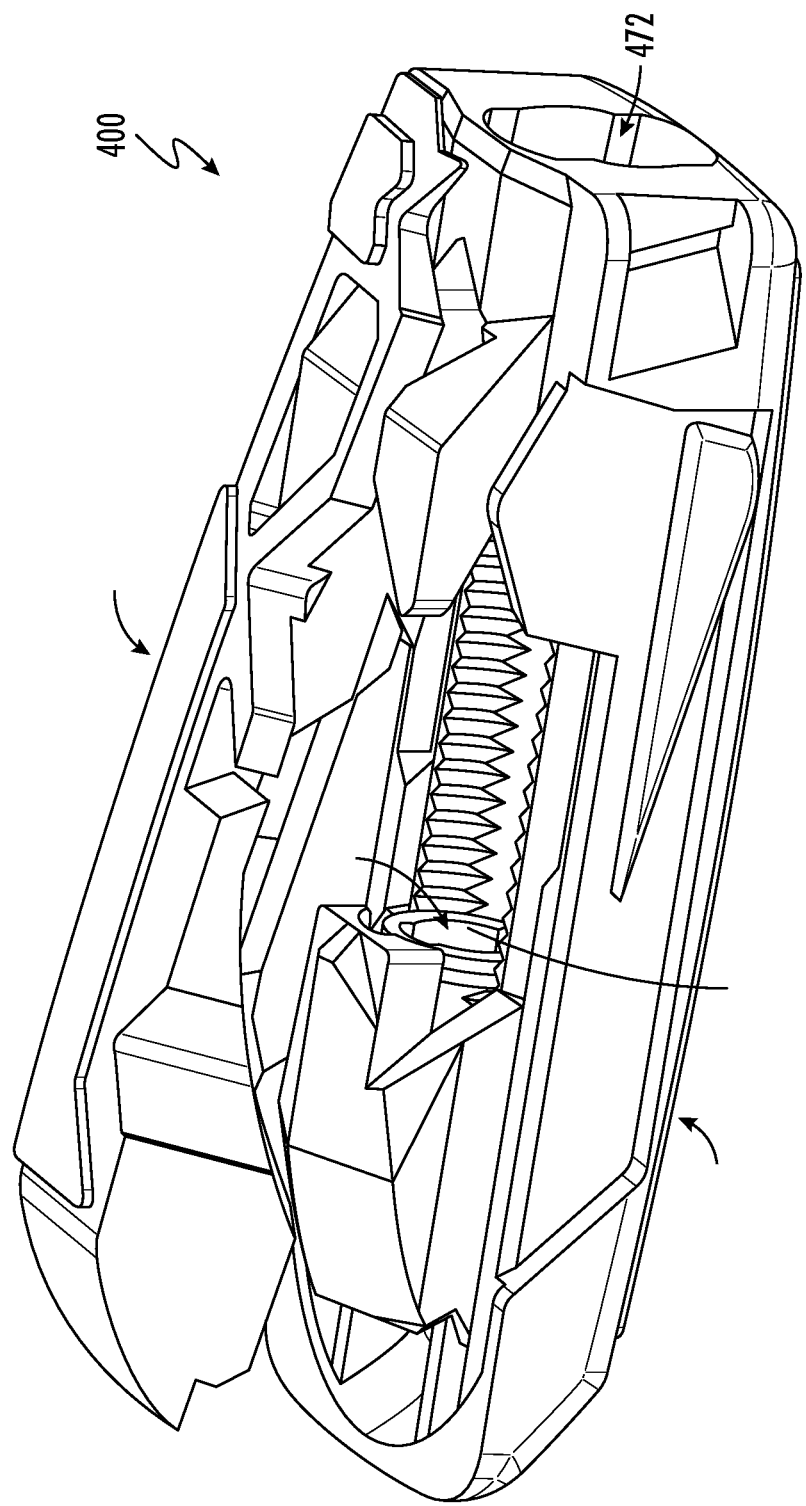
FIG. 30 is a partial cutaway view of the device of FIG. 29.
Figure 31:
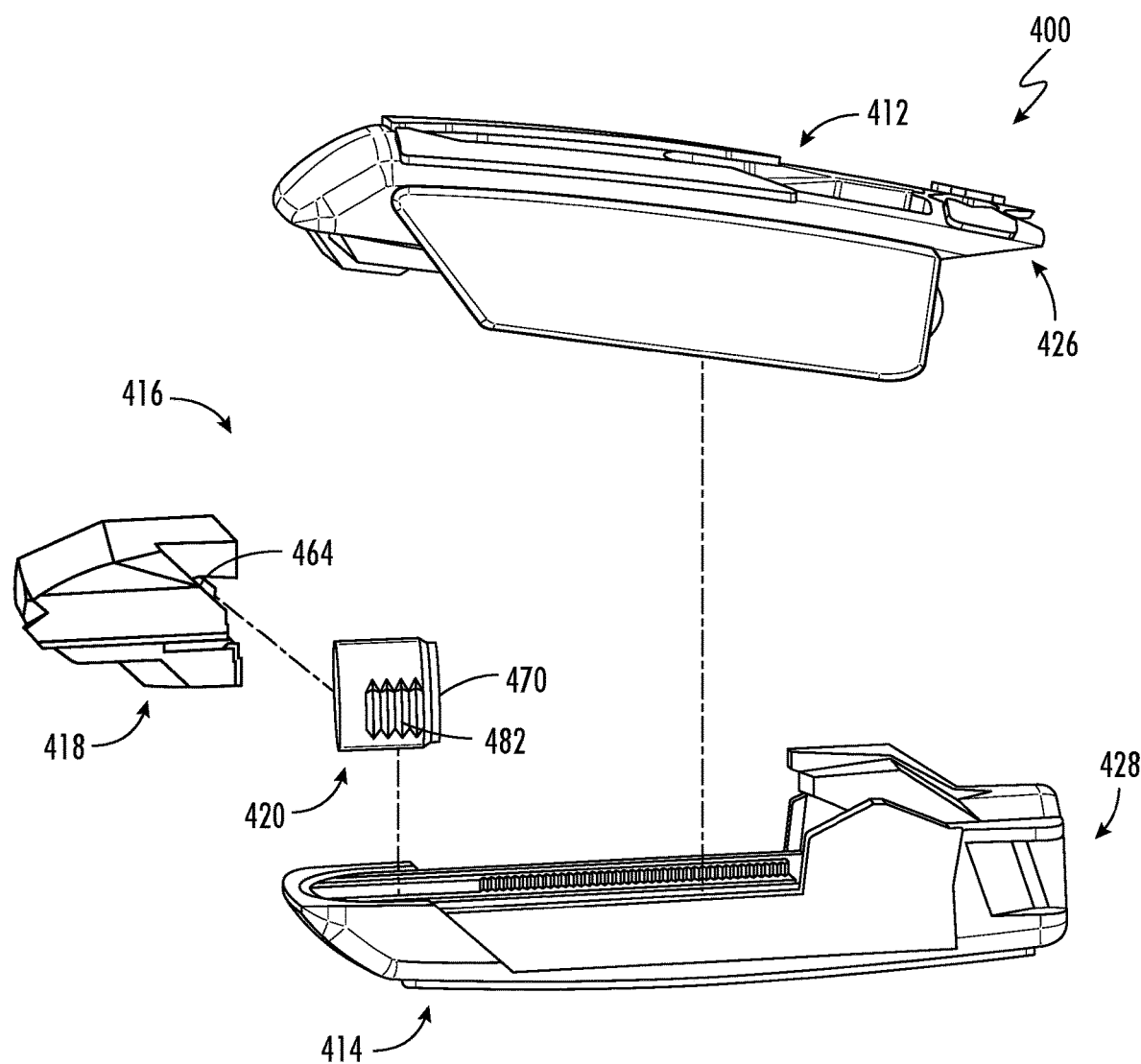
FIG. 31 is an exploded view of the device of FIG. 29.

Referring now to FIGS. 26-28, another embodiment of a spinal implant 300 will now be described. Spinal implant 300 generally has similar features as spinal implant 100 except where described herein. As shown, implant 300 includes upper and lower endplates 312, 314, an internal support member 320 and first and second translation members 316, 318. In this embodiment, the angle between upper and lower endplates 312, 314 may be adjusted. However, the height or distance between the proximal ends of the endplates is not adjustable. More specifically, the distance between distal ends 322, 324 of endplates 312, 314 may be adjusted whereas the distance between proximal ends 326, 328 generally remains substantially fixed.

Internal support member 320 may be coupled to, or integral with, lower endplate 314. Second translation member 316 may be coupled to, or integral with, upper endplate 314. Second translation member 316 is pivotally coupled to support member 320 with a hinge located near proximal ends 326, 328 of endplates 312, 314. This hinge allows support member 320 and upper endplate 312 to pivot relative to second translation member 316 and lower endplate 314 around an axis substantially perpendicular to the longitudinal axis of implant 300. In an exemplary embodiment, translation member 316 includes projections 340 on either side that are designed to cooperate with openings or channels (not shown) in support member 320 to form the hinge. Thus, support member 320 includes first and second proximal arms 342, 344 designed to fit on either side of translation member 316 such that the projections 340 extend into the openings or channels on arms 342, 344.

Lower endplate 314 includes a central channel 330 for receiving translation members 316, 318. First translation member 318 is movable in the longitudinal direction relative to support member 320, endplates 312, 314 and second translation member 316. Similar to previous embodiments, first translation member 316 includes one or more angles surfaces or wedges 332 designed to cooperate with angled surfaces or ramps 334 on support member 320. Longitudinal movement of first translation member 318 causes the distal end of support member 320 to move upwards away from lower endplate 314 (while pivoting about the hinge at the proximal end of implant 10). First translation member 318, in turn, causes the distal end 322 of upper endplate 312 to move towards or away from distal end 324 of lower endplate 314.

Similar to previous embodiments, second translation member 318 includes a locking member 368 that is rotatably coupled to second translation member 318 such that locking member 368 may be rotated about the longitudinal axis relative to translation member 318. Locking member 368 includes a central bore 350 for receiving actuator shaft 220 of a surgical instrument 200 (see FIGS. 8A-11) that causes longitudinal movement of translation member 318. To that end, bore 350 includes a first annular mating feature configured to receive, and couple to, first mating feature 222 of the rod 202. In an exemplary embodiment, this mating feature includes a cavity or cut-out sized to receive first mating feature 222 of rod 202 (discussed in more detail below). The cavity may include includes a proximal rim or projection (not shown) that extends towards the longitudinal axis and has a smaller inner diameter than the inner diameter of the cavity. Once actuator shaft 220 is coupled to translation member 318, longitudinal translation of actuator shaft 220 causes translation member 318 to move longitudinally relative to the endplates 212, 314, thereby moving the endplates towards or away from each other.

Locking member 368 further includes a second mating feature (not shown) configured to cooperate with a second mating feature 224 of surgical instrument 200 (see FIGS. 8A-11). The second mating feature is configured to cooperate with second mating feature 224 to rotate locking member 368 relative to translation member 318, as discussed above in reference to implant 100.

Also, similar to previous embodiments, implant 300 may include a clicker system for providing discrete steps or increments of angle adjustment. In an exemplary embodiment, the clicker system comprises a series of projections or teeth 352 on support member 316 that cooperate with a series of projections 354 on translation member 318. As translation member 318 moves longitudinally, the projections 354 are configured to move from the space between two teeth 352 to the space between adjoining teeth. These spaces provide the discrete steps or increments. In addition, teeth 352 hold translation member 318 in position relative to endplate 312 to maintain a particular angle between the upper and lower endplates. The projections also inhibit reverse movement (i.e., distal movement) of translation member 318 relative to the endplates.

Similar to previous embodiments, implant 300 may include a number of features that couple the components together and/or stabilize the implant during angle adjustment. In an exemplary embodiment, support member 320 includes one or more projections, such as conical pins 360, extending through openings 362 in upper endplate 312. Lower endplate 314 may also include openings or projections for coupling to one or more of the components of implant 300.

Referring now to FIGS. 29-33, another embodiment of a spinal implant 400 will now be described. Implant 400 is similar in many features to implant 300 and implant 100. As shown, implant 400 includes upper and lower endplates 412, 414 and a translation member 416. In this embodiment, there is no additional support member. The features of support member 318 of the previous embodiment are incorporated into upper endplate 412. As in the previous implant 300, the angle between upper and lower endplates 412, 414 may be adjusted. However, the height or distance between the endplates is not adjustable. More specifically, the distance between distal ends 422, 424 of endplates 412, 414 may be adjusted whereas the distance between proximal ends 426, 428 generally remains fixed.

Upper endplate 412 is pivotally coupled to lower endplate 414 with a hinge located near the proximal ends of endplates 412, 414. This hinge allows upper endplate 412 to pivot relative to lower endplate 414 around an axis substantially perpendicular to the longitudinal axis of implant 400. In an exemplary embodiment, upper endplate 414 includes first and second proximal arms 430, 432 laterally spaced from each other and each having an opening 434 therethrough (see FIG. 32). Lower endplate 414 includes a central main body 440 and side walls 442, 444 (see FIG. 33). Main body 440 is spaced from side walls 442, 444 to form first and second channels or gaps 446, 448 therebetween for receiving first and second arms 430, 432 of support member 418. Lower endplate 414 further includes first and second projections 450, 452 extending outwardly from main body 440 towards side walls 442, 444 within gaps 446, 448. Projections 450, 452 also extend into openings 434 in arms 430, 432 of upper endplate 412 and are designed to cooperate with these openings to form the hinge.

Figure 33:
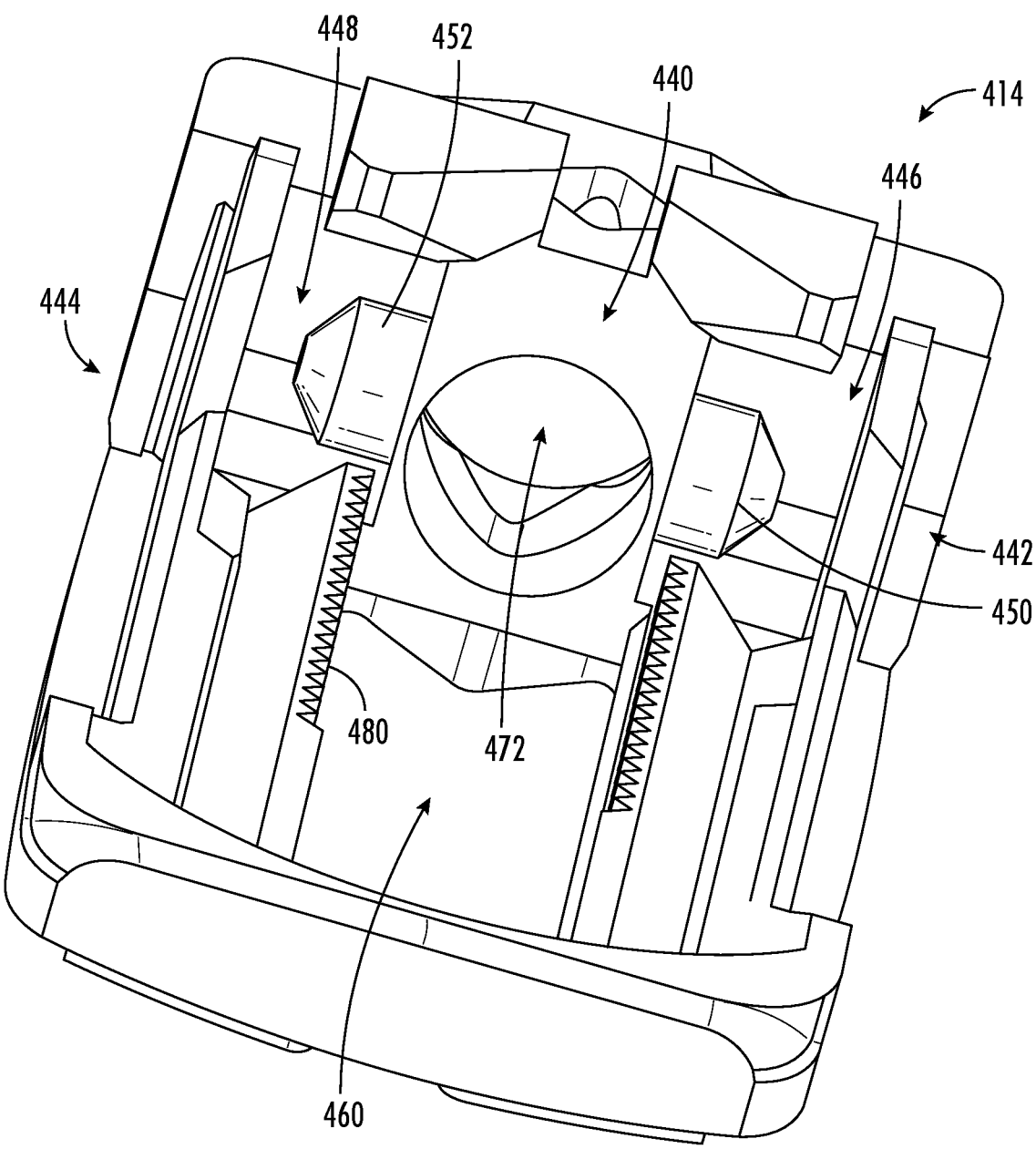
FIG. 33 illustrates a lower endplate of the device of FIG. 29.

As shown in FIG. 33, lower endplate 414 includes a central channel 460 for receiving translation member 416. Translation member 416 is movable in the longitudinal direction within channel 460 relative to endplates 412, 414. Similar to previous embodiments, translation member 416 includes one or more angles surfaces or wedges 464 designed to cooperate with angled surfaces or ramps 466 on upper endplate 412. Longitudinal movement of translation member 416 causes the distal end of upper endplate 412 move towards or away from lower endplate 414 (while pivoting about the hinge at the proximal end of implant 400).

Figure 32:
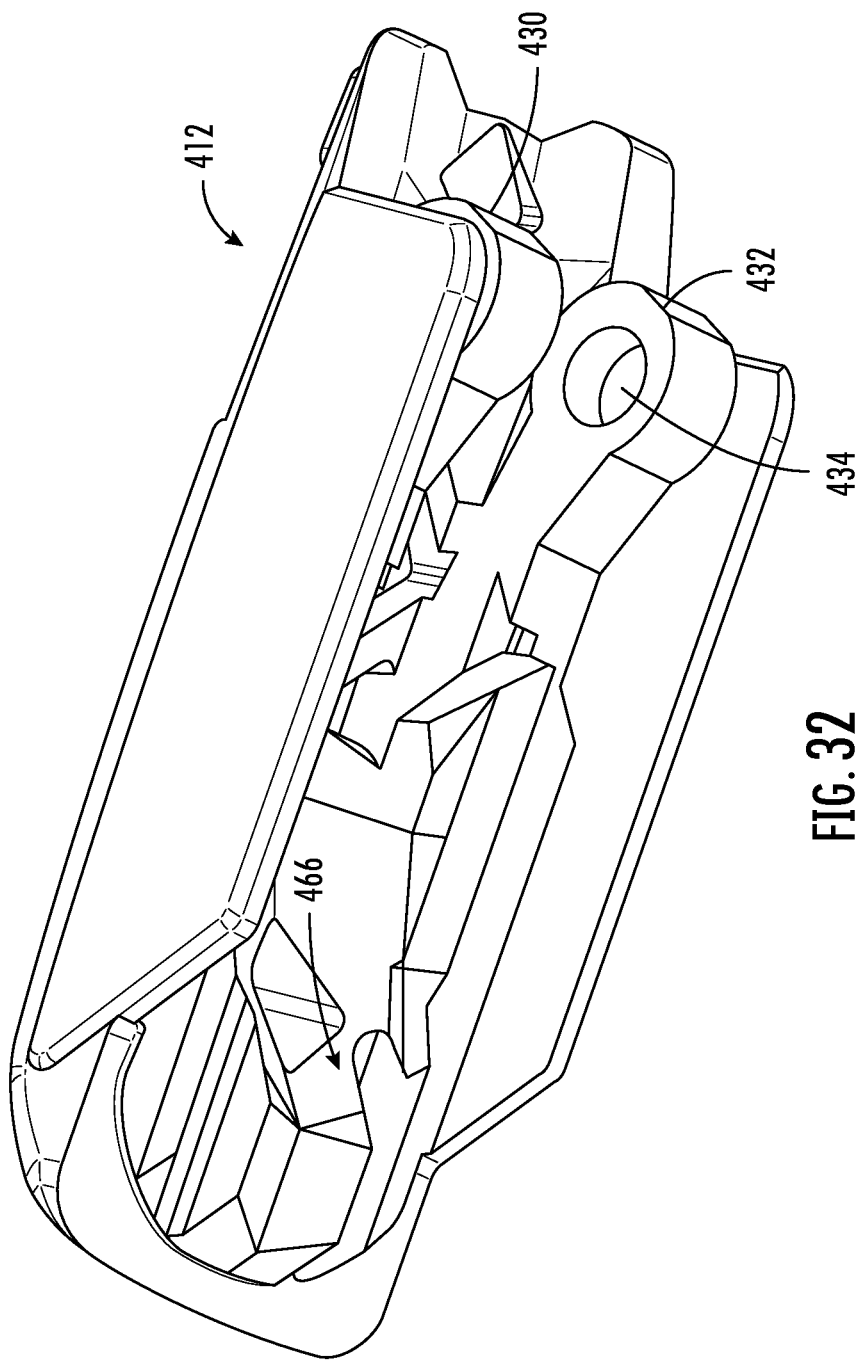
FIG. 32 illustrates an upper endplate of the device of FIG. 29.

As shown in FIG. 32, translation member 416 includes a main body 418 and a locking member 468 that is rotatably coupled to main body 418 such that locking member 468 may be rotated about the longitudinal axis relative to translation member 416. Locking member 468 functions in a manner similar to previous embodiments. Lower endplate 414 may also include a central bore 472 at its proximal end for receiving the actuator shaft, which passes through bore 472 and central channel 460 of lower endplate 414 to cooperate with the mating features within bore 470 of locking member 468. These mating features may be similar to those described above.

Also, similar to previous embodiments, implant 400 may include a clicker system for providing discrete steps or increments of angle adjustment. In an exemplary embodiment, the clicker system comprises a series of projections or teeth 480 within channel 460 of lower endplate 414 that cooperate with a series of projections 482 on translation member 416. As translation member 416 moves longitudinally, the projections 482 are configured to move from the space between two teeth 480 to the space between adjoining teeth. These spaces provide the discrete steps or increments. In addition, teeth 480 hold translation member 416 in position relative to endplate 412 to maintain a particular angle between the upper and lower endplates. The projections may also inhibit reverse movement (i.e., distal movement) of translation member 416 relative to the endplates.

Similar to previous embodiments, implant 400 may include a number of features that couple the components together and/or stabilize the implant during angle adjustment.

Figure 34:
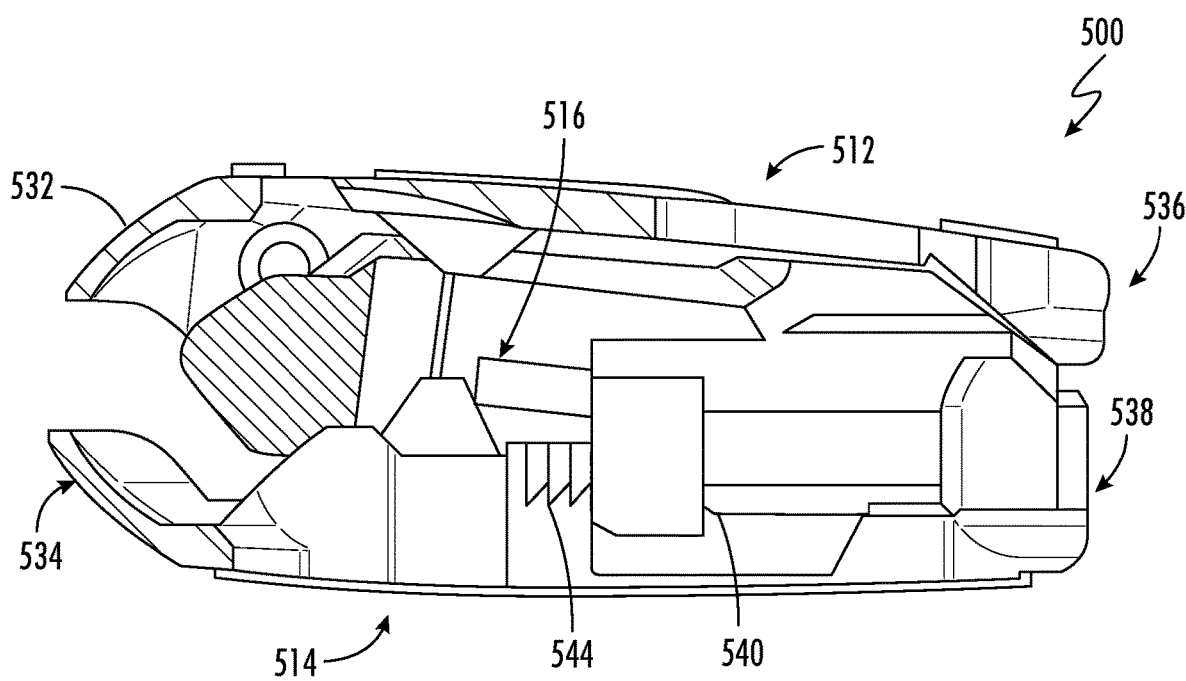
FIG. 34 is a partial cutaway view of another embodiment of a spinal device.
Figure 35:
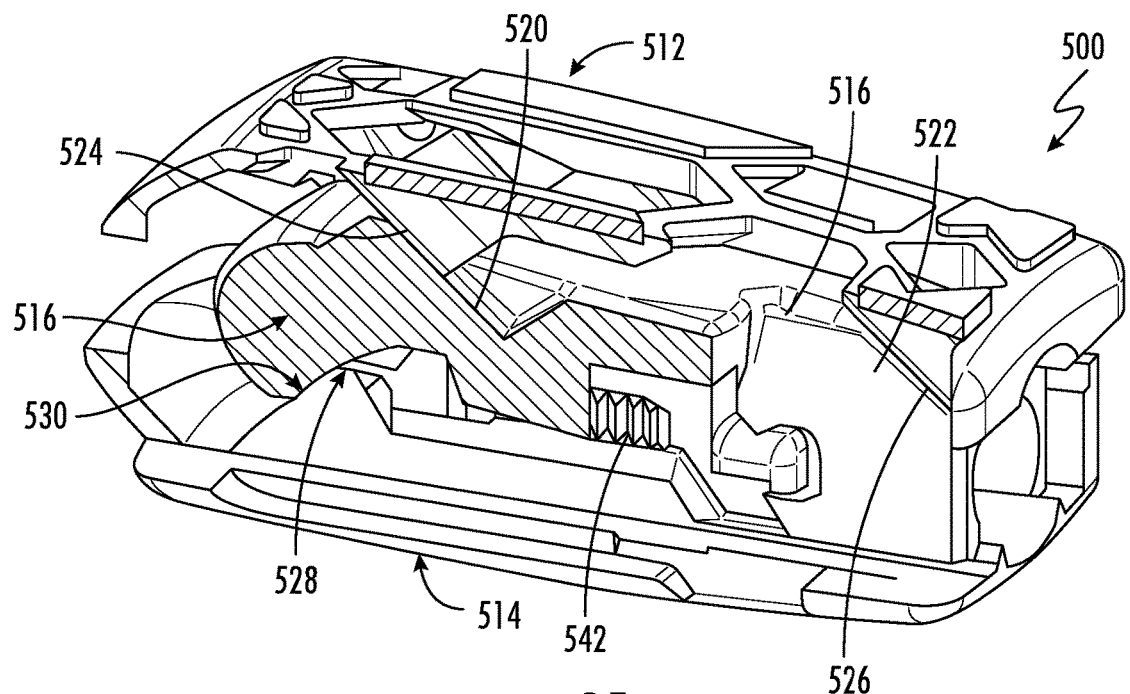
FIG. 35 is another view of the spinal device of FIG. 34.

Referring now to FIGS. 34 and 35, another embodiment of a spinal implant 500 comprises upper and lower endplates 512, 514 and a translation member 516. Implant 500 has many similar features and elements as the previous embodiments. In this embodiment, however, translation member 516 is configured to adjust both the angle and height of endplates 512, 514 as it is moved longitudinally relative to endplates 512, 514.

As shown in FIG. 35, translation member 516 includes first and second distal angled surfaces or wedges 520 and first and second proximal angled surfaces or wedges 522. The distal and proximal wedges 520, 522 extend downward from upper endplate 512 in the proximal direction and are spaced from each other laterally relative to the longitudinal axis of implant 500 (note that only one of the distal and proximal wedges 520, 522 is shown). Upper endplate 514 also includes first and second distal angled surfaces or ramps 524 and first and second distal angled surfaces or ramps 526 (again only one of each of these ramps is shown). As in previous embodiments, longitudinal movement of translation member 516 causes the wedges to contact the ramps and move upper endplate 512 towards and away from lower endplate 514.

Transition member 516 further includes two lower distal wedges 528 extending upward towards upper endplate 512 in the proximal direction and laterally spaced from each other. Similarly, lower endplate 514 includes two distal angled surfaces or ramps 530 extending upwards towards upper endplate 514 in the proximal direction (only one of each ramp and wedge is shown). Longitudinal movement of transition member 516 causes wedges 528 to contact ramps 530 such that distal ends 532, 534 of endplates 512, 514 move towards and away from each other. Since proximal ends 536, 538 of endplates 512, 514 do not move relative to each other in conjunction with distal ends 532, 534, this causes the overall angle of endplates 512, 514 to change. Note that while proximal ends 536, 538 do move upwards with the overall increase in height, this movement is coordinated with movement of distal ends 532, 534. However, distal ends 532, 534 move further away from each other than proximal ends 536, 538 resulting in an adjustment of angle between endplates 512, 514.

Similar to previous embodiments, translation member 516 includes a locking member (not shown) having an internal bore 540 for receiving, and mating with, a shaft actuator (not shown) of an instrument shaft. The shaft actuator causes longitudinal movement of translation member 516. Similar to previous embodiments, implant 500 may include a number of features that couple the components together and/or stabilize the implant during angle adjustment.

Also similar to previous embodiments, translation member 516 includes a ratchet shaft 442 that cooperates with projections or teeth 544 on lower endplate 514 to provide discrete steps or increments of height and/or angle adjustment.

The entire implant can be fabricated through additive manufacturing techniques, such as 3D printing. The implant is formed layer by layer, such as for example, in the longitudinal direction from the proximal end to the distal end. Upon completion of manufacturing, the upper and lower endplates are substantially separated from each other except for their distal end portions. These portions are separated through wire EDM by cutting a substantially vertical line through these portions to form two separate components. In the Spring component, the endplates remain coupled together solely by the leaf spring. The endplates retain positional stability relative to each other during use by the conical knobs in the proximal translation member that slide through angled slots in the endplates, the conical knobs in the lower endplate that slide through the vertical slots in the upper endplate and the leaf spring.

In an exemplary embodiment, the implants are produced by Selective Laser Melting (SLM). For example, a substrate plate is fastened to an indexing table inside a chamber with a controlled atmosphere of inert gas (e.g., argon or nitrogen). Metal powder is applied flat to the substrate plate as a layer. The metal powder is preferably a titanium alloy, e.g. Ti-6Al-4V to enable biocompatibility. Each 2D slice of the cage is fused by selectively melting the metal powder via a laser. The laser has enough energy to fully melt or rather weld the metal particles to form solid metal. The substrate plate is lowered by the layer thickness (z-direction). New metal powder is applied and the process is repeated layer by layer until the part is complete. The completed part is removed from the substrate plate by cutting or breaking off.

Preferably, all components of the cage are printed nested within each other. Compared to separately 3D printing all components next to each other, a higher utilization rate can be achieved. This means that during 3D printing, a higher proportion which is melted and a lower proportion which stays as metal powder can be achieved. Thus, production time and costs can be reduced significantly.

After 3D printing, areas connecting single components of the cage are cut by electrical discharge machining (EDM) to enable their separate movement. Further, EDM can be used to realize smooth surfaces, e.g., to enable low friction sliding of two components against each other. With EDM, the cage can also be removed from the substrate plate.

To lower production costs, several cages can be printed onto one substrate plate. In this case, before removing the cages, EDM can be used to simultaneously cut all cages placed on the substrate plate.

The implant may comprise one or more exhaust openings in the upper and lower endplates to allow for extraction of the metal powder remaining in the cage after 3D printing. Preferably, the exhaust opening is positioned on a lateral surface of the moving plate. It is also possible to position the exhaust opening on a horizontal surface of the cage, preferably on the base plate or on the moving plate. Preferably, the cage comprises multiple exhaust openings. Thus, more areas inside the cage are reachable and the metal powder can be extracted more efficiently. It is also possible to configure an external sliding mean, preferably a conical groove, in such a way that it can be additionally used as an exhaust opening. Therefore, the conical groove is deepened until a passage to the outside has been made.

Additional embodiments of the adjustable spinal fusion cage are described in related and co-owned U.S. application Ser. No. 17/865,755 filed Jul. 15, 2022, and International Patent Application No. PCT/EP2022/069886 filed Jul. 15, 2022, the contents of which are incorporated herein in their entirety by reference. It is to be understood that features present in these patent applications may be incorporated into the adjustable spinal fusion cages described herein.

Other embodiments will be apparent to those skilled in the art from consideration of the specification and practice of the embodiment disclosed herein. It is intended that the specification and examples be considered as exemplary only, with a true scope and spirit of the embodiment being indicated by the following claims.

For example, in a first aspect, a first embodiment is an adjustable spinal fusion device comprising an upper endplate having an outer surface for placement against a first vertebral body, a lower endplate having an outer surface for placement against a second vertebral body, a translation member configured to move longitudinally relative to the upper and lower endplates to adjust an angle between the upper and lower endplates and a locking member coupled to the translation member and configured to secure a longitudinal position of the translation member relative to the upper and lower endplates.

A second embodiment is the first embodiment, wherein the translation member comprises a bore having one or more mating features for cooperating with an actuator shaft of a surgical instrument to move the translation member in the longitudinal direction.

A third embodiment is any combination of the first two embodiments, wherein the locking member is rotatably coupled to the translation member within the bore from an unlocked position, wherein the translation member is capable of moving in the longitudinal direction, to a locked position, wherein the translation member is constrained from moving in the longitudinal direction.

A 4$^{th}$ embodiment is any combination of the first 3 embodiments, wherein the locking member comprises one or more mating features for cooperating with the actuator shaft of the surgical instrument such that rotation of at least a portion of the surgical instrument causes rotation of the locking member within the bore.

A 5$^{th}$ embodiment is any combination of the first 4 embodiments, wherein rotation of the locking member into the unlocked position causes the mating features of the translation member to secure to mating features of the surgical instrument.

A 6$^{th}$ embodiment is any combination of the first 5 embodiments, further comprising one or more engagement elements coupled to one of the upper and lower endplates, wherein the locking member comprises one or more locking elements that engage the engagement elements in one of the upper and lower endplates in the locked position.

A 7$^{th}$ embodiment is any combination of the first 6 embodiments, wherein the locking elements of the locking member comprise a plurality of projections and the engagement elements of one of the upper and lower endplates comprise a plurality of teeth that engage the projections in the locked position.

An 8$^{th}$ embodiment is any combination of the first 7 embodiments, wherein the upper and lower endplates each have proximal and distal ends, wherein the proximal ends are pivotally coupled to each other and wherein the distal ends are movable relative to each other to adjust a distance therebetween.

A 9$^{th}$ embodiment is any combination of the first 8 embodiments, wherein the translation member comprises an angled surface extending downward from the upper endplate towards the lower endplate in the proximal direction, the device further comprising a ramp for cooperating with the angled surface of the translation member.

A 10$^{th}$ embodiment is any combination of the first 9 embodiments, wherein the ramp is on the upper endplate.

An 11$^{th}$ embodiment is any combination of the first 10 embodiments, further comprising an internal support member coupled to, or integral with, the upper endplate and a hinge pivotally coupling the internal support member to the lower endplate, wherein the ramp is on the internal support member.

A 12$^{th}$ embodiment is any combination of the first 11 embodiments, wherein proximal translation of the translation member causes the angled surface to engage the ramp and move the distal end of the upper endplate away from the distal end of the lower endplate.

A 13$^{th}$ embodiment is any combination of the first 12 embodiments, wherein the proximal ends of the endplates remain substantially fixed relative to each other as the distal ends are moved apart.

A 14$^{th}$ embodiment is any combination of the first 13 embodiments, wherein longitudinal translation of the translation member adjusts a distance between the proximal and distal ends of the endplates.

A 15$^{th}$ embodiment is any combination of the first 14 embodiments, further comprising a second translation member configured to move longitudinally relative to the upper and lower endplates to adjust a height between the upper and lower endplates.

A 16$^{th}$ embodiment is any combination of the first 15 embodiments, wherein the upper and lower endplates each have proximal and distal ends, wherein the proximal ends are movable relative to each other to adjust a distance therebetween.

A 17$^{th}$ embodiment is any combination of the first 16 embodiments, wherein the second translation member comprises one or more angled surfaces extending downward from the upper endplate towards the lower endplate in the proximal direction, the device further comprising a ramp for cooperating with the angled surfaces of the second translation member to adjust the distance between the proximal ends of the endplates upon longitudinal translation of the second translation member.

An 18$^{th}$ embodiment is any combination of the first 17 embodiments, wherein the second translation member is integral with the first translation member.

In another aspect, a first embodiment is a spinal fusion system comprising an adjustable spinal fusion device and an instrument. The fusion device comprises: an upper endplate having an outer surface for placement against a first vertebral body, a lower endplate having an outer surface for placement against a second vertebral body, a translation member configured to move longitudinally relative to the upper and lower endplates to adjust an angle between the upper and lower endplates and a locking member coupled to the translation member and configured to secure a longitudinal position of the translation member relative to the upper and lower endplates. The instrument comprises a proximal handle, an elongate shaft, and a mating feature on the elongate shaft for cooperating with the locking member.

A second embodiment is the first embodiment, wherein the mating feature on the surgical instrument is configured to rotate the locking member from an unlocked position, wherein the translation member is capable of moving in the longitudinal direction, to a locked position, wherein the translation member is inhibited from moving in the longitudinal direction.

A third embodiment any combination of the first 2 embodiments, wherein the mating feature is a first mating feature and the instrument comprises a second mating feature, wherein the translation member comprises a bore having one or more engagement elements for cooperating with the second mating feature to secure the translation member to the instrument such that longitudinal movement of the instrument causes the translation member to move longitudinally relative to the upper and lower endplates.

A 4$^{th}$ embodiment is any combination of the first 3 embodiments, wherein the locking member is rotatably coupled to the translation member within the bore.

A 5$^{th}$ embodiment is any combination of the first 4 embodiments, wherein rotation of the locking member into the unlocked position causes the engagement features of the translation member to secure to the second mating feature of the surgical instrument.

A 6$^{th}$ embodiment is any combination of the first 5 embodiments, wherein the second mating feature comprises one or more projections extending from a distal end of the shaft of the surgical instrument and the engagement features of the translation member comprise one or more recesses in an interior surface of the bore.

A 7$^{th}$ embodiment is any combination of the first 6 embodiments, wherein the first mating feature comprises one or more projections extending from the distal end of the shaft of the surgical instrument, wherein the first mating feature is locating proximal to the second mating feature on the elongate shaft.

An 8$^{th}$ embodiment is any combination of the first 7 embodiments, further comprising one or more engagement elements coupled to one of the upper and lower endplates, wherein the locking member comprises one or more locking elements that engage the engagement elements in one of the upper and lower endplates in the locked position.

A 9$^{th}$ embodiment is any combination of the first 8 embodiments, wherein the locking elements of the locking member comprise a plurality of projections and the engagement elements of one of the upper and lower endplates comprise a plurality of teeth that engage the projections in the locked position.

A 10$^{th}$ embodiment is any combination of the first 9 embodiments, wherein the upper and lower endplates each have proximal and distal ends, wherein the proximal ends are pivotally coupled to each other at the proximal ends and wherein the distal ends are movable relative to each other to adjust a distance therebetween.

An 11$^{th}$ embodiment is any combination of the first 10 embodiments, wherein the translation member comprises an angled surface extending downward from the upper endplate towards the lower endplate in the proximal direction, the device further comprising a ramp for cooperating with the angled surface of the translation member.

A 12$^{th}$ embodiment is any combination of the first 11 embodiments, wherein proximal translation of the translation member causes the angled surface to engage the ramp and move the distal end of the upper endplate away from the distal end of the lower endplate.

A 13$^{th}$ embodiment is any combination of the first 12 embodiments, wherein the proximal ends of the endplates remain substantially fixed relative to each other as the distal ends are moved apart.

A 14$^{th}$ embodiment is any combination of the first 13 embodiments, wherein longitudinal translation of the translation member adjusts a distance between the proximal and distal ends of the endplates.

A 15$^{th}$ embodiment is any combination of the first 14 embodiments, further comprising a second translation member configured to move longitudinally relative to the upper and lower endplates to adjust a height between the upper and lower endplates.

In another aspect, a first embodiment is a method for implanting a spinal fusion device in a patient comprising coupling a distal end of a surgical instrument to the spinal fusion device, positioning the spinal fusion device between first and second vertebrae in the patient, rotating a first portion of the surgical instrument to unlock a translation member within the spinal fusion device and translating a second portion of the surgical instrument longitudinally to advance the translation member in a longitudinal direction relative to upper and lower endplates of the spinal fusion device to adjust an angle between the upper and lower endplates.

A second embodiment is the first embodiment, further comprising rotating the first portion of the instrument to lock the longitudinal position of the translation member relative to the upper and lower endplates.

A third embodiment is any combination of the first 2 embodiments, further comprising translating the second portion of the surgical instrument longitudinally to adjust a height between the upper and lower endplates.

A 4$^{th}$ embodiment is any combination of the first 3 embodiments, further comprising inserting a distal end of a shaft of the surgical instrument through a bore in the translation member and rotating the distal end of the shaft to lock the instrument to the translation member.

A 5$^{th}$ embodiment is any combination of the first 4 embodiments, wherein the translation member comprises one or more recesses within an interior surface of the bore and the shaft comprises one or more projections, wherein the method further comprises rotating the projections into the recesses.

A 6$^{th}$ embodiment is any combination of the first 5 embodiments, wherein the locking member is moved into the unlocked position when the projections are rotated into the recesses.

A 7$^{th}$ embodiment is any combination of the first 6 embodiments, wherein the one or more projections are a first set of projections and the shaft comprises a second set of one or more projections positioned proximally of the first set, wherein the second set of projections engage an interior surface of a bore of the locking member to rotate the locking member when the shaft of the instrument is rotated.

In another aspect, a first embodiment is a surgical instrument for implanting a spinal fusion device in a patient. The instrument comprises an elongate shaft having a proximal handle and a distal end portion, a first mating feature for securing the shaft of the instrument to the spinal fusion device, a second mating feature on the distal end portion for engaging a translation member of the spinal fusion device and a third mating feature on the distal end portion for engaging a locking member of the spinal fusion device.

A second embodiment is the first embodiment, further comprising a rod extending through a lumen of the shaft, wherein the second and third mating features are positioned on a distal portion of the rod.

A third embodiment is any combination of the first 2 embodiments, wherein the rod is rotatable relative to the shaft to rotate the locking member of the spinal fusion device.

A 4$^{th}$ embodiment is any combination of the first 3 embodiments, wherein the rod is configured to translate in a longitudinal direction relative to the shaft to translate the translation member of the spinal fusion device.

A 5$^{th}$ embodiment is any combination of the first 4 embodiments, wherein the first mating feature comprises first and second gripping arms configured to engage and secure to a proximal portion of the spinal fusion device.

A 6th embodiment is any combination of the first 5 embodiments, wherein the second mating feature comprises one or more projections extending from the distal portion of the rod.

A 7th embodiment is any combination of the first 6 embodiments, wherein the third mating feature comprises one or more projections extending from the distal portion of the rod proximal to the second mating feature.

An 8th embodiment is any combination of the first 7 embodiments, wherein the second mating feature is configured to secure to the translation member when the third mating feature moves the locking member into an unlocked position that allows translation of the translation member.

A 9th embodiment is any combination of the first 8 embodiments, further comprising a rotatable knob on the proximal handle coupled to the rod and configured to translate the rod relative to the shaft.

A 10th embodiment is any combination of the first 9 embodiments, further comprising a gauge on the proximal handle coupled to the rotatable knob and configured to indicate a lordosis angle of first and second endplates on the spinal fusion device.

The invention claimed is:

1. An adjustable spinal fusion device, comprising:
an upper endplate having an outer surface for placement against a first vertebral body;
a lower endplate having an outer surface for placement against a second vertebral body;
a translation member configured to move longitudinally relative to the upper and lower endplates to adjust an angle between the upper and lower endplates, wherein the translation member comprises a bore having one or more mating features for cooperating with an actuator shaft of a surgical instrument to move the translation member in the longitudinal direction; and
a locking member coupled to the translation member and configured to secure a longitudinal position of the translation member relative to the upper and lower endplates, the locking member being rotatably coupled to the translation member within the bore from an unlocked position to a locked position,
wherein, in the unlocked position, the translation member is capable of moving in the longitudinal direction, and wherein, in the locked position, the translation member is constrained from moving in the longitudinal direction.

2. The adjustable spinal fusion device of claim 1, wherein:
the locking member comprises one or more mating features for cooperating with the actuator shaft of the surgical instrument such that rotation of at least a portion of the surgical instrument causes rotation of the locking member within the bore; and
wherein rotation of the locking member into the unlocked position causes the mating features of the translation member to secure to mating features of the surgical instrument.

3. The adjustable spinal fusion device of claim 2, further comprising one or more engagement elements coupled to one of the upper and lower endplates, wherein the locking member comprises one or more locking elements that engage the engagement elements in one of the upper and lower endplates in the locked position.

4. The adjustable spinal fusion device of claim 3, wherein the locking elements of the locking member comprise a plurality of projections and the engagement elements of one of the upper and lower endplates comprise a plurality of teeth that engage the projections in the locked position.

5. The adjustable spinal fusion device of claim 1, wherein the upper and lower endplates each have proximal and distal ends, wherein the proximal ends are pivotally coupled to each other and wherein the distal ends are movable relative to each other to adjust a distance therebetween.

6. The adjustable spinal fusion device of claim 1, wherein the translation member comprises an angled surface extending downward from the upper endplate towards the lower endplate in a proximal direction, the device further comprising a ramp for cooperating with the angled surface of the translation member.

7. The adjustable spinal fusion device of claim 6, further comprising an internal support member coupled to, or integral with, the upper endplate and a hinge pivotally coupling the internal support member to the lower endplate, wherein the ramp is on the internal support member.

8. The adjustable spinal fusion device of claim 6, wherein proximal translation of the translation member causes the angled surface to engage the ramp and move the distal end of the upper endplate away from the distal end of the lower endplate, wherein the proximal ends of the endplates remain substantially fixed relative to each other as the distal ends are moved apart.

9. A spinal fusion system, comprising:
an adjustable spinal fusion device comprising:
an upper endplate having an outer surface for placement against a first vertebral body;
a lower endplate having an outer surface for placement against a second vertebral body;
a translation member configured to move longitudinally relative to the upper and lower endplates to adjust an angle between the upper and lower endplates; and
a locking member coupled to the translation member and configured to secure a longitudinal position of the translation member relative to the upper and lower endplates; and
an instrument having a proximal handle, an elongate shaft and a mating feature on the elongate shaft for cooperating with the locking member, wherein the mating feature on the instrument is configured to rotate the locking member from an unlocked position to a locked position,
wherein, in the unlocked position, the translation member is capable of moving in the longitudinal direction, and wherein, in the locked position, the translation member is inhibited from moving in the longitudinal direction.

10. The spinal fusion system of claim 9, wherein the mating feature is a first mating feature and the instrument comprises a second mating feature, wherein the translation member comprises a bore having one or more engagement elements for cooperating with the second mating feature to secure the translation member to the instrument such that longitudinal movement of the instrument causes the translation member to move longitudinally relative to the upper and lower endplates.

11. The spinal fusion system of claim 10, wherein the locking member is rotatably coupled to the translation member within the bore and wherein rotation of the locking member into the unlocked position causes the engagement elements of the translation member to secure to the second mating feature of the instrument.

12. The spinal fusion system of claim 11, wherein:
the second mating feature comprises one or more projections extending from a distal end of the shaft of the instrument and the engagement elements of the translation member comprise one or more recesses in an interior surface of the bore; and wherein the first mating feature comprises one or more projections extending from the distal end of the shaft of the instrument, wherein the first mating feature is located proximal to the second mating feature on the elongate shaft.

13. The spinal fusion system of claim 9, wherein proximal translation of the translation member causes a distal end of the upper endplate to move away from a distal end of the lower endplate and wherein proximal ends of the endplates remain substantially fixed relative to each other as the distal ends are moved apart.

14. A surgical instrument for implanting a spinal fusion device in a patient, the instrument comprising:
   an elongate shaft having a proximal handle and a distal end portion;
   a first mating feature for securing the shaft of the instrument to the spinal fusion device;
   a second mating feature on the distal end portion for engaging a translation member of the spinal fusion device;
   a third mating feature on the distal end portion for engaging a locking member of the spinal fusion device; and
   a rod extending through a lumen of the elongate shaft, wherein the second and third mating features are positioned on a distal portion of the rod, and wherein the rod is rotatable relative to the shaft to rotate the locking member of the spinal fusion device.

15. The instrument of claim 14, wherein the rod is configured to translate in a longitudinal direction relative to the shaft to translate the translation member of the spinal fusion device.

16. The instrument of claim 14, wherein the second mating feature comprises one or more projections extending from the distal portion of the rod and the third mating feature comprises one or more projections extending from the distal portion of the rod proximal to the second mating feature.

17. The instrument of claim 16, wherein the second mating feature is configured to secure to the translation member when the third mating feature moves the locking member into an unlocked position that allows translation of the translation member.

18. The instrument of claim 14, further comprising a rotatable knob on the proximal handle coupled to the rod and configured to translate the rod relative to the shaft.

19. The instrument of claim 18, further comprising a gauge on the proximal handle coupled to the rotatable knob and configured to indicate a lordosis angle of first and second endplates on the spinal fusion device.

\* \* \* \* \*